US006476979B1

(12) United States Patent
Schaack

(10) Patent No.: US 6,476,979 B1
(45) Date of Patent: Nov. 5, 2002

(54) FOCUSING SYSTEMS FOR PERSPECTIVE DIMENSIONAL MEASUREMENTS AND OPTICAL METROLOGY

(76) Inventor: David F. Schaack, 11719 Menanl Blvd. Suite C, Albuquerque, NM (US) 87112-2419

( * ) Notice: Subject to any disclaimer, the term of this patent is extended or adjusted under 35 U.S.C. 154(b) by 0 days.

(21) Appl. No.: 09/354,817

(22) Filed: Jul. 17, 1999

Related U.S. Application Data
(60) Provisional application No. 60/094,005, filed on Jul. 24, 1998.

(51) Int. Cl.[7] ............ G02B 15/14; G02B 21/00
(52) U.S. Cl. ............ 359/738; 359/676; 359/379; 359/380
(58) Field of Search ............ 359/379, 380, 359/382, 383, 421, 422, 432, 434, 676, 744, 738

(56) References Cited

U.S. PATENT DOCUMENTS

| | | | |
|---|---|---|---|
| 4,318,515 A | | 3/1982 | Matsumura |
| 4,488,039 A | | 12/1984 | Sato et al. |
| 4,781,448 A | | 11/1988 | Chatenever et al. |
| 4,803,057 A | | 2/1989 | Quinn |
| 4,874,232 A | | 10/1989 | Hasegawa |
| 4,976,522 A | | 12/1990 | Igarashi |
| 5,214,538 A | * | 5/1993 | Lobb ............ 359/691 |
| 5,587,739 A | | 12/1996 | Suzuki et al. |
| 5,876,327 A | | 3/1999 | Tsuyuki et al. |

OTHER PUBLICATIONS

Watanabe, "Telecentric Optics for Computational Vision" Proceedings Chapter, Computer Vision–EECV '96, pp. 439–454, Lecture Notes in Computer Science, Issue 1065, Springer, 1996.

Wallin, "A Note on apparent magnification in Out–of–Focus Images", Journal of the Optical Society of America, vo.43, p. 60–61, Jan., 1953.

R.G. Willson & S.A. Shafer; "Precision Imaging and Control for Machine Vision Research at Carnegie Mellon U."; Report CMU–CS–92–118; Mar. 1992; pp. 1,4–10,12–14; School of Computer Science, CMU.

R.G. Wilson; "Modeling and Calibration of Automated Zoom Lenses"; Proc. SPIE; vol. 2350; Oct. 1994; pp. 170–186; SPIE, Bellingham, WA.

* cited by examiner

Primary Examiner—Scott J. Sugarman
(74) Attorney, Agent, or Firm—Michael J. Tavella

(57) ABSTRACT

Focusing systems for which variation of magnification with focus is either inherently compensated, or is calibrated and corrected. The required conditions for inherent compensation are determined, and the desired state is called constant relative magnification. It is shown that telecentricity does not guarantee constant relative magnification. Both telecentric and non-telecentric accessory cameras for endoscopes are disclosed that have constant relative magnification, as are additional optical systems for general metrological purposes. Methods for calibrating change in relative magnification and deviation of the optical axis with focal shift are disclosed, as are methods for incorporating these changes into perspective dimensional measurements. Embodiments are disclosed in which only a single quantity need be measured to perform the correction, and these embodiments require only a low-resolution position transducer to provide accurate measurements. Apparatus is disclosed that enables an accessory camera to be aligned to an endoscope using only externally accessible adjustments. This apparatus also makes it possible to de-mount the camera from one endoscope and re-mount it to another without requiring any recalibration.

11 Claims, 31 Drawing Sheets

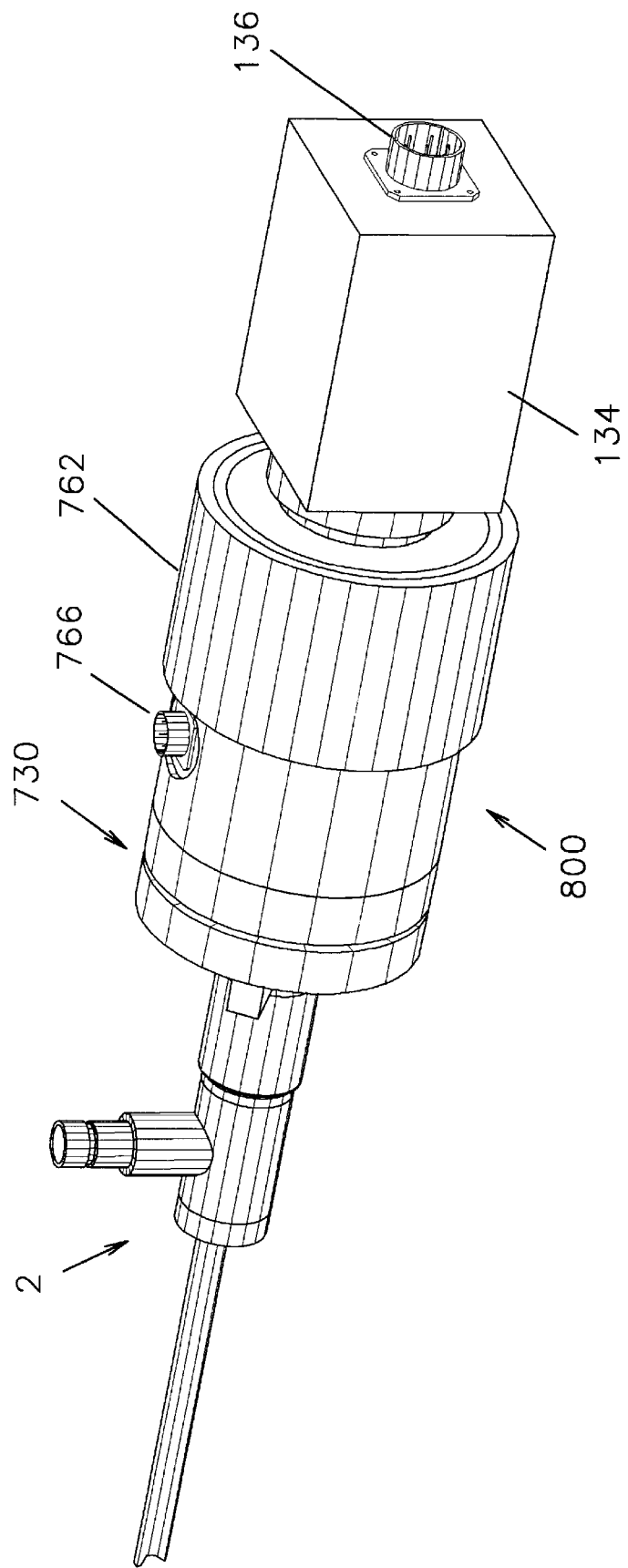

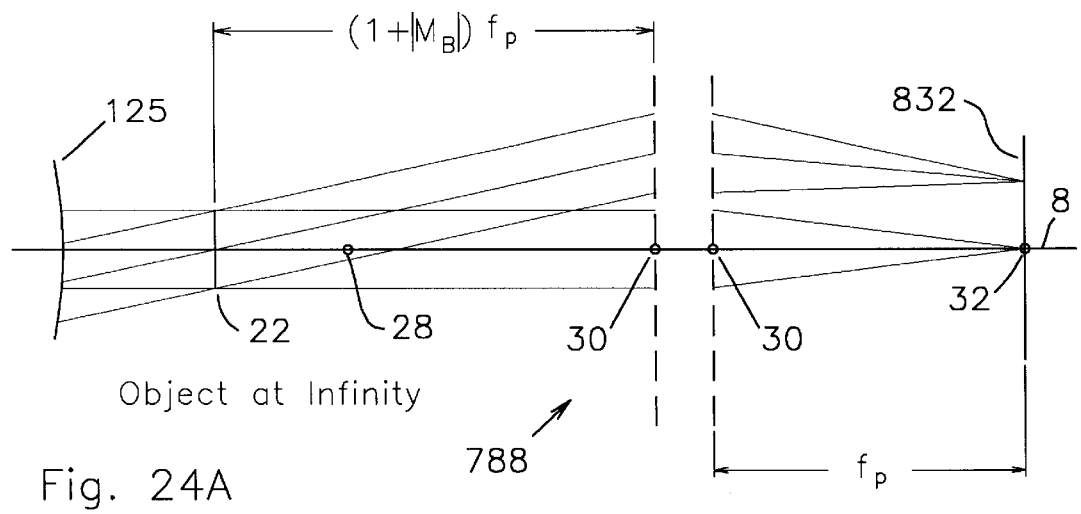
Fig. 24A  Object at Infinity
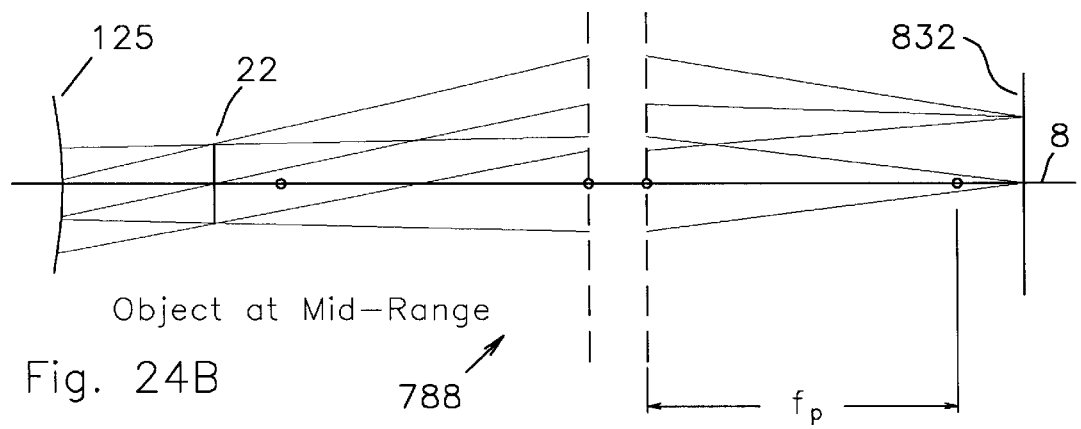
Fig. 24B  Object at Mid-Range
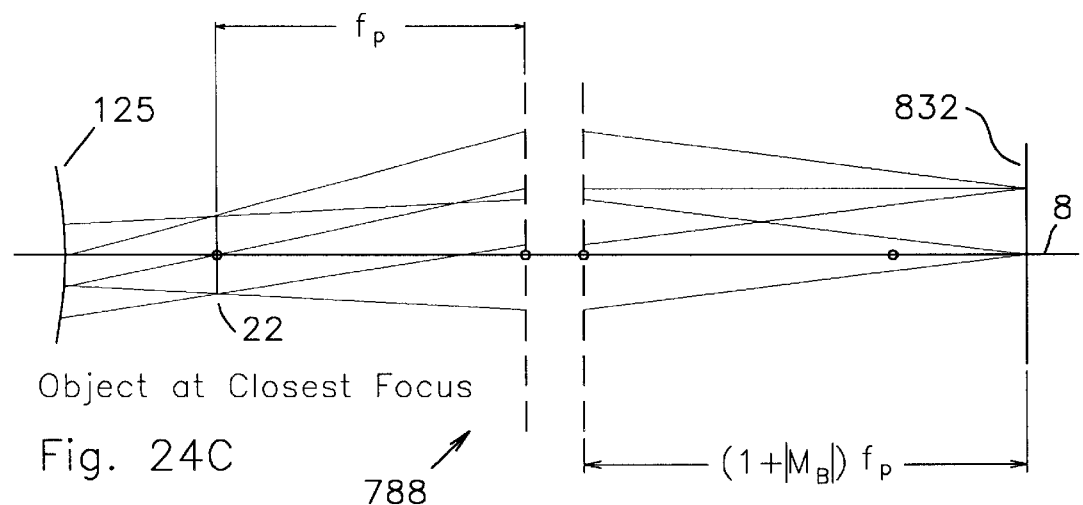
Fig. 24C  Object at Closest Focus Fig. 32
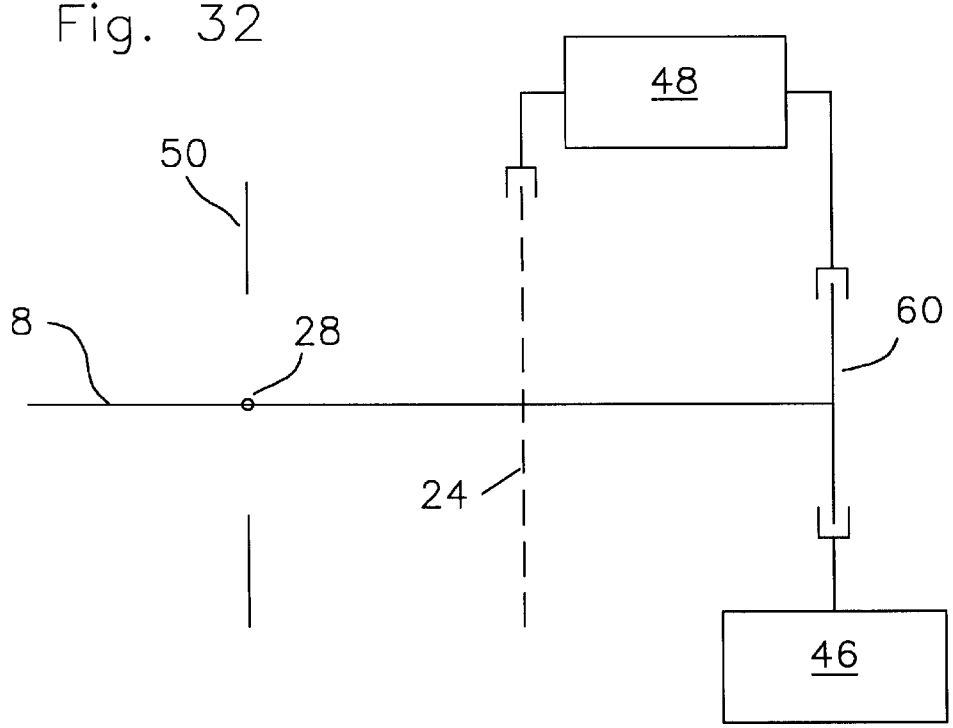
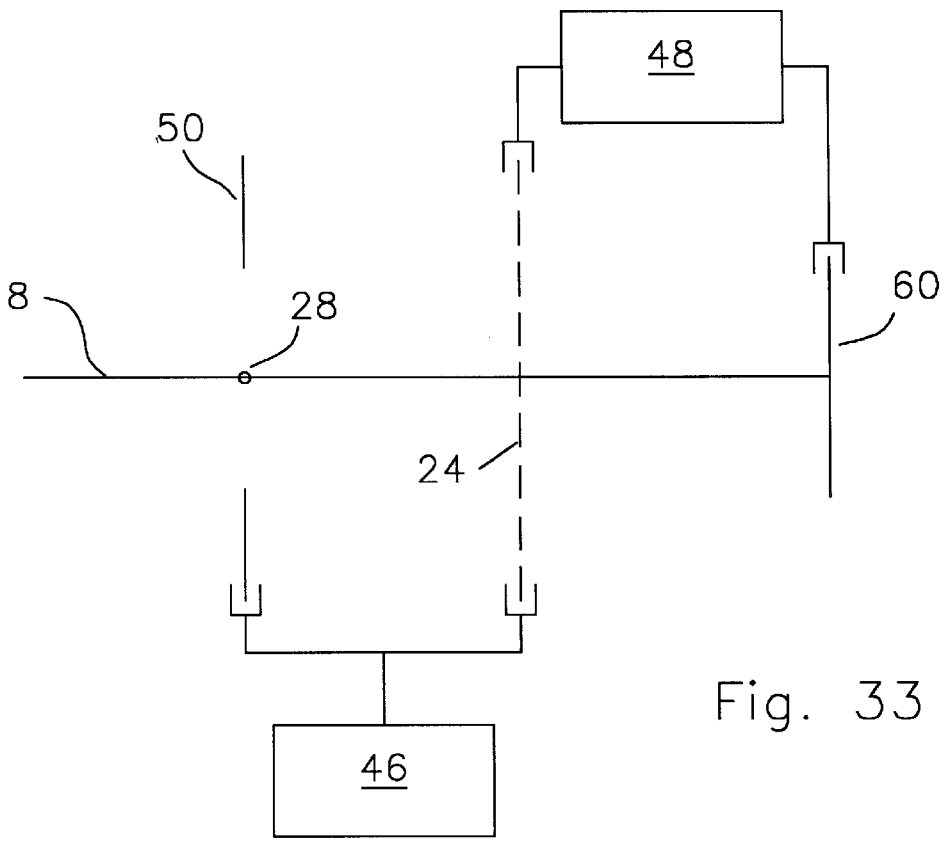
Fig. 33

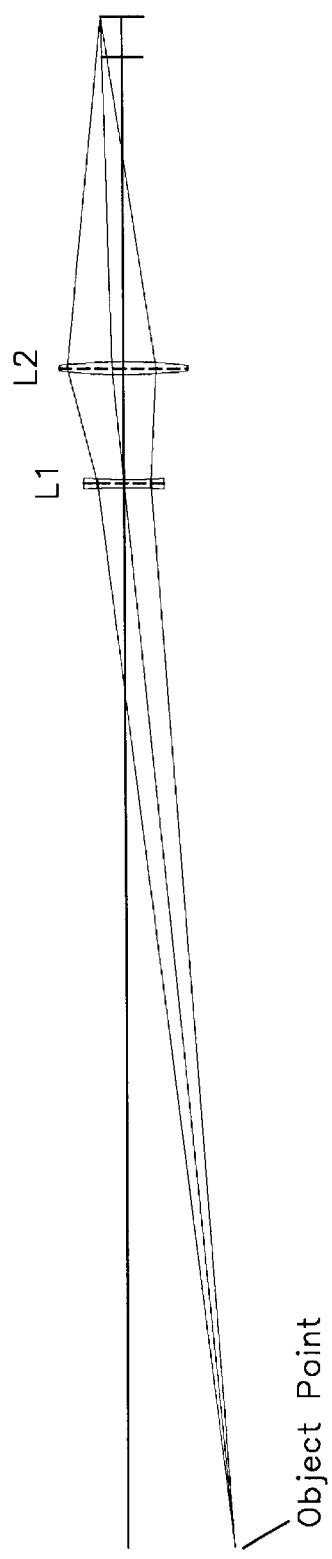
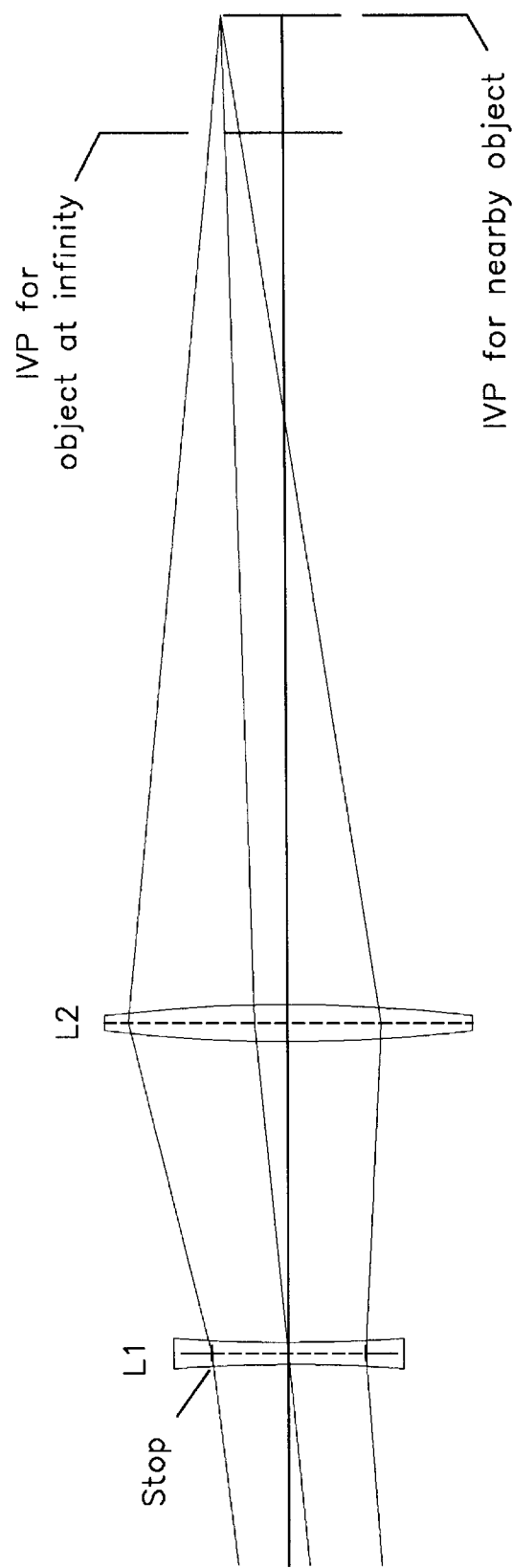
Fig. 36

FOCUSING SYSTEMS FOR PERSPECTIVE DIMENSIONAL MEASUREMENTS AND OPTICAL METROLOGY

CROSS REFERENCE TO RELATED APPLICATIONS

This application claims the benefit of U.S. Provisional Application No. 60/094,005 filed Jul. 24, 1998.

STATEMENT REGARDING FEDERALLY SPONSORED RESEARCH AND DEVELOPMENT (Not Applicable)

BACKGROUND OF THE INVENTION

1. Field of the Invention

This invention relates to optical metrology, and particularly to the problem of making accurate non-contact dimensional measurements of objects that are viewed through an endoscope.

2. Description of Related Art

2a. Perspective Dimensional Measurements with Endoscopes

In the past several decades, the use of optical endoscopes has become common for the visual inspection of inaccessible objects, such as the internal organs of the human body or the internal parts of machinery. These visual inspections are performed in order to assess the need for surgery or equipment tear down and repair; thus the results of the inspections are accorded a great deal of importance. Accordingly, there has been much effort to improve the art in the field of endoscopes.

Endoscopes are long and narrow optical systems, typically circular in cross-section, which can be inserted through a small opening in an enclosure to give a view of the interior. They almost always include a source of illumination that is conducted along the interior of the scope from the outside (proximal) end to the inside (distal) end, so that the interior of a chamber can be viewed even if it contains no illumination. Endoscopes come in two basic types; these are the flexible endoscopes (fiberscopes and videoscopes) and the rigid borescopes. Flexible scopes are more versatile, but borescopes can provide higher image quality, are less expensive, are easier to manipulate, and are thus generally preferred in those applications for which they are suited.

While endoscopes (both flexible and rigid) can give the user a relatively clear view of an inaccessible region, there is no inherent ability for the user to make a quantitative measurement of the size of the objects he or she is viewing. There are many applications for which the size of an object, such as a tumor in a human body, or a crack in a machine part, is a critically important piece of information. Making a truly accurate measurement under these circumstances is a long-standing problem that has not been adequately solved until recently.

In a first co-pending application, now U.S. Pat. No. 6,009,189, entitled "Apparatus And Method For Making Accurate Three-Dimensional Size Measurements Of Inaccessible Objects", filed Aug. 16, 1996, and which is incorporated herein by reference, I taught a new and complete system for making measurements of objects with an imaging optical system, with particular emphasis on endoscopic applications. In a second co-pending application, now U.S. Pat. No. 6,121,999, entitled "Eliminating Routine Alignment Calibrations in Perspective Dimensional Measurements", filed Jun. 9, 1997, I taught certain improvements to the measurement system as applied to the endoscopic application. I will hereinafter refer to the first co-pending application as "Application 1" and the second as "Application 2".

My previous invention makes possible a new class of endoscopic measurement instruments of unprecedented measurement accuracy. This measurement system is a version of a technique I call "perspective dimensional measurement". By "perspective" I am referring to the use of two or more views of an object, obtained from different viewing positions, for dimensional measurement of the object. By "dimensional measurement", I mean the determination of the true three-dimensional (height, width, and depth) distance(s) between two or more selected points on the object.

As a necessary and integral part of my complete measurement system, I taught how to calibrate it in the referenced applications. I taught the use of a complete set of robust calibration procedures, which removes the need for the measurement system to be built accurately to a specific geometry, and also removes any need for the imaging optical system(s) to be built accurately to specific optical characteristics. Instead, I taught how to calibrate the geometry and characteristics of the opto-mechanical hardware, and how to take that actual geometry into account in the measurement process. The complete set of calibration procedures I taught includes three different types of calibration. In optical calibration, the detailed characteristics of each imaging optical system (i.e., camera), when used as a precision image forming device, are determined. In alignment calibration, the orientations of each camera's measurement coordinate axes with respect to the motion of the camera are determined. Finally, in motion calibration, any errors in the actual motion of the camera(s), as compared to the ideal motion, are determined.

In Application 2, improvements to the system were made that eliminated the necessity of repeating the alignment calibration in certain important circumstances.

In some embodiments, my previous invention enables one to make accurate measurements using a standard, substantially side-looking, rigid borescope. Since the person who needs the measurement will often already own such a borescope, the new method offers a significant cost advantage over earlier measurement techniques.

In other embodiments, my previous invention provides for new types of self-contained endoscopic measurement instruments, both rigid and flexible, which offer significantly improved measurement accuracy as compared with those previously available. I call these new instruments the electronic measurement borescope and the electronic measurement endoscope.

While my system, as previously disclosed, does produce accurate dimensional measurements, there is room for improvement. The problem is that a new optical calibration may have to be performed each time the focus of the instrument is adjusted. One of the parameters determined during optical calibration is proportional to the magnification of the image. Without making special provisions for it, the magnification will most likely not be constant with focus, and thus every time the instrument is refocused, there is the logical requirement for a new optical calibration. Additional parameters that are determined during optical calibration are the location of the optical axis on the image sensor and the distortion of the image. These parameters may also vary as the focal state (that is, the object plane that is in focus) of the instrument is changed, which would be additional reasons to require a new calibration. Of course, whether a new calibration would actually be required in any specific instance depends on the accuracy required of the dimensional measurement, and on the characteristics of the camera being used in that instance.

When a standard borescope is used with my previous invention, there is the further difficulty that when an image sensor is mounted to the borescope to perform perspective measurements and the assembly is then calibrated, this calibration is lost if the image sensor is subsequently removed from the borescope. One may wish to remove the image sensor temporarily either to use the borescope for visual inspection, or to use the image sensor with another borescope that has different characteristics. What is needed here is a way to allow the removal and replacement of the measurement image sensor while maintaining calibration of the measurement system.

2b. Magnification and Focus in Optical Metrology and Machine Vision

It is known that the magnification of an image formed by an optical system depends on the range of the object; that is, the magnification depends on the distance between the object and the optical system. It is also known that there is a well defined relationship between the position of a focusing component in an optical system and the range of an object that is in focus. These known relationships have been used in a class of endoscopic measurement instruments that implement a technique that I call measurement by focus. U.S. Pat. No. 4,078,864 to Howell (1978) and U.S. Pat. No. 5,573,492 to Dianna and Costello (1996) are examples of this approach. In these instruments, a focusing component is instrumented to produce a datum that is a function of the range to the object plane that is in focus. (By "instrumented", I simply mean that the position of the focusing component along the system's optical axis is measured with respect to some fixed reference within the system.) This datum is then used together with a calibrated relationship between the range and the magnification to produce a relationship between dimensions as measured on the image and the corresponding dimensions on the object.

The fundamental problem with this approach to making accurate dimensional measurements is that the position at which the image is in focus is difficult to determine, thus the range measurement, and hence the magnification, is subject to relatively large random errors (that is, a lack of repeatability). As a result, these instruments, as disclosed and in practice, are restricted to making two dimensional measurements, i.e., measurements of distances that are oriented perpendicular to the optical axis.

The key assumption of the measurement by focus technique is that there is a fixed relationship between the range of an object and its magnification, because it is assumed that an object will always be viewed in focus. This assumption cannot apply to any three-dimensional measurement technique because the measurement determines the depth of an object, while only a single plane of the object can truly be in focus at a time. In general the magnification of an image depends not only on the range of the object, but also on the range at which the optical system is focused, that is, on the focal state of the optical system.

The telecentric principle has often been applied to standard two dimensional optical measurements, such as those made by optical comparators. Telecentricity refers to the situation where the cone of light forming each point in an image has a central axis which is parallel to the optical axis of the system. It is only recently that telecentricity has been applied to three-dimensional machine vision applications, in a paper by M. Watanabe and S. K. Nayar: "Telecentric Optics for Computational Vision", *Lecture Notes in Computer Science*, 1065, 1996. The applications that these authors consider are called "depth from focus" and "depth from defocus" and are closely related to the measurement by focus technique.

In depth from focus, the focal state of the imaging camera is varied in small steps throughout a range of focal states. An image of the scene of interest is acquired at each of these focal states. The images are then analyzed to determine in which image the individual elements of the scene are in best focus, thus obtaining a relatively crude estimate of the range of each element of the image. In depth from defocus, only two images are acquired at two focal states, and a different image processing scheme is used in an attempt to obtain the same information. As stated, these are machine vision applications, where the goal is a relatively coarse determination of the three - dimensional layout of the objects in a scene, rather than metrology, where the goal is a precise measurement of individual dimensions on an object. These techniques have the same problem as does the measurement by focus technique when it comes to accurate metrology.

Watanabe and Nayar point out that when a telecentric optical system is used and the image viewing plane is moved to focus the system, the magnification of the image does not vary with the focal state of the system. While they refer to this situation as "constant magnification", I prefer to call it "constant relative magnification". The first reason for defining a new term is that this is not the only type of constant magnification; there are other types of constant magnification which are important. Significant additional reasons for the use of my terminology will become apparent in the ensuing discussion.

While the system taught by Watanabe and Nayar meets the goals they set for it, their teachings are far from complete. As I will show, there are significant benefits to be gained from going beyond the use of a telecentric optical system for optical metrology. In addition, their teachings are in error in an important point, in that they state that their system will also work if the lens is moved with respect to the image viewing plane. I will show that this is incorrect in practice, and that the difference is important to accurate metrology.

In U.S. Pat. No. 4,083,057 (1978), Quinn disclosed the addition of a magnification corrector to an auto-focus lens system to correct for the change in magnification with focal state in video systems. The problem addressed by Quinn was that objects near the edge of the field of view of a video or movie camera would be seen to move into or out of the field of view as the focus of the camera was changed. At first glance, this problem is not related to machine vision or metrology, but Quinn's system is the earliest example known to me of a non-telecentric system that may be able to achieve imaging at constant relative magnification. I say "may be able to" because Quinn does not teach everything that is required to generate a correction which will work for objects at all ranges. I am not aware of any later work which remedies this deficiency.

A system that enables one to make photographs at constant magnification was disclosed by Yasukuni, et. al., U.S. Pat. No. 4,193,667 (1980), and has been followed by many other patents directed to the same end. In these systems, the goal is to image an object at a constant image size as that object is moved to various ranges, while also keeping the image in focus as it moves. I refer to this goal as imaging at constant absolute magnification. To perform this function, these systems use a variable focal length optical system combined with a focus adjusting component. Thus, these systems are adaptations of zoom or varifocal lenses.

A system for photocopiers, microform readers, and the like, which allows one to accurately set a variable magnification of the image of a fixed object, while simultaneously keeping the image in focus, was disclosed by Sugiura, et. al. in U.S. Pat. No. 4,751,376 (1988). This also has been followed by many other patents directed to the same end. These systems are also directed toward achieving a constant, and well-determined, absolute magnification. In this case, the focal length of the optical system is fixed, and the optical system is moved with respect to the object in order to change the magnification.

In all of the known systems providing constant absolute magnification, and in the known non-telecentric systems which may provide constant relative magnification, there are used two independently moving components in the optical system. These moving components are a magnification adjuster and a focus adjuster. The magnification adjuster is typically a lens group, while the focus adjuster is either a second lens group or an optical path length adjusting component. The relative motions of these components with respect to the object and with respect to each other are then controlled in a manner to produce the desired magnification and focus result. In the early systems described by Yasukuni, et. al. and by Quinn, the relative motions are controlled by mechanical cams. In later devices, motors are used to move the components, and position transducers are used to monitor the positions of the components.

For the purposes of endoscopic dimensional measurements, the fixed focal length constant absolute magnification systems are not applicable, since the distance between the object and the optical system cannot, in general, be controlled to adjust the magnification. The variable focal length systems could be applied to these measurements as well as to general optical metrology, but systems using two instrumented moving components are complex and expensive. In addition, because the disclosed systems have been designed for photography and not metrology, they do not produce the information necessary for accurate metrology.

In the general art of optical metrology, little attention has been paid to the detailed characteristics of the magnification in out of focus images, other than the use of the telecentric principle. It has not been well understood that accurate measurements can be made with out of focus images. The only related reference that I am aware of is an early letter by W. Wallin, "A Note on Apparent Magnification in Out-of-Focus Images", *Journal of the Optical Society of America*, 43, 60, 1953. In this paper Wallin states that the magnification is defined only for the image plane, but then goes on to define what he calls an "apparent magnification" for out of focus images. Wallin's comment is clearly incorrect, as any real image will almost never be in perfect focus, yet such images can be used for metrology. Wallin gives expressions for the apparent magnification of an optical system in a fairly general, obscure, and unusable form. He states that these expressions are useful for tolerancing optical comparators. What this paper lacks is any information or insight into how to design or improve the design of a metrological optical system using his concept of apparent magnification.

In the general art of perspective dimensional measurements, typically the object to be inspected is brought to an inspection station that has a set of fixed viewing cameras. Thus, the range of the object is essentially fixed, and so are the focal states of the measurement cameras. If the cameras are refocused for some reason, then the system is recalibrated. Although this system is satisfactory for many purposes, I believe that if the capability to refocus the cameras on an object of interest without also requiring a recalibration were available, it would be found useful in some of these standard inspection setups.

The most important alternative to perspective dimensional measurements in three-dimensional optical metrology is known as use of "structured light". There are, for instance, commercially available endoscopic measurement systems based on this principle. These systems have the same problem with requiring recalibration if the camera is refocused, and would also benefit if this problem were solved.

Fundamentally, what is needed for the purposes of three-dimensional optical metrology, including perspective dimensional measurements, is a way to determine the magnification that applies at each point in an image, regardless of whether that point happens to be in focus or not; and this magnification must be determined as the focal state of the optical system changes. In addition, and especially in endoscopic applications, one must also determine any deviation of the optical axis and any change in the distortion in the image as the focal state is changed. This problem has heretofore not been addressed in a comprehensive or coherent manner.

In order to meet these goals with a fixed focal length optical system, one must determine how the magnification varies with two independent variables: the range of the object point and the focal state of the optical system. With a variable focal length system, there are three independent variables: the range, the focal state, and the focal length of the system. None of the prior art systems is capable of providing the required information about how the magnification, the position of the optical axis, and the distortion depend on the independent variables, nor can they incorporate any such information into the measurement. Thus, the teachings of the prior art are not sufficient to enable one to perform accurate three-dimensional metrology while also allowing an adjustment of focus to best view an object of interest, without also requiring a recalibration when the focus is adjusted.

BRIEF SUMMARY OF THE INVENTION

Accordingly, the present invention has two overarching goals, which are:
1. Provide apparatus and methods that enable a user to adjust the focus of an optical metrology system while maintaining measurement accuracy, without requiring recalibration.
2. Make the apparatus as simple and inexpensive as possible.

In order to logically and systematically gain control of the independent variables in an optical system so that these goals can be met, I have developed several new concepts related to an optical system. Using these concepts, I have been able to reduce the number of separately instrumented moving components that are necessary in a variable focus metrological optical system. I have also been able to reduce the requirements on the precision to which the focus motion must be instrumented.

As previously stated, what must be determined is the relationship between the range of an object and the magnification of that object. This relationship must be determined for every possible focal state of the optical system. I have found that an optical metrology system can be simplified if the required relationship can be expressed by the following equation:

$$\text{Magnification}=(\text{focus dependent part})\times(\text{range dependent part}) \quad (1)$$

When the magnification of an optical system can be expressed by Equation (1), then I say that the optical system exhibits a relative magnification, where the relative magnification is the focus dependent part.

In an optical system that exhibits a relative magnification, the range dependent part of the magnification is a fixed function of the range, and it is only the focus dependent part that must be considered when determining how the magnification of an object varies with focal state. When the focal state is changed, the magnification of an image changes by a factor that is the same for objects at any range, and thus is independent of the value of the magnification. In this situation, if the system is appropriately designed, only a single quantity must be instrumented to determine the information required to make accurate dimensional measurements. I have found that there are a large class of optical systems that exhibit a relative magnification, and I teach the requirements for this condition.

If, in addition, the focus dependent part of the magnification is a constant, then the magnification of the image does not depend on the focal state at all, and I refer to that situation as imaging at constant relative magnification. In this condition the image of an object at a given distance from a camera remains at the same size as the focus of the camera is varied, or, to state it another way, the image of a given object remains the same size whether it happens to be in focus or not. The size of the image will vary with the range of the object, but that size is independent of what range happens to be in focus. When an optical system exhibits a constant relative magnification, there is a fixed relationship between range and magnification, and that fixed relationship does not depend on the image being in focus. In this case, with proper system design, nothing at all has to be instrumented in order to obtain the required information for metrology.

The only previously known ways to achieve constant relative magnification were either to use an appropriate two moving component scheme to adjust both focus and magnification or to use a certain type of telecentric optical system. Not every two moving component system or every telecentric system will provide constant relative magnification. I teach the requirements which must be met by these types of systems in order to achieve that condition. I also teach the specific requirements that must be met by any optical system in order to achieve constant relative magnification. As a result of this new understanding, I have discovered simple, single moving component, non-telecentric optical systems that exhibit constant relative magnification, and which are both practical and useful for optical metrology.

If the relative magnification of an optical metrology system is not constant with focal state, then one must accurately determine any changes in the relative magnification, and one must also take those changes into account in the dimensional measurement. In this case there is no fixed relationship between range and magnification. I have developed apparatus and methods that make such systems practical and useful.

When an optical system does not exhibit a relative magnification, then the change in magnification when the focal state is shifted depends on the range of the object. In other words, the change in magnification for a given change in focal state depends on the magnification. I have found that there exist simple systems for which only one quantity must be instrumented in order to handle even this case, but the effort necessary to calibrate these systems is larger than that required for systems that do exhibit a relative magnification.

Therefore, several objects and advantages of the present invention are:

(a) to provide apparatus and methods that enable accurate perspective dimensional measurements to be made with an endoscope, while allowing a user to focus on an object of interest, without requiring more than an occasional optical calibration of the system;

(b) to provide apparatus and methods that allow a single measurement accessory camera to be used with any one of several endoscopes, and to be interchanged between them, while also providing accurate measurements, without requiring more than occasional recalibrations;

(c) to provide apparatus and methods that enable accurate dimensional measurements to be made with an electronic measurement borescope, or with an electronic measurement endoscope, while allowing a user to focus on an object of interest, without requiring more than an occasional optical calibration of the system;

(d) to provide optical systems for metrology cameras that enable accurate dimensional measurements to be made while also allowing a user to focus such cameras on an object of interest, without requiring more than an occasional optical calibration of the cameras;

(e) to provide optical systems for metrology that enable one make accurate measurements, while also allowing one to focus on an object of interest, without requiring the instrumentation of both the focal state and the focal length of the optical systems;

(f) to provide non-telecentric optical systems for optical metrology that enable one to focus on an object of interest, while maintaining measurement accuracy, without requiring the instrumentation of either the focal state or the focal length of the optical systems; and (g) to provide the requirements for and a general method of designing non-telecentric optical systems that exhibit constant relative magnification.

In a first embodiment, my system provides an accessory measurement camera for an endoscope that incorporates a telecentric optical system. The focal state is varied by moving an image sensor along the optical axis, where the motion is preferably constrained to an accurate straight line by a linear translation stage. I teach how the optical system of the accessory camera can be designed to correct for aberrations of the endoscope in a manner to produce more accurate measurements.

My system also provides for a measurement mechanical interface and for a sufficient set of alignment adjustments to be incorporated into the interface so that a measurement accessory can be mounted or re-mounted to a endoscope and so that the measurement accessory can also be interchanged between endoscopes without requiring any recalibration of the measurement system.

I teach how to determine the relative magnification and deviation of the optical axis between two calibration images, and further, how to use this method to align measurement systems according to this invention so that the relative magnification and optical axis position are constant with focal state. I also teach how to determine the number of image points that must be contained in the calibration images to obtain system alignment to the required degree of precision for the desired metrological performance.

In another embodiment, my system provides an accessory focusing measurement adapter that adapts a video camera back to an endoscope. This adapter uses a single lens group that moves along the optical axis to adjust the focal state. The position of the lens group is instrumented with a position transducer. I teach how to optimize the layout of this system to minimize the change in relative magnification with focal state over the desired range of object distances, thus allowing one to obtain accurate metrology with an inexpensive position transducer.

I teach how to determine the relative magnification and the position of the optical axis of an optical system as a function of focal state. The method includes use of a single set of calibration images, as well as the combination of the results from multiple sets of calibration images obtained with calibration targets at different ranges. I further teach how to use these methods to compensate for the errors of embodiments of the present invention that are imperfectly aligned and/or that do not exhibit perfectly constant relative magnification. I also teach how to incorporate these relative magnification and optical axis location data into the perspective dimensional measurement.

In another embodiment, my system provides an accessory camera or focusing adapter to be used with an endoscope in which the optical system is telecentric, but in which a lens group, rather than an image sensor, is moved along the optical axis to change the focal state. Optionally the moving lens group can be designed to correct for the aberrations of the endoscope.

In other embodiment, my system provides an optical system for optical metrology that includes an aperture stop and a lens, considered as a single lens group, which are disposed at a fixed relative distance. The system also includes an image sensing plane which is disposed at a variable distance with respect to the lens and stop, and a position transducer which instruments the relative positions of the image sensing plane and the lens.

In another embodiment, my system provides an optical system for optical metrology that includes a unit comprising an aperture stop and a lens, considered as a single lens group, that are disposed at a fixed relative distance. The stop—lens unit is disposed at a variable distance with respect to an image sensing plane in order to vary the focal state of the system. The relative positions of the image sensing plane and the stop—lens unit are instrumented by a position transducer.

In another embodiment, my system provides an optical system for optical metrology in which an aperture stop and an image sensing plane are disposed at a fixed relative distance, and in which a lens, considered as a single lens group, is disposed at a variable position along the optical axis with respect to the stop and image sensing plane, and in which the relative positions of the lens and the stop—sensing plane unit are instrumented with a position transducer.

In another embodiment, my system provides a two lens group optical system that exhibits constant relative magnification, but is not telecentric. A second lens group and an image sensing plane are disposed at a fixed relative distance, and this unit is disposed at a variable distance with respect to a first lens group. The first lens group is also disposed at a particular location with respect to an aperture stop. As an option, the relative position of the second lens group—image sensing plane unit with respect to the first lens group can be instrumented in order to allow for correction of imperfect alignment or of aberrations.

In another embodiment, my system provides a three lens group optical system that exhibits constant relative magnification, is not telecentric, but that maintains a near-telecentric condition as the focal state is varied. In this embodiment, a stop, first and third lens groups, and an image sensing plane are disposed at fixed relative positions along an optical axis. The first lens group is disposed at a particular distance with respect to the stop, and the third lens group is disposed at a particular distance with respect to the image sensing plane. A second lens group is disposed between the first and third lens groups, and its position along the axis is varied in order to change the focal state of the system. As an option, the relative position of the second lens group with respect to the rest of the system can be instrumented in order to allow for correction of imperfect alignment or of aberrations.

Further objects, advantages, and features of my system will become apparent from a consideration of the following description and the accompanying schematic drawings.

BRIEF DESCRIPTION OF THE DRAWINGS

FIG. 22 is an overall perspective view of a second embodiment using a rigid borescope, from the rear.

FIGS. 24A, 24B, 24C depicts the suggested (default) optical layout for the optical system of the second embodiment.

FIG. 32 depicts a fourth embodiment of the invention.

FIG. 33 depicts a fifth embodiment of the invention.

FIG. 36 shows a thin lens layout of a two lens group optical system imaging a nearby object point, used as an example.

DETAILED DESCRIPTION OF THE INVENTION

1. Detailed Explanation of the Problem Solved by the Invention

In order to help the reader practice the invention, it is necessary to explain the problem solved by it in greater detail. In this Section, I carefully examine the imaging process and its implications for perspective dimensional measurements. This discussion also serves as an introduction to the more sophisticated imaging models that are necessary for description of the improved systems of this invention.

Figure 1:
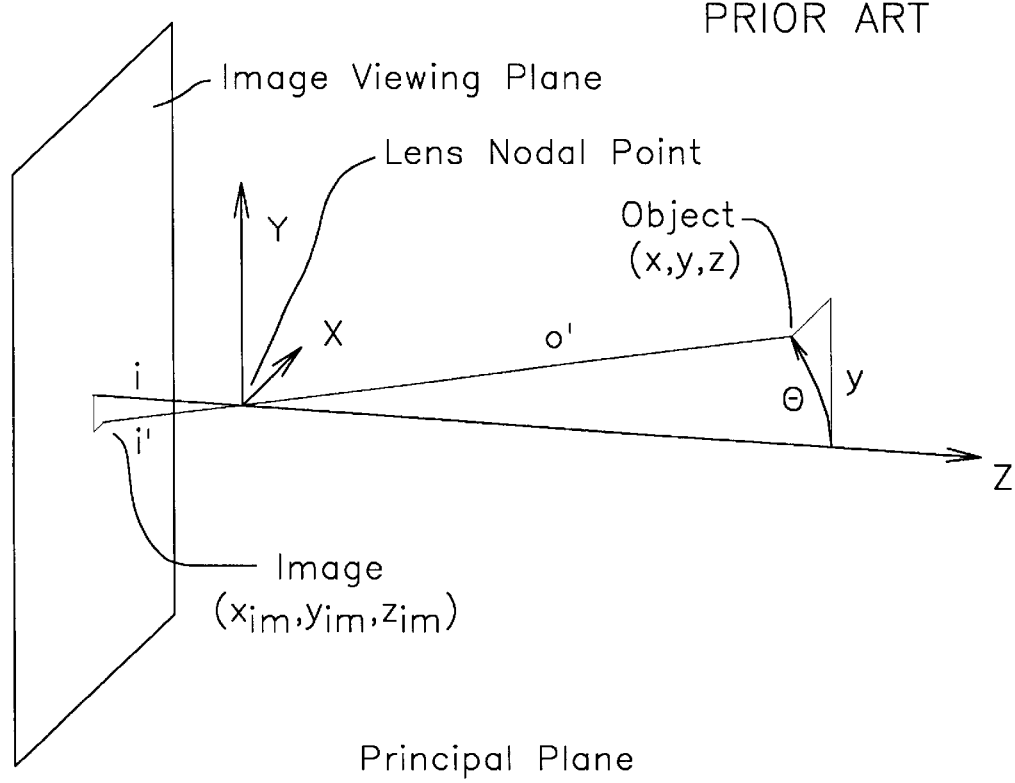
FIG. 1 depicts the conventional pinhole camera model for imaging of an object point, as prior art.

FIG. 1 depicts the camera model that has almost universally been used in the prior art for analyzing the imaging process in perspective dimensional measurements and in similar measurements made in the fields of machine vision and photogrammetry. In FIG. 1 an object point of interest is imaged onto a flat plane that I will call the image viewing plane or image sensing plane. The effect of the camera lens is represented by considering the lens as a pinhole. More generally, the imaging lens can be considered to be a paraxial thin lens. The point on the optical axis of a paraxial thin lens that corresponds to the pinhole is called the nodal point. Rays that strike the nodal point of the lens pass through it undeviated.

In FIG. 1 an image viewing plane is set up behind the nodal point, with the distance from the plane to the nodal point being denoted as i. This distance is measured along a perpendicular to the image viewing plane. The nodal point is taken as the origin of a Cartesian coordinate system, where the z axis (and the optical axis) is defined as that perpendicular to the image viewing plane that passes through the nodal point.

Given an object point at (x, y, z) one can write these coordinates in standard spherical polar coordinates about the nodal point as:

$$x = o' \sin\theta \cos\phi \quad y = o' \sin\theta \sin\phi \quad z = o' \cos\theta \quad (2)$$

where o' is the distance from the object point to the nodal point, and the polar angle $\theta$ is shown in FIG. 1.

By the properties of the nodal point, the angles will remain the same and one can write the image point location as:

$$x_{im} = -i' \sin\theta \cos\phi \quad y_{im} = -i' \sin\theta \sin\phi \quad z_{im} = -i \quad (3)$$

But $i = i' \cos\theta$ so that:

$$x_{im} = -\frac{i \sin\theta \cos\phi}{\cos\theta} = -\frac{ix}{o' \cos\theta} = -\frac{ix}{z} \quad (4)$$

$$y_{im} = -\frac{i \sin\theta \sin\phi}{\cos\theta} = -\frac{iy}{o' \cos\theta} = -\frac{iy}{z} \quad (5)$$

That is, the coordinates of the image point $(x_{im}, y_{im})$, are directly proportional to the transverse coordinates of the object point and inversely proportional to the distance between the nodal point and the object plane.

A different set of field angles, called the altitude—azimuth system, is often used in applications. These angles are defined by:

$$\tan\alpha_z = -\frac{x_{im}}{i} = \frac{x}{z} \quad (6)$$

$$\tan\alpha_y = -\frac{y_{im}}{i} = \frac{y}{z}$$

The magnification at which the object is imaged is:

$$M = \frac{x_{im}}{x} = \frac{y_{im}}{y} = -\frac{i}{z} \qquad (7)$$

It was shown in Application 1 how to make accurate dimensional measurements based in part on Equations (4) and (5). The relationship between the image position and the object position as expressed by these equations was considered to define perfect imaging, and any deviations caused by a real camera optical system were lumped into a category called distortion, which I now refer to as the generalized distortion. It was shown how to calibrate a real camera to determine the quantity i, (hence its magnification for any given object distance) and its distortion. This portion of the calibration of the complete measurement system was called optical calibration.

Figure 2:
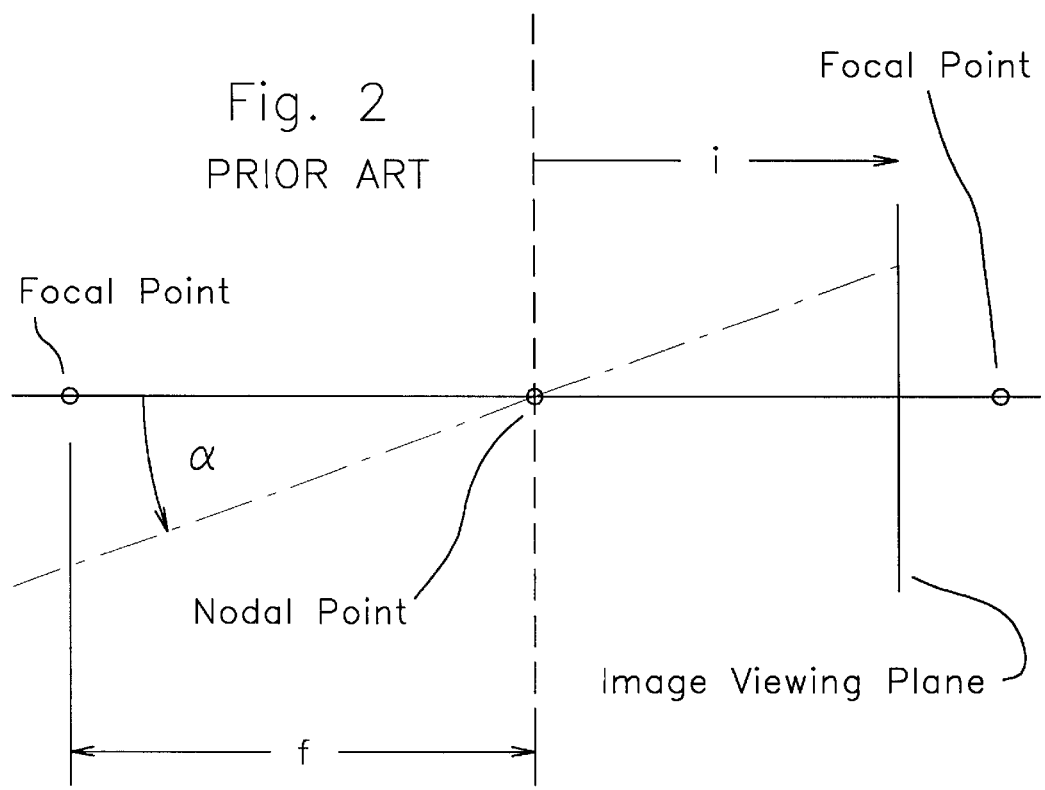
FIG. 2 depicts the paraxial thin lens model for an imaging optical system, as prior art.

For a lens immersed in air, the nodal point is at the intersection of the optical axis with the principal plane of a paraxial lens. The paraxial thin lens model for a lens with a positive focal length is illustrated in FIG. 2. A lens has two focal points, one on each side of the principal plane, and the distance between each focal point and the principal plane is called the focal length, f. Not shown in FIG. 2 are the focal planes of the lens, which are the planes that contain the focal points and that are parallel to the principal plane.

In metrological applications, the quantity i in Equations (3) through (7) is often called the equivalent focal length of the camera, and that term was used in Application 1, but i clearly has no particular relationship to the focal length of the lens, since an image viewing plane could be set up at any desired distance behind the lens. Perhaps better terms for i are projection distance, or principal distance. In the remainder of this document, I refer to the distance i as the projection distance.

In FIG. 2 a ray is shown passing through the nodal point and terminating on an image viewing plane. I refer to any such ray as a nodal ray. The essence of Equations (3) through (7) is that the nodal ray for any object point that lies along a line of constant angle α, no matter what the distance from the lens, will strike the image viewing plane at the same height, i tanα.

Figure 3:
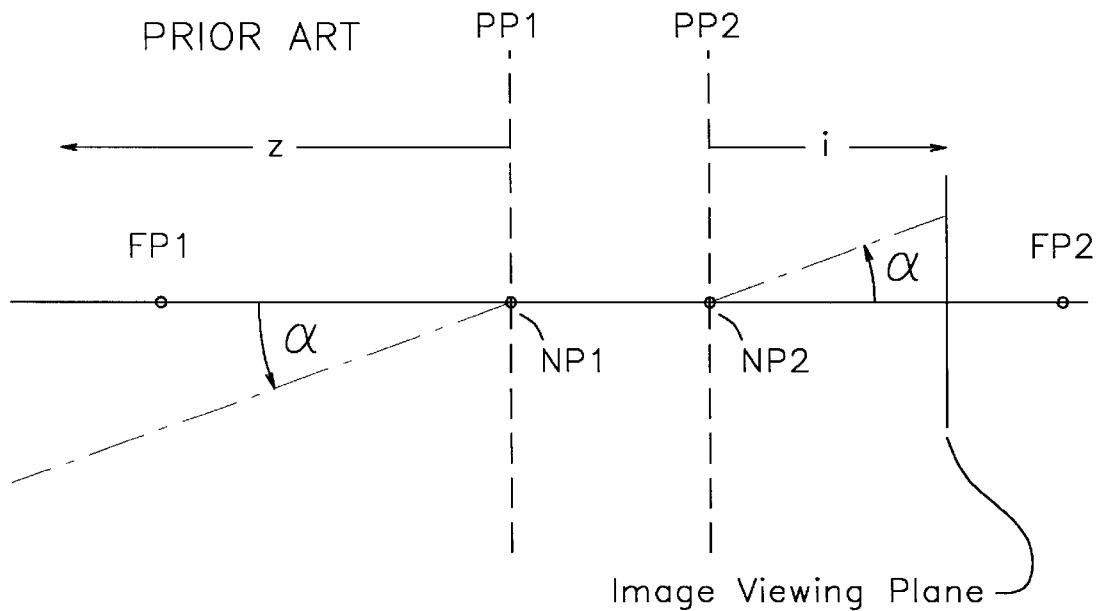
FIG. 3 depicts the paraxial thick lens model for an imaging optical system, as prior art.

A real optical system has a finite thickness, and this is particularly true of an endoscope. The paraxial thin lens model is easily extended to a thick lens model by splitting the principal plane in two as shown in FIG. 3. There are now two nodal points, NP1 and NP2, as well as two principal planes, PP1 and PP2. Focal point FP1 is located a distance of one lens focal length from PP1, and likewise for the relationship between FP2 and PP2. The thick lens acts as if the optical rays interact with PP1, NP1, and FP1 in object space and then jump to PP2, where they proceed into image space. In this case the distance of an object, z, is measured from PP1 and the projection distance, i, is measured from PP2. For the nodal ray shown in FIG. 3 the height of the intersection on the image viewing plane of the system is the same as it was in FIG. 2 if α and i are the same.

The diagrams shown in FIGS. 2 and 3 represent optical systems that act similarly to simple lenses of positive focal length. While these models are adequate for the present purpose, it is important to realize that in real thick lenses and for general optical systems, the relative positions of the focal points and the principal planes along the optical axis can be different than that shown in FIG. 3. Such differences can lead to unexpected effects. An example will be discussed below in conjunction with the seventh embodiment of the present invention.

Figure 4:
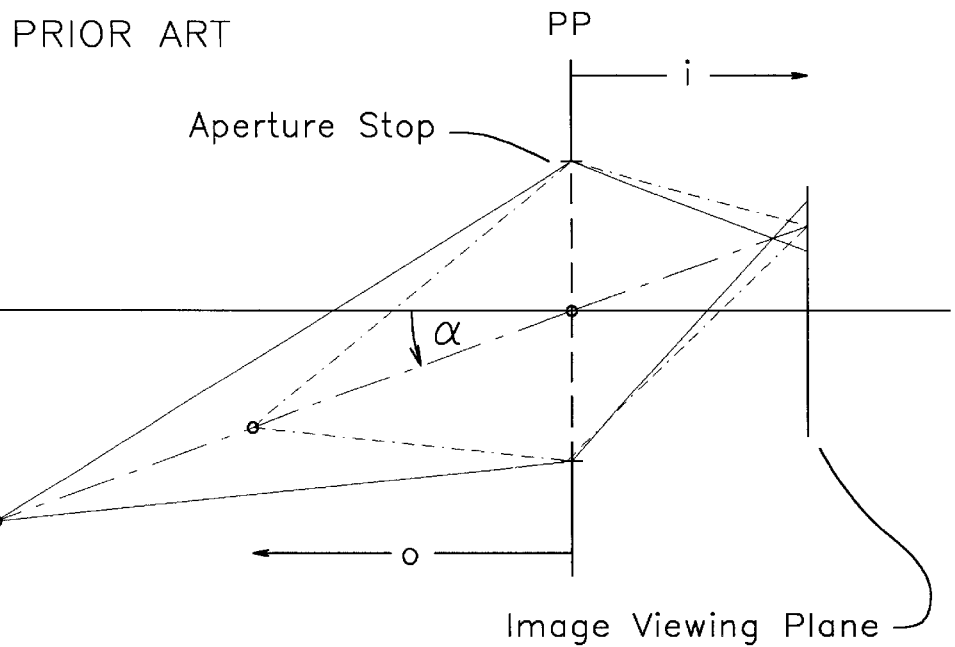
FIG. 4 shows the image blur formed for an out of focus object point when the aperture stop is located at the principal plane of a lens, as prior art.

A real optical system must allow a finite bundle of rays to enter in order to accept enough energy to form a visible image. The element of the system that determines the size of the bundle of rays accepted by the system is called the aperture stop. In FIG. 4 a finite aperture stop has been added at the principal plane of a thin lens, centered on the optical axis.

Consider now the imaging of objects at different distances along the nodal ray at angle α. Only an object that lies at a particular distance is in focus on the image viewing plane. The in-focus object distance is given by the well-known formula (for a lens with a positive focal length, and where the positive signs for distances is indicated in FIG. 4):

$$\frac{1}{i} + \frac{1}{o} = \frac{1}{f} \qquad (8)$$

where o is the object distance. The images of objects at all other distances are blurred, as is shown in FIG. 4 for a second object point at a greater distance than o. However, the centroid of the blur spot lies at the same position on the image viewing plane for any object position along the nodal ray at angle α. Thus, if one defines the location of a blurred image point to be the location of the centroid of the blur spot, Equations (3) to (7) will still apply. This is one important reason why the pinhole camera model of FIG. 1 has been found to be useful for a broad range of measurement applications.

In general, the process of focusing on a particular object for the simple optical system of FIG. 4 can involve a motion of either the lens, or the image viewing plane, or both, with respect to a fixed object. For endoscope measurement applications, where the object is considered to be inaccessible, one cannot be considered to have control over the distance between the lens and the object. To focus on an object in these applications, the projection distance must be changed by moving the image viewing plane with respect to the principal plane of the lens. Then, according to Equation (7), when i changes, so does the magnification of the image. One can visualize this directly from FIG. 4, since it is clear that if one were to move the image viewing plane to the position where the farther object point is in focus, the height of the image would be smaller.

It is useful to examine in detail what happens to the perspective measurement if the projection distance is not determined precisely, because the effects are not the same as in standard, two-dimensional, optical metrology.

Figure 5:
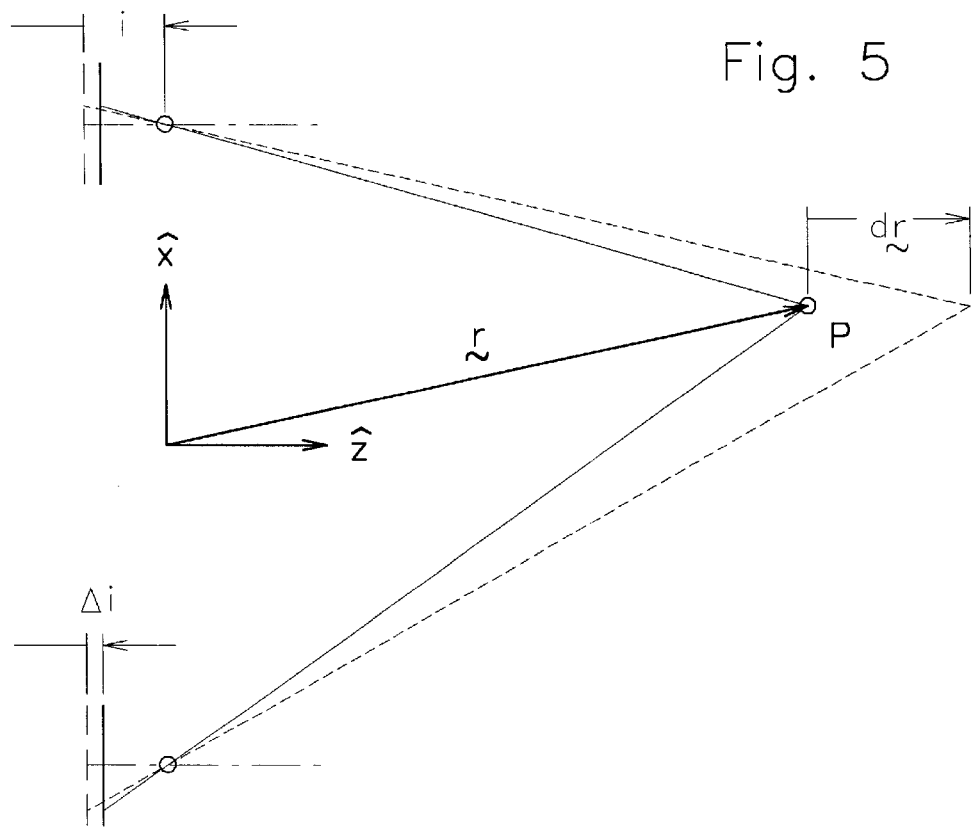
FIG. 5 shows the range error made in perspective dimensional measurement when the camera projection distance is in error.

In FIG. 5 is depicted a simplified perspective measurement situation. A point P at three-dimensional position $\vec{r}$ is viewed by cameras located at two positions along the x axis. The optical axes of the cameras are denoted by dot-dash lines, perpendicular to their image viewing planes, which are mutually parallel. The nodal points of the camera lenses are denoted by open circles on these optical axes. The image viewing planes are believed to be at a distance i from the nodal points (that is, at the position indicated by the broken vertical lines) but are, in fact, at a distance Δi closer to the nodal point (at the position indicated by the heavy solid lines). Both i and Δi are considered positive to the left, and Δi is positive in this case because the projection distance is believed to be larger than it actually is.

The rays that travel from the point of interest, pass through the nodal points, and strike the image viewing planes are depicted as light solid lines. Because of the error in the projection distance, the height of the ray intersection at the image viewing plane is interpreted as shown by the rays depicted as broken lines. The rays actually strike the image viewing planes at smaller distances from the optical axis than they would if the these planes were in the correct positions; thus the range of the point is estimated to be larger than it actually is. The position error vector in this case can be expressed as:

$$\vec{dr} = \frac{\vec{dr}}{di}\Delta i = z_0 \frac{\Delta i}{i}\hat{z} \tag{9}$$

where $z_0$ is the range of the point.

According to Equation (9), there is no error in either the x or y components of the position of the point. Thus, there will be no error in the x or y components of any distances measured by the perspective measurement technique with the system of FIG. 5 due to errors in the projection distance. This is a unique property of the perspective dimensional measurement.

A more detailed analysis shows that these transverse errors will not be zero if the perspective displacement does not happen to be aligned perpendicular to the camera optical axes as was assumed in FIG. 5. However, the transverse errors remain much smaller than the range error for most cases of practical interest.

Using Equation (9), it is easy to see that when one measures any distance that has a z component, there will be a distance error proportional to that z component; in fact, the error in a measured depth will be simply $\Delta i/i$ times the depth. To make depth measurements accurate to 1 part in 10,000, for instance, one must know the value of the projection distance to that same level of precision.

One determines the value of i through use of the optical calibration procedure that was taught in Application 1. Thus, when making perspective measurements, one must in general perform an optical calibration whenever the imaging optical system is refocused, since the effective value of i depends on the focal state of the system.

In prior art technologies related to achieving constant absolute magnification, it is common to provide a transducer on the focus adjustment so that the state of focus of the optical system is determined. However, for the purposes of perspective dimensional measurement, the measurement of the focal state must be exceedingly precise to produce an accurate depth measurement, as has just been shown. Thus, if one were to rely simply on the use of a focus transducer to determine the focal state of a measurement system, that focus transducer would be expensive. Also, the prior art does not teach how to incorporate these data into the measurement. Thus, further purposes of the current invention are first, to either eliminate the need for a focus sensor or to reduce its cost, and second, to provide means of incorporating focal state data into the perspective measurement.

2. Description of a First Embodiment

Figure 6:
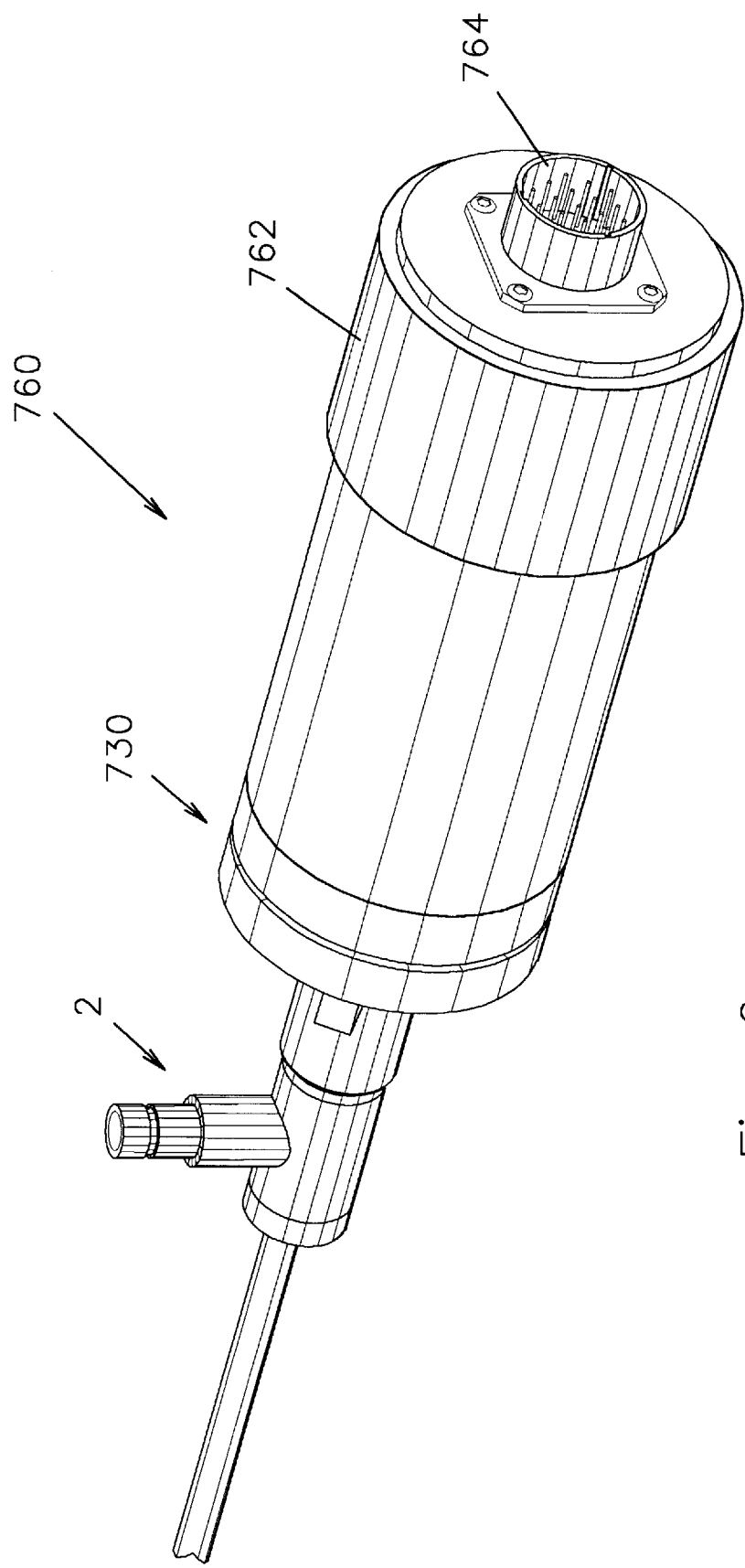
FIG. 6 is an overall perspective view of a first embodiment using a rigid borescope.

In FIG. 6 is shown an overall perspective view of a video borescope system that provides the ability to focus on objects of interest at various distances, while not requiring an optical calibration when the focus is changed. In the Figure, a rigid borescope 2 has attached at its proximal end a measurement mechanical interface 730 that in turn has attached at its proximal end a measurement video camera 760. Measurement video camera 760 includes on its outer surface a measurement focusing ring 762 and also a video connector 764. This improved video borescope system is meant to be used instead of the standard video borescope system in the perspective measurement system that was fully disclosed in the referenced co-pending applications.

While the ensuing discussion will be specific to the use of the invention with a rigid borescope, there is nothing that prevents my system from being used with a flexible endoscope as well, and such use is intended to lie within the scope of the present invention. As has been suggested by Konomura, U.S. Pat. No. 5,575,754 (1996), it is possible to make perspective dimensional measurements with a standard flexible endoscope if the endoscope is mounted in a rigidizing fixture.

Figure 7:
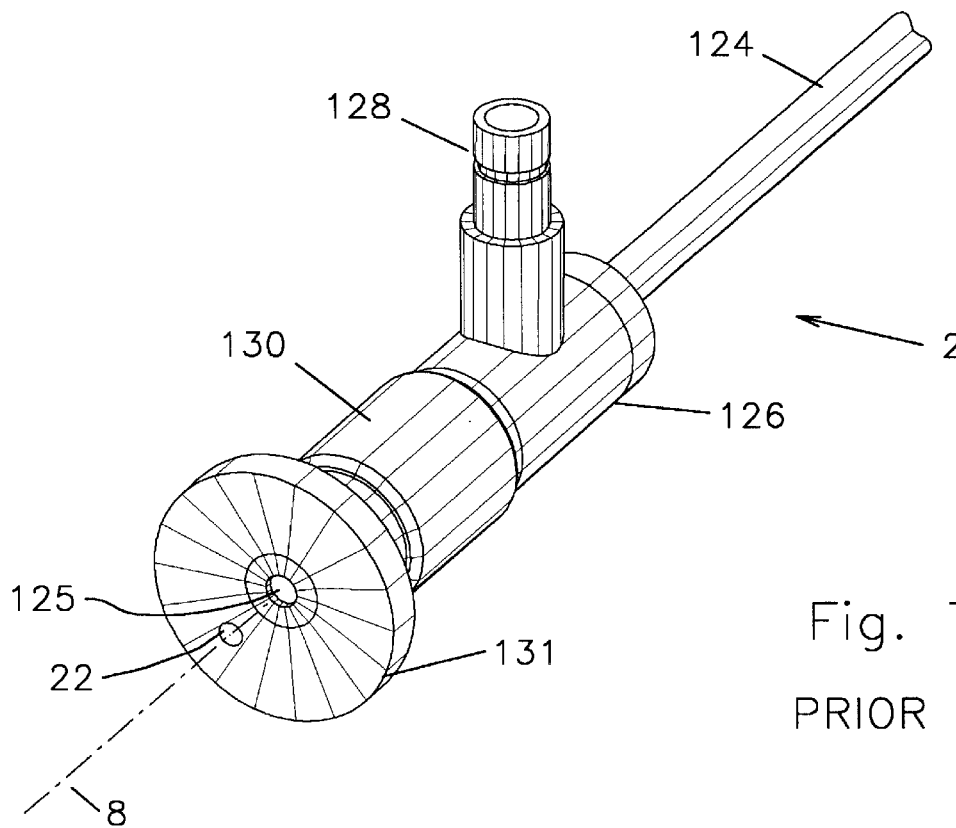
FIG. 7 is a perspective view of the proximal end of a typical rigid borescope, as prior art.

A detailed view of the proximal end of a typical rigid borescope 2 is depicted in FIG. 7. The majority of the length of borescope 2 comprises insertion tube or lens tube 124, of which only the most proximal portion is shown. Lens tube 124 is attached to a borescope body 126, which also holds an illumination connector 128. In use, a fiber optic cable (not shown) that conducts illumination from a source (not shown) is connected to connector 128 in order to provide illumination to the objects viewed by borescope 2. Also attached to body 126 is shown an optional internal focus ring 130, which is the focus adjustment provided by the manufacturer of borescope 2. During the operation of the present invention, this focus ring, if it exists, will be adjusted so that objects at infinity are approximately in focus, and then it will be left in that position. (By being focused at infinity, I mean that the apparent image seen through the borescope is at infinity when the object is at infinity. In other words, I mean that the borescope is set up as an afocal optical system.)

At the proximal end of borescope 2 is an eyecup 131, which serves to guide the user's eye to the appropriate position to best view the image provided by the borescope, and to block the user's view of other objects. The most proximal surface of the eyepiece lens, 125, is visible through a small aperture centered in eyecup 131. The borescope optical system has an optical axis 8 and it also provides a borescope exit pupil 22. The exit pupil is the image of the aperture stop of the borescope optical system formed by all of the optical elements that are proximal to that stop. For optimum viewing the user must position the iris of his or her eye near the plane of and centered on exit pupil 22, and eyecup 131 is meant to aid the user in this process.

Figure 8:
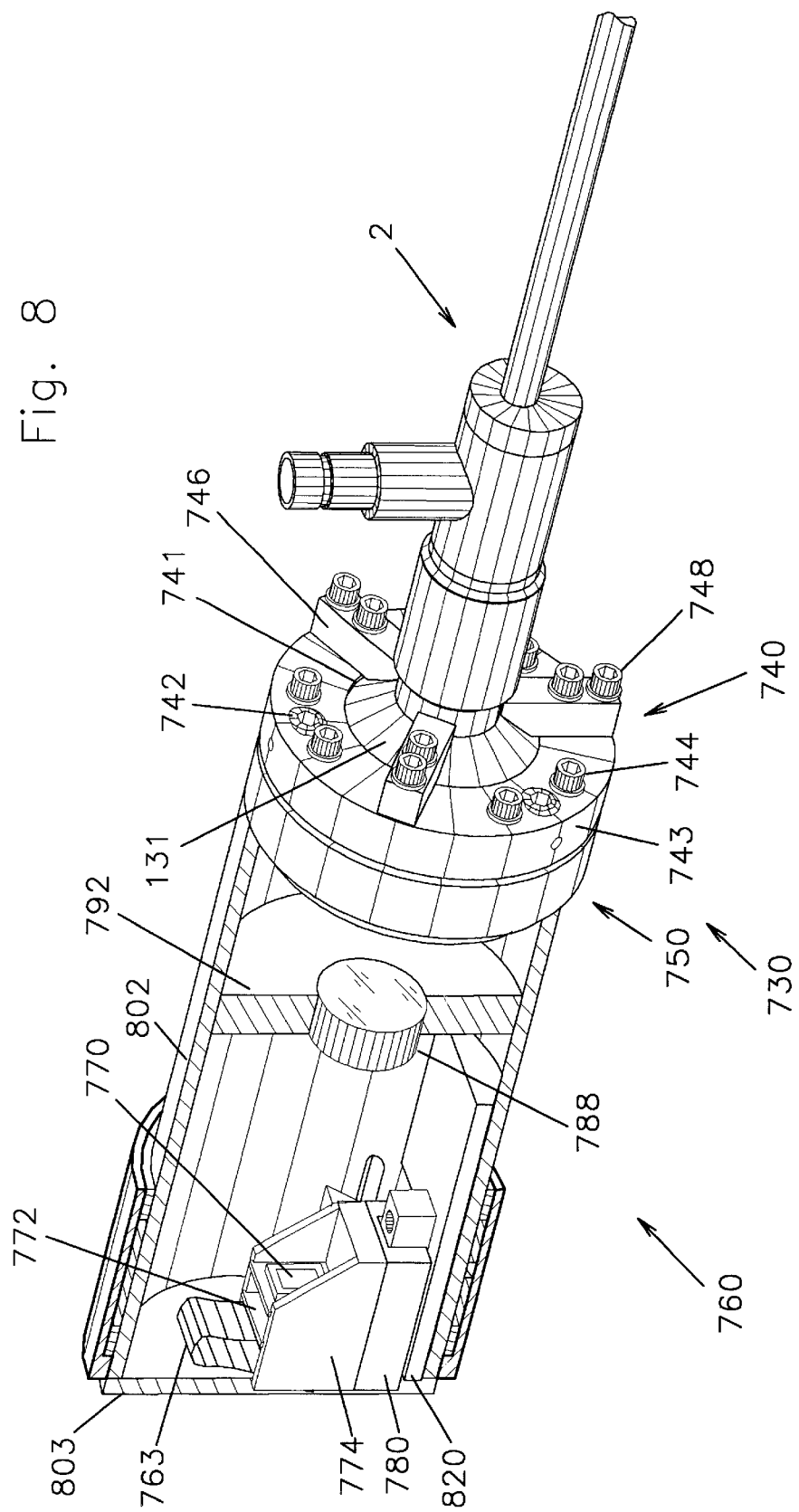
FIG. 8 is a perspective view showing the measurement video camera of the first embodiment, from the front, partially cut away.

FIG. 8 is a perspective view from the front of the video borescope system of FIG. 6. In FIG. 8 the envelope of video camera 760 has been partially cut away in order to show some of its internal structure.

Measurement mechanical interface 730 consists of two subassemblies; these are kinematic mounting plate assembly 740 and kinematic reference plate assembly 750. Eyecup 131 of borescope 2 fits into a machined recess 741 in plate body 743 of assembly 740. Eyecup 131, hence borescope 2, is securely attached to plate body 743 through use of three clamping lugs 746. Clamping lugs 746 are fastened to plate body 743 with clamping screws 748, thereby capturing and clamping eyecup 131 to mounting plate assembly 740.

Kinematic mounting plate assembly 740 is positioned with respect to and attached to a kinematic reference plate assembly 750 through the action of three kinematic adjusting screws 742 and six locking screws 744. This assembly will be described in more detail below.

Attached to kinematic reference plate assembly 750 by conventional means is a camera housing 802, which has been sectioned in FIG. 8. Housing 802 supports a stationary lens cell 792 that, in turn, supports a projection lens, 788. Lens cell 792 has been sectioned for clarity. Housing 802 also supports a mounting base 820. Base 820 has a bottom surface that contacts the inner cylindrical surface of housing 802 along two lines parallel to the axis of housing 802, to prevent any rocking of base 820 with respect to housing 802. Preferably, this is done by machining the bottom surface of base 820 to be cylindrical, but with a larger radius of curvature than the inner surface of housing 802. Camera housing 802 also supports a camera back plate 803.

Mounting base 820 supports a translation slide or translation stage 780. Mounted on translation slide 780 is a focal plane mounting bracket 774, within which is mounted a solid state image sensor or focal plane array 770 and a signal conditioning electronics board 772. Focal plane array 770 is a CCD, a CID, CMOS, or another suitable technology imaging array that can generate a video image of a pattern of illumination that falls on its face. Signal conditioning board 772 provides the necessary interface between the signals produced and required by array 770 and the video signals sent to and from a camera controller (not shown) that is connected by cable to connector 764 (FIG. 6). A flexible circuit cable 763 is attached to electronics board 772 to carry the video signals to connector 764 at the rear of the camera.

Figure 9:
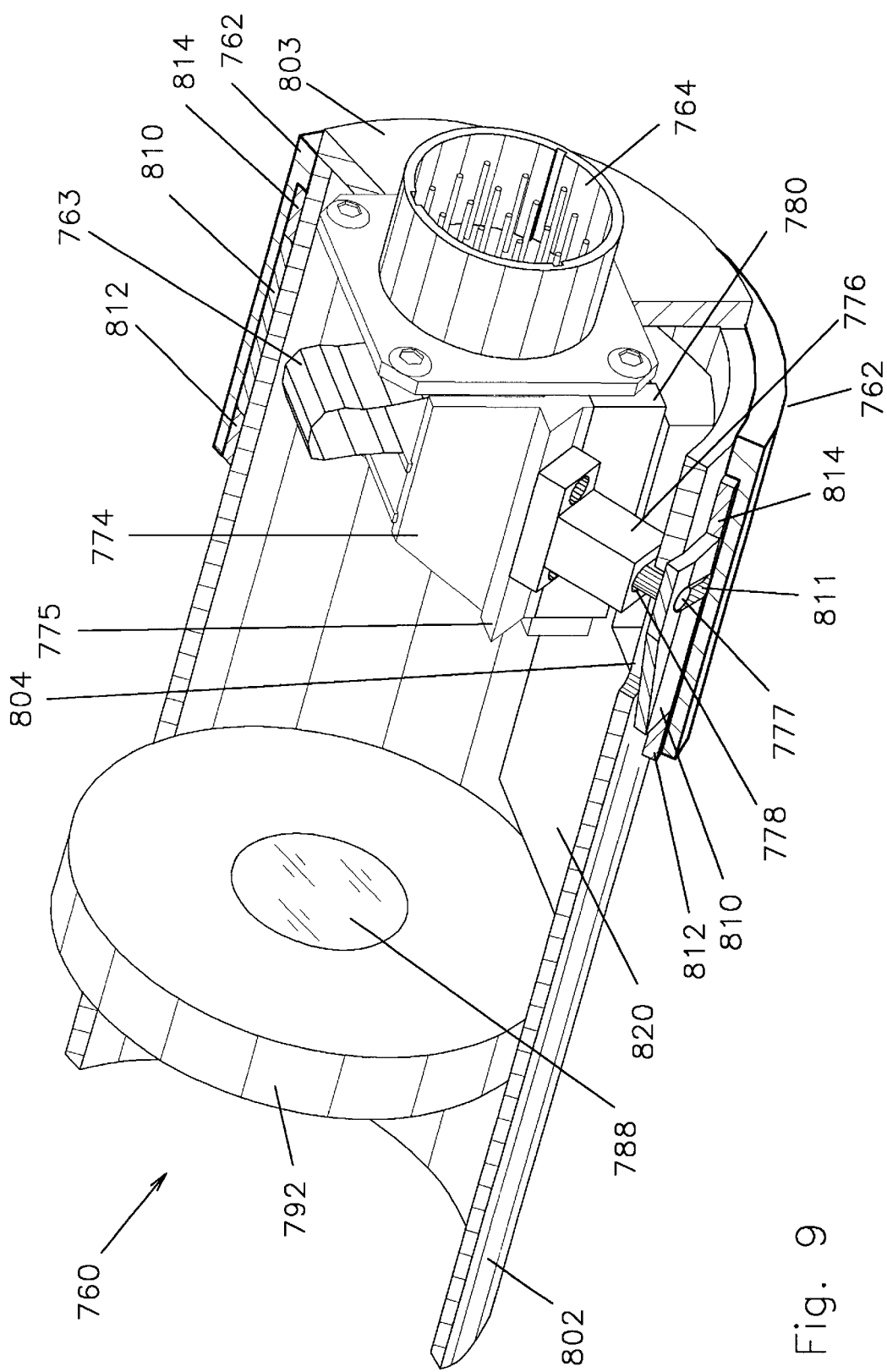
FIG. 9 is a perspective view of the measurement video camera of the first embodiment as viewed from the rear, partially cut away.

FIG. 9 is a perspective view showing the internal structure of measurement video camera 760 as viewed from the rear. Lens cell 792 and projection lens 788 are again shown, for reference. Focal plane mounting bracket 774 provides a receptacle boss 775, to which is attached a drive pin receptacle 776. Drive pin receptacle 776 contains a receptacle slot 778, which in turn contains a drive pin 777. Drive pin 777 extends through a positioning slot 804 that is machined into camera housing 802. (Slot 804 is better shown, but not identified, in FIG. 8.) This assembly allows one to control the axial position of translation slide 780 from the outside of housing 802 by controlling the position of pin 777.

Mounted on the outer diameter of housing 802 are successively from front to rear, a stop ring 812, a cam ring 810, and a pressure ring 814. All of these rings have been sectioned in FIG. 9 for clarity. Stop ring 812 and pressure ring 814 are fixedly attached to housing 802, so that they cannot rotate, while cam ring 810 is captured between stop ring 812 and pressure ring 814 so that it can rotate but cannot move along the axis of housing 802. Drive pin 777 extends through a helical cam slot 811 in cam ring 810, so that rotation of cam ring 810 is transformed to translation of drive pin 777 along positioning slot 804.

Measurement focus ring 762 is slideably mounted over housing 802 and rings 810, 812, and 814, so that it can be freely rotated. Focus ring 762 is also shown in section in FIG. 9 for clarity. Focus ring 762 is fixedly attached to cam ring 810 so that they are constrained to rotate together. This is preferably accomplished with a series of screws (not shown) around the circumference of focus ring 762 that pass through clearance holes in ring 762 and engage matching threaded holes in cam ring 810.

Video connector 764 is attached to back plate 803 of camera 760 and is attached to cable 763 through a suitable hole (not shown) in back plate 803.

Figure 10:
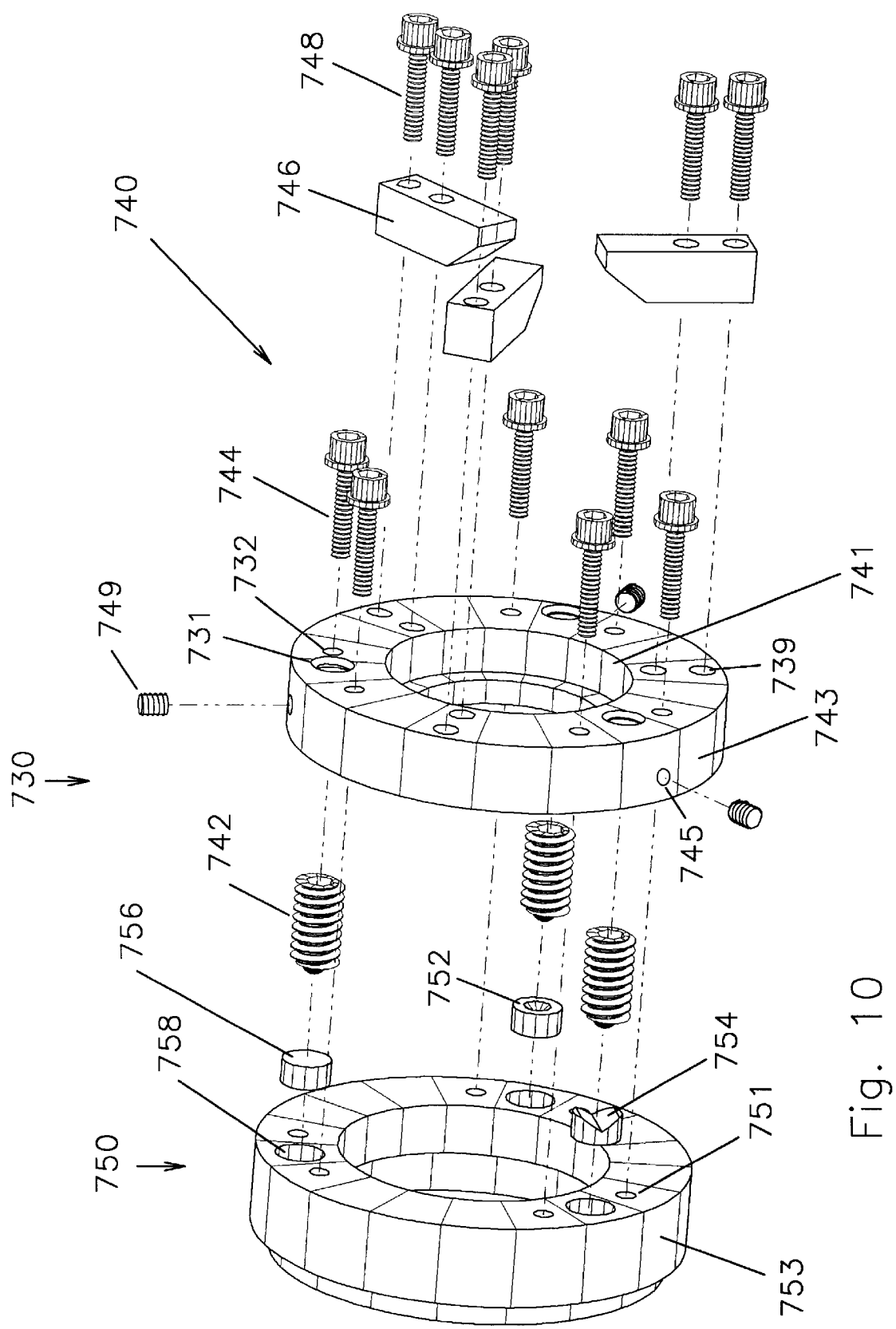
FIG. 10 is an exploded view of a measurement mechanical interface.

FIG. 10 shows an exploded view of measurement mechanical interface 730, which details the interconnection between kinematic reference plate assembly 750 and kinematic mounting plate assembly 740. Plate body 743 of mounting plate assembly 740 contains a machined recess 741, for capturing the eyecup of the borescope. Body 743 also contains three threaded through holes, 731, six clearance holes, 732, and six threaded through or blind holes 739. Threaded holes 731 contain adjusting screws, 742. Six locking screws 744 pass through clearance holes 732. Three clamping lugs, 746, are attached to body 743 with six clamping screws, 748. Lugs 746 secure the eyecup of the borescope to body 743, and hence to mounting plate assembly 740.

Plate body 753 of kinematic reference plate assembly 750 attaches at the left hand side of FIG. 10 to the distal end of camera housing 802 (not shown) by conventional means, such as a matching pair of threaded cylindrical surfaces. Plate body 753 contains three reference mounting recesses, 758, into which are interference fit or adhesively bonded three reference surfaces fabricated from a hard material, such as heat treated high-carbon steel. These references surfaces are a reference cone 752, a reference Vee 754 and a reference flat 756. The rotational orientation of reference Vee 754 is such that the axis of reference Vee 754 is aligned with the center of reference cone 752 as shown. Plate body 753 also contains six blind threaded holes, 751, into which locking screws 744 are threaded.

The relative positions of mounting plate assembly 740 and reference plate assembly 750 are controlled by the positions of the three hardened ball-end adjusting screws 742. The ball end of each one of the screws 742 contacts one of the reference surfaces in plate assembly 750. Three locking set screws, 749, which are held in matching threaded holes 745 in mounting plate body 743, and that intersect holes 731, secure the rotational alignment of adjusting screws 742. Assemblies 740 and 750 are pulled together by the action of the six locking screws 744, which work in opposition to the adjusting screws 742, thus forming a rigid assembly when screws 744 are tightened.

It is preferred that the hardness of reference cone 752, reference Vee 754, and reference flat 756 be somewhat greater than the hardness of the ball ends of adjusting screws 742.

Figure 11:
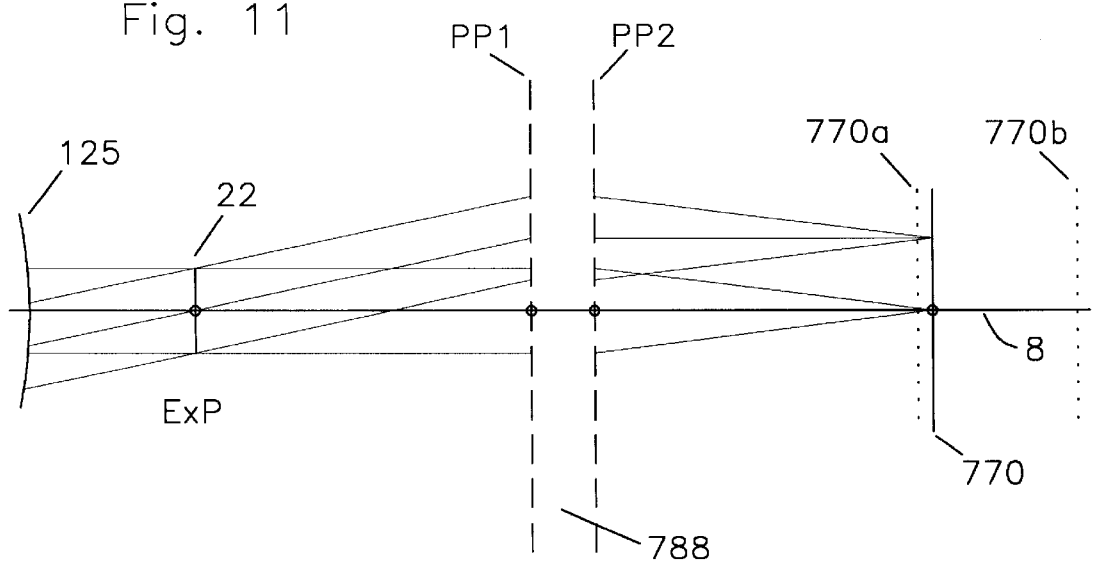
FIG. 11 is an optical layout of the measurement video camera of the first embodiment.

The layout of the optical system of this first embodiment is depicted in FIG. 11. A lens surface, 125, represents the most proximal surface of the eyepiece lens of the borescope. Then, successively to the right along optical axis 8 are depicted borescope exit pupil 22, projection lens 788 with front and rear principal planes PP1 and PP2, and the image sensing surface of focal plane array 770. Also indicated are extreme axial positions 770a and 770b that the sensing surface of array 770 may take due to the action of translation slide 780 (FIGS. 8 and 9). The range of motion includes a position slightly inside of the rear focal point of lens 788.

Exit pupil 22 lies approximately 12 to 20 mm behind lens surface 125, depending on the optical and mechanical design of the borescope being used. When the system is aligned as discussed below, projection lens 788 is mounted so that its front focal point lies in the plane of exit pupil 22, as shown in FIG. 11.

3. Operation of the First Embodiment

3a. Electronics

Focal plane array 770 and signal conditioning electronics board 772 (FIG. 8) combine to produce a video signal that is conducted to the camera controller (not shown) as has been described. The camera controller outputs a standard video signal for display, which is also used for measurement processing as taught in Application 1. For use with the perspective measurement system this standard video signal is preferably RS-170 video if black and white or so-called "S-video" if color. Higher resolution and digital video systems are becoming more common, and can also be used to give more precise measurements, at higher cost. As video technology advances, more and more of the video system is being integrated onto focal plane array 770, and less and less is required on signal conditioning electronics board 772 and in the camera controller. Some current implementations may require multiple circuit boards for signal conditioning electronics, while others are currently available in CMOS technology that can eliminate signal conditioning board 772 completely.

3b. Optical System

It is known that placing a projection lens behind the exit pupil of a borescope allows one to reimage what is viewed through the borescope onto an image viewing plane, such as solid state focal plane array 770 (FIG. 11). This is exactly what is done in standard video borescope systems. The focal length of lens 788 is chosen to project an image of the apparent field of view (that is, the field seen by the user when looking into the scope) onto the sensitive area of focal plane array 770, at the size desired for the application. (The focal length of lens 788 multiplied by the tangent of the half angle of the apparent field of view equals the radius of the illuminated area on the image sensor.)

As stated previously, the exit pupil of a borescope is an image of the aperture stop of the borescope optical system. Thus, rays from an object point at infinity form a parallel bundle at the exit pupil, when the borescope is set up as an afocal system. This bundle of rays will be focused by projection lens 788 onto image sensor 770 when the sensor is located at the back focal plane of lens 788. If the object is at a distance closer than infinity, the ray bundles will be diverging at the exit pupil, and lens 788 will focus them at some distance further away than its back focal plane. Thus, sensor 770 is provided with a range of motion that extends from the back focal plane of lens 788 to some further distance that depends on the closest object upon which one desires to focus. In detail, the relationship between the maximum axial position of sensor 770 and the closest in-focus object distance depends on the optical design of the borescope and the focal length of lens 788 through the following relationship:

$$FD = \frac{M_B^2 f_p^2}{z - z_{EntP}} \qquad (10)$$

where FD is the distance between the position of sensor 770 and its position when an object at infinity is in focus, z is the in-focus position of the object along the optical axis, $z_{EntP}$ is the position of the entrance pupil of the borescope along the optical axis, $f_p$ is the focal length of the projection lens, and $M_B$ is the paraxial angular magnification of the borescope. The entrance pupil is simply the image of the aperture stop of the borescope as viewed from the object side of the scope. The paraxial angular magnification of the borescope and the other quantities used in Equation (10) will be explained in more detail in the discussion of the operation of the second embodiment.

Image sensor 770 is also provided with the capability to move closer to lens 788 than one focal length of that lens in case the borescope happens to be focused on objects somewhat closer than infinity. This enables the system as a whole to be focused on objects at infinity even when the borescope itself is not.

It can be shown that the optimum way to make a perspective dimensional measurement between two points on an object is to focus the optical system on the point that is at the larger range before making the measurement. The reasons are that the dominant source of random error in the perspective measurement is the feature extraction or "pointing" error, that this error increases proportionally to the range, and that it is then the location of the more distant point that determines the random error in a perspective dimensional measurement.

Lens 788 is often chosen to be an achromatic doublet, because that type of lens can give adequate optical performance for this application, when the apparent field of view of the borescope is 10 to 12 degrees, which is typical. For use with scopes of particularly high optical quality, and with high resolution video image sensors, it may be necessary to use a more complex lens for 788, in order to get the full benefit of these features. As will be explained below in Section 5, with borescopes that have a large amount of particular types of optical aberration, one may wish to correct for those aberrations with lens 788, to obtain a higher accuracy in the perspective measurement than otherwise would be obtained. In these cases it may also be necessary to use a more complex design for lens 788. Of course in any case the clear aperture of lens 788 must be large enough to transmit the extreme rays from the edge of the field of view (FIG. 11).

Because lens 788 is mounted exactly one focal distance away from the exit pupil of the borescope, the cones of rays from different points in object space (FIG. 11) that are focused by lens 788 have the property that their axes are parallel to the optical axis. This condition is called telecentricity, and it is important to making accurate perspective dimensional measurements with this embodiment.

3c. Telecentricity and the Perspective Measurement

In the analysis given above in Section 1 regarding the variation of image magnification with focal state of the system it was assumed that the system aperture stop is coincident with the principal plane of the imaging lens (FIG. 4). This is almost universally assumed in the fields of perspective dimensional measurements and in similar measurements made in the fields of machine vision and photogrammetry; however, it is not usually exactly the case in reality. The cone of light that forms the blur spot in FIG. 4 will be determined by the location and size of the aperture stop that actually exists in a system.

Figure 12:
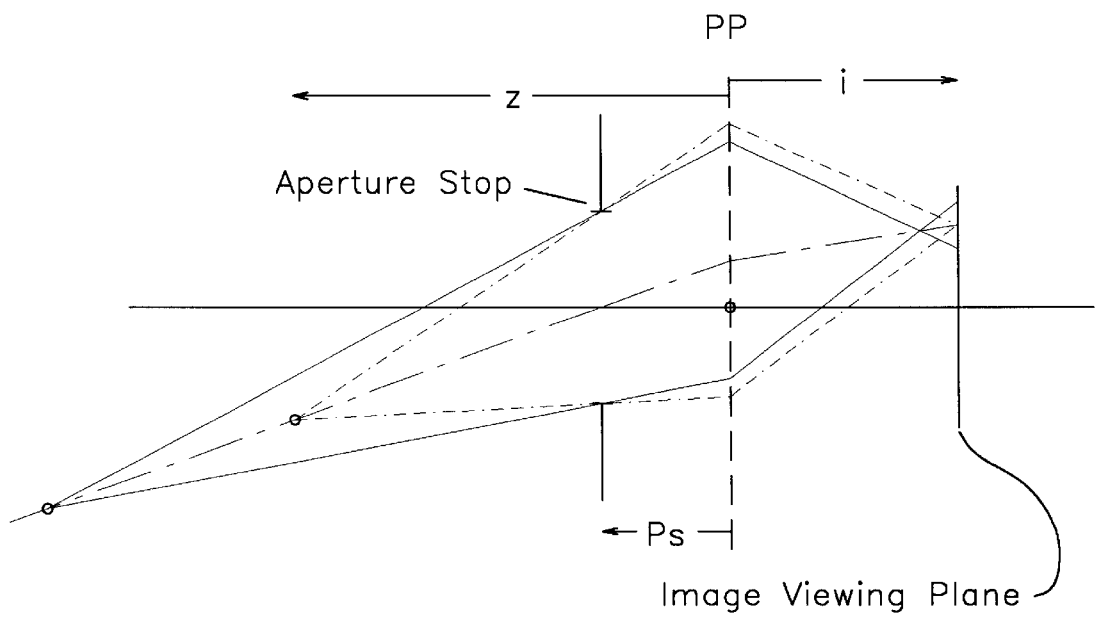
FIG. 12 shows the image blur formed when an aperture stop is not located at the principal plane of a lens.

FIG. 12 shows the case where the aperture stop is displaced axially to lie in front of the principal plane of the lens by a distance $P_s$. The line of symmetry for the ray bundle no longer coincides with the nodal ray; thus, the nodal ray is not shown in FIG. 12. The new line of symmetry, which by definition passes through the center of the aperture stop, is called the chief ray. All object points, no matter what the distance from the lens, which lie along the chief ray have image blur spots with centroids located at the same height on the image viewing plane. This characteristic is no longer true for points lying along a nodal ray.

It is still the case that a ray that passes through the nodal point of the lens is undeviated, so that if a nodal ray has an angle α in object space, it will have angle α in image space. It is still the case that the nodal ray strikes the image viewing plane at a height of i tan α. However, unless the object point happens to be in focus at the image viewing plane, the centroid of the blur spot is not located where the nodal ray strikes. If an object at distance z is in focus at the image viewing plane, then the magnification of the image is given by Equation (7). If the object is not in focus, Equation (7) no longer applies to the centroid of the image blur spot from an object point of interest.

One can define a chief ray magnification for the situation depicted in FIG. 12. This is the height of the intersection of the chief ray on the image viewing plane (with respect to the optical axis) divided by the height of the object point that is the source of the ray. The chief ray magnification for FIG. 12 is:

$$M_{cr} = \frac{h_{icr}}{h_{ocr}} = \frac{P_s\left(\frac{i}{f} - 1\right) - i}{z - P_s} = \frac{i\left(\frac{P_s}{f} - 1\right) - P_s}{z - P_s} \quad (11)$$

where z is the distance of the object from the principal plane of the lens. Since the blur spot is symmetrical about the chief ray, Equation (11) is an expression for the magnification of the image, whether or not the image is in focus. The quantity in Equation (11) could correctly be simply called the "magnification", but I prefer to use the term "chief ray magnification" to make it explicit that the expression applies whether or not the image is in focus.

If $P_s$ is zero, then $M_{cr} = -i/z$, in agreement with Equation (7). If an object at distance z is in focus at the image viewing plane then:

$$i = \frac{zf}{(z-f)} \quad (12)$$

$$M_{cr} = -\frac{f}{(z-f)} = -\frac{i}{z}$$

which also agrees with Equation (7). Thus, for an in-focus object point, the height of the image does not depend on the position of the aperture stop.

Note that if $P_s = f$, then $$M_{cr} = -\frac{f}{(z-f)},$$

which is the same result as if the object were in focus. In this latter condition, the magnification depends on the distance of the object, but it does not depend on the projection distance. This is called the telecentric condition. To be even more specific, the condition described here is referred to as being telecentric on the image side of the system. Another way to think about this is that the image of the aperture stop, as seen from the image viewing plane, is located at infinity when the system is telecentric. That is, the exit pupil of the optical system as a whole is at infinity if the system is telecentric on the image side.

Thus, one may see that in this more generalized optical system, the height of the image is no longer directly controlled by the projection distance, i. The important quantity for perspective measurements, and any other type of optical metrology, is now the chief ray magnification.

It is important to note that Expression (11) applies whether $P_s$ is positive or negative. If $P_s$ is negative, then it is not the position of the aperture stop that it represents, but instead the position of the entrance pupil of the optical system. If $P_s$ is negative the system can be telecentric on the image side if the focal length of the lens is negative.

In general, the chief ray magnification of Equation (11) can be written in the form:

$$M_{cr} = \frac{c_1 i - c_2}{z - c_2} \quad (13)$$

where $c_1$ and $c_2$ are constants in the optical system of FIG. 12. Comparing the denominator of Equation (7) to that of Equation (13) one can see that the term $c_2$ simply represents a change in origin of the coordinate system. If this change in origin is constant throughout the calibration and measurement processes, then it won't cause difficulty. Likewise, if $c_1$, $c_2$ and i are all constant, then Equation (13) reduces to a constant divided by a distance, which is exactly the form of Equation (7). Thus, as long as everything in the system is held constant, the basic imaging model of Equations (4) to (7) is adequate. However, that model is not adequate when the internals of the optical system are changed, for instance, when focusing on objects at different distances, and an accurate measurement is required.

If, in a general optical system, the quantity $c_2$ in Equation (13) is constant, then the range dependence of the magnification of the system is independent of focal state. Thus, the condition expressed by Equation (1) is then satisfied, and the focal state dependent part of the magnification can be considered to be a relative magnification. In this case, the chief ray magnification for any focal state can be determined if it has been determined for one focal state and if it has also been determined how the quantity $c_1 i$ in Equation (13) varies with focal state.

If the quantity $c_1 i$ is also independent of the system focal state, then I refer to that condition as constant relative magnification. Clearly, the telecentric condition described here provides constant relative magnification, because $c_1 i = 0$. The advantage of constant relative magnification is that the magnification of the image does not depend on the focal state, thus the measurement result is independent of whether the object is in perfect focus.

In this first embodiment, projection lens 788 is arranged to be located one focal length away from the exit pupil of the borescope, so that the combined system is telecentric on the image side, and therefore the magnification of a fixed object is constant, and does not depend on the projection distance, and yet the projection distance can be changed to focus on objects at various distances from the borescope.

In their previously referenced paper, "Telecentric Optics for Computational Vision", Watanabe and Nayar teach the use of an aperture at the front focal plane of a camera lens in order to achieve telecentricity. Here, I teach that telecentricity can be produced by placing a lens one focal length away from the exit pupil of a borescope. In the prior art of borescope video adapters, the focus adjustment (if any) is always made by moving the lens along the optical axis. Here I teach that it is the image viewing plane which should be moved in order to focus the image. This latter condition is a requirement for a telecentric optical system to exhibit a constant relative magnification. This point will be discussed further in connection with additional embodiments of the invention.

3d. Opto-mechanical System

In FIG. 9, measurement focus ring 762, cam ring 810, helical cam slot 811, positioning slot 804, drive pin 777, drive pin receptacle 776, receptacle boss 775, focal plane mounting bracket 774, and translation slide 780 cooperate to determine the axial position of focal plane array 770. Pin 777 is contained in a tangential slot 778 in receptacle 776, so that any errors in the orientation of positioning slot 804 relative to the translation direction of slide 780 simply move the pin along the length of the slot so as to avoid any binding of the mechanism. The width of tangential slot 778 in receptacle 776, the width of helical slot 811 in cam ring 810, and the width of positioning slot 804 in camera housing 802 are all controlled relative to the diameter of pin 777 in order to hold the backlash of the positioning system to an acceptable level.

Translation slide 780 gives a motion that is accurately constrained to a straight line translation. This is important to maintain measurement accuracy, as will be discussed further below. Of course, accuracy is a matter of degree, and other known systems that provide an axial motion for lens 788 can be used as long as the measurement accuracy requirements for a given application are met.

To give accurate measurement results when focused on objects at various distances, the system must be accurately telecentric. The distance between exit pupil 22 and projection lens 788 (FIG. 11) can be adjusted to achieve this condition by loosening locking screws 744 (FIG. 8), rotating all three kinematic adjusting screws 742 by the same amount, and then tightening screws 744. A method for determining when this condition has been achieved is disclosed below. It is preferred that locking screws 744 be tightened to the same specific torque each time the relative positions of mounting plate assembly 740 and reference plate assembly 750 are adjusted.

Kinematic reference plate assembly 750 and kinematic mounting plate assembly 740 together form a kinematic mounting system between measurement camera 760 and the borescope 2 (FIGS. 6 and 10). The term kinematic means that exactly six degrees of freedom of relative motion are constrained. The ball end of one adjusting screw 742 captured in reference cone 752 constrains three degrees of freedom. A second ball captured in Vee 754 constrains an additional two degrees of freedom, and the tolerances on the locations of the screws relative to the reference surfaces are very loose when the Vee is oriented with its axis passing through the center of the cone. The third ball located by reference flat 756 constrains the final single degree of freedom, once again with very loose tolerances on positions.

The importance of the kinematic condition is that there is exactly one and only one stable relative position between the camera and the borescope. This further means that the camera can be removed from the borescope and later replaced at exactly the same relative position and alignment, as long as mounting plate assembly 740 remains attached to the borescope. Thus one can continue to use the borescope for visual observations, as long as mounting plate assembly 740 and adjusting screws 742 do not interfere with the user placing his eye at the exit pupil. Clearly, this advantage would apply for a non-focusing camera as well as the focusing camera disclosed here.

Use of a kinematic means for mounting of camera 760 to borescope 2 also implies that a series of borescopes can be used with a single camera. That is, a set of borescopes of different fields of view, working lengths, diameters, and viewing angles can be acquired and each of them can be fitted with a kinematic mounting plate assembly 740. Then, camera 760 can be mounted to each in turn, and the camera can be aligned using adjusting screws 742 in the mounting plate assembly 740 attached to each individual scope. Once these individual assemblies are calibrated, the camera can be attached to whichever borescope best suits the present measurement need, and accurate measurements can be made without further calibration. All that is required is that one maintain records of the optical and alignment parameters for each combination of borescope and camera. To cover the video frame with the field of view of each borescope, one would want all of the borescopes used to have reasonably equivalent apparent fields of view. One could take different eye reliefs of the various scopes approximately into account by providing mounting plate bodies 743 of thicknesses specific to each type. One would select the thickness of each mounting plate to bring the rear surface of mounting plate body 743 to a predetermined axial position with respect to the exit pupil of each scope.

In an application where a number of scopes are used with a camera and where they are often interchanged, it may be preferred to use a quick disconnect arrangement to attach mounting plate assembly 740 to reference plate assembly 750 rather than the locking screw system shown in FIG. 10. This is not preferred for general use because of the higher cost.

If the tilt between mounting plate assembly 740 and reference plate assembly 750 may become large because of misalignments in the borescope (as discussed below), one should use self-aligning spherical washer sets under the heads of locking screws 744.

Screws 742 are shown in FIGS. 8 and 10 to be equally spaced on a circle, thus the screws are located 120 degrees apart. Another arrangement that can be used is to provide a 90 degree included angle at one corner of the triangle formed by the locations of the screws. This makes the tilt adjustments orthogonal, but the assembly is then less stable mechanically than with the equally spaced arrangement. It is possible to make orthogonal tilt adjustments with the configuration shown; doing this simply requires that two screws along a leg be adjusted by equal and opposite amounts in order to make a tilt adjustment that is orthogonal to the tilt created by the third screw.

If the internal focus of the borescope, as controlled by focusing ring 130 (FIG. 7), is not stable, focusing ring 130 needs to be clamped in position to maintain system calibration. In fact, it is a good idea to clamp it in any case, to prevent inadvertent changes that could ruin the calibration of the system.

The technique shown for attachment of the borescope to the camera in FIG. 8 is suitable for the classic style of borescope construction depicted in FIG. 7. However, this technique relies on the stiffness of the borescope body and eyecup structure to support the measurement camera. Newer borescopes are not always built with a suitably rigid mechanical structure, but their optical systems are often considerably improved over the classic designs. A borescope clamp, suitable for attaching a measurement camera to such a modern borescope is shown in perspective view in FIG. 13, and in an exploded view in FIG. 14.

Figure 13:
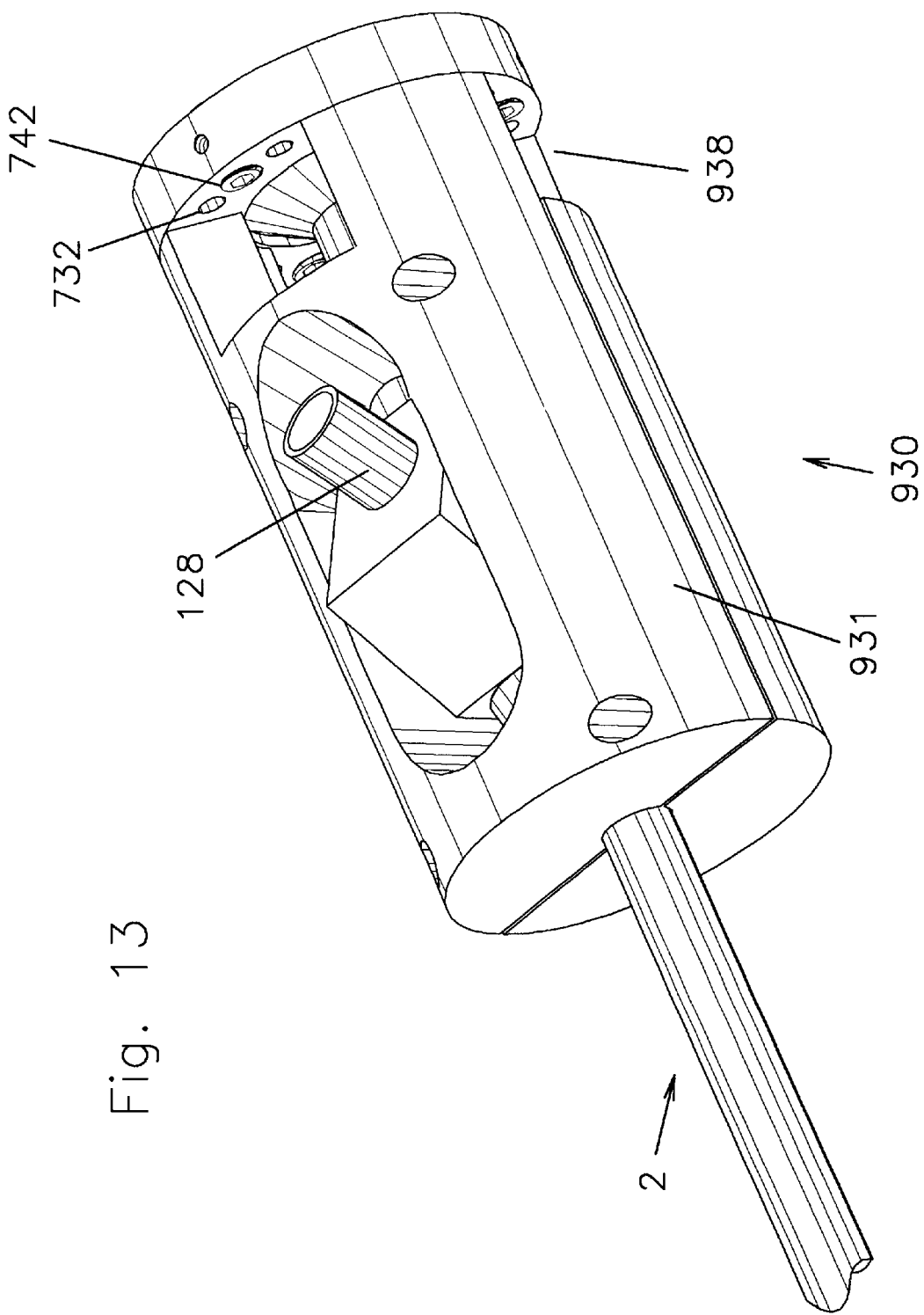
FIG. 13 depicts the use of an alternate means of providing for attachment of an accessory camera to a borescope, especially suitable for modern borescopes with molded bodies.
Figure 14:
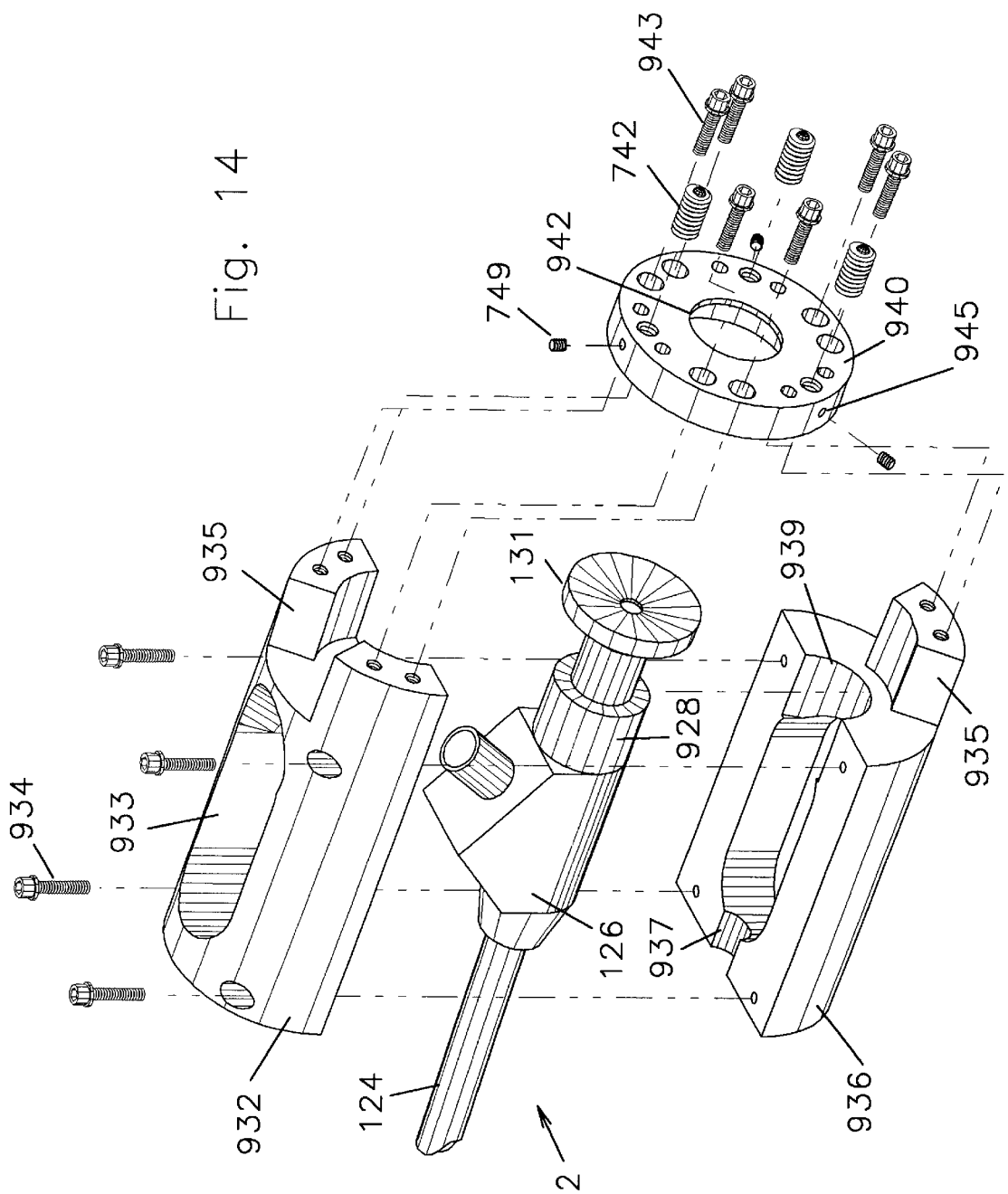
FIG. 14 shows an exploded view of the attachment means and borescope of FIG. 13.

In FIG. 14 is shown a modern borescope 2, with a lens tube 124 and a molded body 126. The particular borescope model depicted has also a molded cylindrical body extension 928 and a molded eyecup 131. Borescope body 126 supports a conventional fiber optic connector 128 (FIG. 13). For the particular modern scope shown, connector 128 is not oriented perpendicular to lens tube 124.

Borescope clamp 930 (FIG. 13) comprises three major parts; these are a clamp upper half, 932, a clamp lower half, 936, and an end plate, 940. Shown in clamp lower half 936 are a lens tube clamping surface, 937, and a body extension clamping surface, 939. There are matching surfaces in the clamp upper half, 932, which cannot be seen in either Figure. When the clamp halves are drawn together with clamping screws 934, clamping surfaces 937 and 939 contact the mating surfaces of borescope 2 to secure the position of the borescope with respect to the clamp 930.

Clamp upper and lower halves 932 and 936 provide a set of plate mounting bosses, 935. After the borescope is clamped, end plate 940 is mounted to these bosses with attaching screws 943. The heads of screws 943 fit into counterbored recesses in end plate 940. End plate 940 also provides threaded holes for kinematic adjusting screws 742 that are used in conjunction with kinematic reference surfaces on a measurement camera as was previously described. End plate 940 also provides clearance holes 732 (FIG. 13) for locking screws (not shown) that work in conjunction with adjusting screws 742 as previously described, and also provides threaded holes 945 for locking set screws 749.

Finally, end plate 940 provides an aperture, 942, which allows light from borescope 2 to pass through plate 940, but which also blocks stray light from getting past eyecup 131 into a measurement camera.

Plate mounting bosses 935 are sized to provide a set of wrench access gaps, 938, (FIG. 13) which allow one to access the heads of adjusting screws 742 and of the locking screws that attach the clamp 930 to a measurement camera.

Clamp upper half 932 provides an illumination clearance aperture, 933, which allows access to fiber optic connector 128 from the outside while borescope 2 is clamped inside the assembly.

In Application 2, I taught how a cylindrical reference surface mounted to a borescope can be used to eliminate routine alignment calibrations in a perspective dimensional measurement system that uses a standard borescope. As shown in FIG. 13, the outer surface, 931, of clamp 930 could be used as this cylindrical reference surface. For this application the relative locations of the upper and lower halves of clamp 930 should be precisely controlled by a set of dowel pins with matching holes in each half. In addition, the separation of the two halves should be controlled by providing precision spacers between the two halves, so that the outer surface of the assembled clamp is precisely cylindrical. Thus, it will also be necessary to also provide an internal adjustable clamping mechanism to securely clamp borescope body 126 inside of clamp 930. This could be as simple as several set screws in each half of clamp 930 that contact appropriate portions of borescope 2. In any case, the requirement is simply to locate borescope 2 securely with respect to clamp 930. The alignment of the measurement camera to the borescope is then just the same as described below.

In this regard, one could also use a portion of the outer surface of measurement video camera 760 (FIG. 6) as the cylindrical reference surface for eliminating routine alignment calibrations.

4. Alignment of the First Embodiment

4a. Introduction

To achieve telecentricity, projection lens 788 must be brought to an axial position such that its front focal point lies in the plane of the borescope's exit pupil FIG. 11). As previously described, this is done by translating the entire measurement camera 760 using adjusting screws 742. In addition, one must also achieve a particular transverse alignment between the measurement camera and the borescope in order to make accurate perspective dimensional measurements with the combined system. Both of these conditions are achieved by a process of alignment of measurement camera 760 with respect to the borescope.

Figure 15:
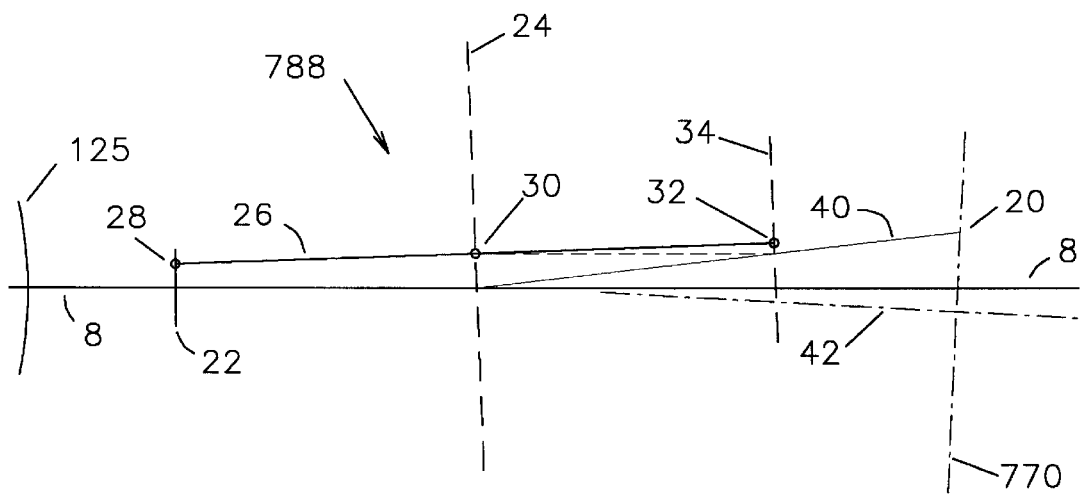
FIG. 15 depicts the layout of the optical system of the camera of the first embodiment including the effects of decenters and tilts.

The effects of transverse misalignments in camera 760 are illustrated in FIG. 15. FIG. 15 again shows the layout of the optical system of the measurement camera as attached to the borescope, but in this case lens 788 is depicted as a thin lens and there are shown errors in the alignment of the system. In FIG. 15, lens 788 comprises a front focal point 28, an optical axis 26, a principal plane 24, a nodal point 30, a rear focal point 32 and a back focal plane 34. Lens 788 has been placed at an axial position such that front focal point 28 lies in the plane of borescope exit pupil 22. Taking the borescope optical axis 8 as the reference, FIG. 15 shows how lens 788 will in general be both decentered and tilted with respect to the reference. Because of these alignment errors, a chief ray from a point in the center of the field of view, that is system optical axis 40, is refracted by the lens so that it is not parallel to either the optical axis of the lens, 26, or to the optical axis of the borescope, 8.

In FIG. 15 the image sensor, 770, is also decentered with respect to reference axis 8, and, in addition, the translation axis 42 of the sensor is tilted. Because lens front focal point 28 is assumed to lie in the plane of exit pupil 22, the magnification of the image formed by lens 788 is independent of the position of focal plane array 770 along axis 42. However, the position of a central image point, 20, on the image sensor varies with the axial position of sensor 770, since optical axis 40 is not parallel to axis of translation 42. This is a problem for the perspective measurement system because the position of the system optical axis on focal plane array 770 changes with focus, and one must know where the optical axis is in order to correctly account for the distortion in the image.

The requirement to know the position of the optical axis is also the reason for using a translation stage to control the axial motion of lens 788. The translation stage provides motion that is accurately constrained to a straight line. Once the system is properly aligned, the optical axis will shift only a negligible amount as the focal state of the system is adjusted by moving lens 788.

4b. Adjustment of Camera Axial Position; Determination of Relative Magnification To determine when the axial position of the camera is correct, that is, when the front focal point of the projection lens lies in the plane of the borescope's exit pupil, one examines the image positions of two or more object points, and adjusts the lens position until the distances between the images of the points do not vary with the position of the image sensor. That is, the adjustment ensures that the relative magnification of the image remains constant as the focal state of the system is varied.

One must carefully consider the effect of measurement noise on this process. No matter how one determines the positions of points in an image, whether by alignment of video cursors as was taught in Application 1, or by determining the centroids of target points by processing digital images as is described in much of the prior art in machine vision, one will have some uncertainty in the position of an image point. This means that in any comparison of the magnification of one image with respect to another, there will be error. The calibration should enable one to set the magnifications to be identical to a higher accuracy than one expects to achieve with production measurements.

The standard deviation of the position of an image of an object point can be expressed in any number of ways, for instance, as a physical distance in the image viewing plane or as a distance in the output units of the image processing device. This standard deviation is determined by making a series of test measurements where the image positions of a set of fixed object points are repeatedly determined with an unchanging experimental setup. No matter what image position output units are used, an invariant dimensionless quantity that I call the relative position measurement error can be defined. The relative position measurement error is the ratio of the standard deviation of the image position measurement to the full range of possible image positions. Since this quantity is dimensionless, and since position in the image represents a particular pair of angles in the camera's field of view, I consider the relative position measurement error to be an angle.

Figure 16:
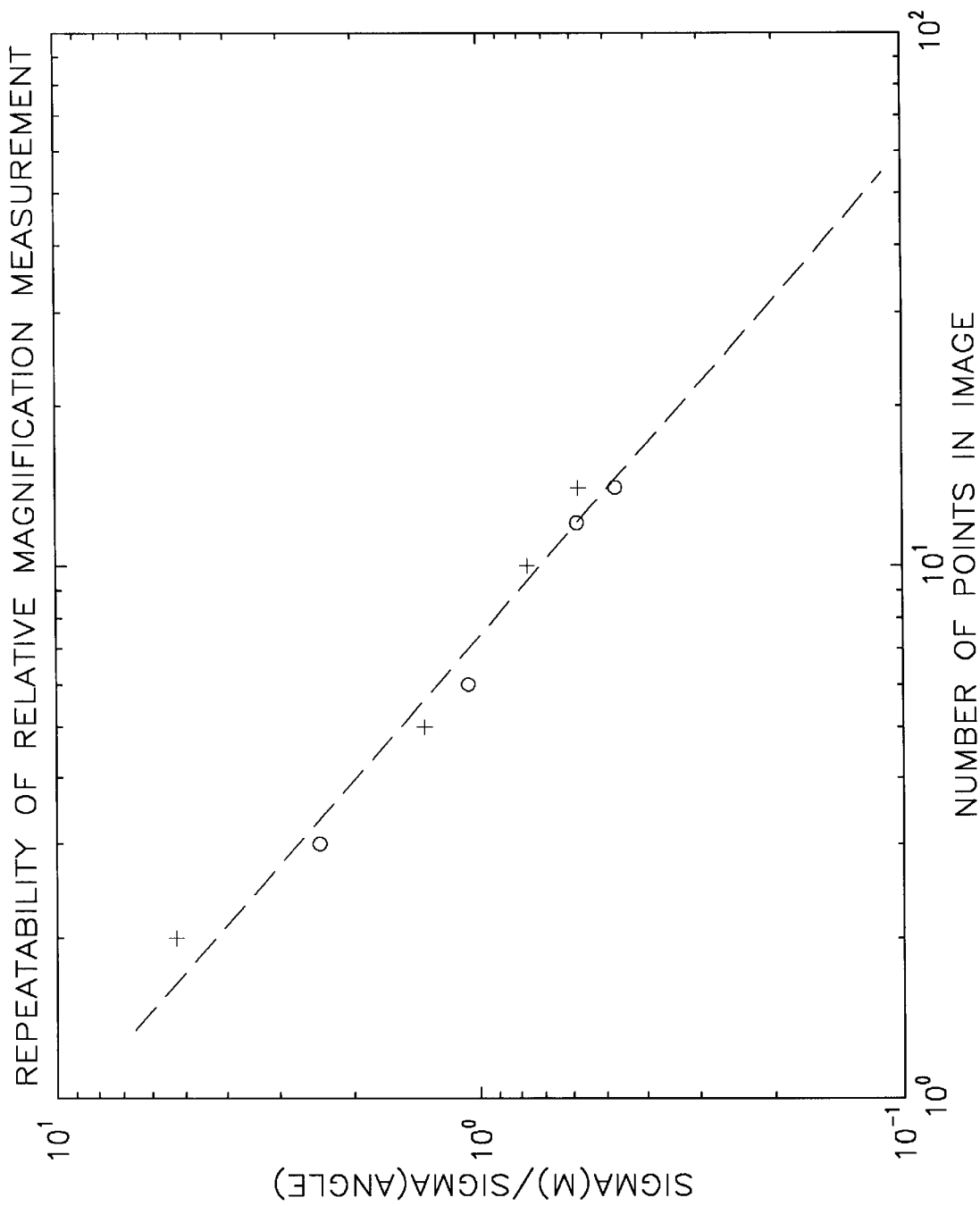
FIG. 16 is a chart showing the experimentally determined relationship between the repeatability of a relative magnification measurement and the number of image points used in the determination.

In FIG. 16 is shown a plot of the experimentally determined relationship between the precision to which one can determine the relative magnification between two images and the number of points in each image. (I am using the term relative magnification here to refer to the ratio between the magnifications of two images; there is very little difference between this usage and my prior definition of the term, so that this additional usage should not cause confusion. Clearly, when comparing the sizes of two images, both could be multiplied by an arbitrary factor without changing the ratio of their sizes.) The two images are identical views of an identical set of object points, differing only in that there is random noise on the measurement of the positions of the image points. The data of FIG. 16 were determined by measuring the image of an unchanged object a number of times, and then calculating the relative magnifications between the individual image realizations. Using a different number of points in the comparison generated each separate point on the plot. Two different sets of images were analyzed in this way; the results for one set of images are indicated by plus signs, the results for the other set by circles. The dotted line is a least squares fit of a straight line to the data. The slope of the line is very close to 1, which indicates that the error in a relative magnification measurement is inversely proportional to the number of points used in the image.

The ordinate of the plot in FIG. 16 is the standard deviation of the relative magnification divided by the relative position measurement error. While these data were determined using a specific borescope, video camera, and image processing technique, the plot will apply to any system in which the standard deviation of the relative magnification is proportional to the relative position measurement error. I believe that this will be the case for any imaging optical system.

In Section 1 above it was stated that the primary effect of an error in the projection distance is to make an error in the range estimate of the same proportion. The explanation of Section 3c showed that a change in relative magnification corresponds to a change in the projection distance. Thus, given a certain desired limit to the error in the range estimate, an allowable error in the relative magnification is implied. Given a required precision in the determination of relative magnification, FIG. 16 tells one how many points must be used in the images that are to be compared, in order to determine that the relative magnifications are the same.

The relative position measurement error for the system that was used to gather the data of FIG. 16 was $4.7 \times 10^{-4}$. Thus, if one wanted to determine the relative magnification to, for instance, 1 part in $10^4$, then one would need to achieve a measurement at an ordinate of 0.21. FIG. 16 indicates that one should use approximately 35 points in the images to be compared to meet this goal. Of course, one could achieve somewhat the same effect by using fewer points in the images and determining their positions multiple times and averaging these results.

It is important to note that FIG. 16 does not purport to tell one exactly how many points are required to guarantee a certain repeatability in the relative magnification measurement. Rather, it gives an indication of how many points are required to achieve a certain standard deviation in the relative magnification. If one wants an estimate of the maximum expected error in the relative magnification measurement, then one should use approximately three times the value shown in the Figure.

When focal plane array 770 (FIG. 11) is translated, the relative magnification will change if the axial position of the camera is not correct. If the transverse alignment is not correct, the image as a whole will also undergo a shift in position. Thus, the calculation of the relative magnification between two images must take into account any image shift.

Let us denote the measured image positions in two images as $[\vec{x}_1^* \ \vec{y}_1^*]$ and $[\vec{x}_2^*]$, where, for instance, $\vec{x}_1^*$ is a column vector of the x positions measured in the first image. Denote the mean value of the x positions in the first image as $<\vec{x}_1^*>$, and likewise for the other three column vectors. Now define reduced image vectors as:

$$\vec{r}_{1x}=\vec{x}_1^*-<\vec{x}_1^*>; \ \vec{r}_{1y}=\vec{y}_1^*-<\vec{y}_1^*>; \ \vec{r}_{2x}=\vec{x}_2^*-<\vec{x}_2^*>; \ \vec{r}_{2y}=\vec{y}_2^*-<\vec{y}_2^*> \quad (14)$$

where in each case, it is meant that the scalar mean is to be subtracted from each element of the vector. Equation (14) defines the reduced images as the original images minus their centroids. The shift of the second image with respect to the first image is then simply: $(<\vec{x}_2^*>-<\vec{x}_1^*>, \ <\vec{y}_2^*>-<\vec{y}_1^*>)$.

One can now write down separate estimates of the relative magnification between the images according to the x and y data. I define the experimental relative magnifications of image 2 with respect to image 1 as:

$$m_x=\vec{r}_{1x}^{-L}\vec{r}_{2x}, m_y=\vec{r}_{1y}^{-L}\vec{r}_{2y} \quad (15)$$

where the left pseudo-inverse of a matrix A is defined as $A^{-L}=(A^TA)^{-1}A^T$ where the superscript T indicates the transpose and the superscript $-1$ indicates the normal matrix inverse.

In general, when a video system is used, the standard deviations of image position measurements will not be the same along the x and y axes, nor will a unit of distance be the same along the two directions. When one puts the standard deviation along the x direction, $\sigma_x$, into the same units that are used along the y axis, one can calculate a weighting constant:

$$q = \frac{\sigma_y}{\sigma_x} \quad (16)$$

Using the weighting constant, the weighted mean estimate of the relative magnification of image 2 with respect to image 1 is:

$$m_r = \frac{(qm_x + m_y)}{(1+q)} \quad (17)$$

The analysis above assumes that there is only a magnification change and a shift between the two test images. When implementing the system as described above with a translation stage, this is a very good assumption. However, with alternative constructions, one may also get a rotation of the image sensor as it is translated. If there is a rotation of the sensor, one could estimate it from the same image measurements as are here used for relative magnification and shift; however, there is no way to take it into account in the perspective measurement without adding to the system a means of determining the position of the projection lens. This could be done using the instrumentation that will be discussed with regard to the second embodiment.

The specific procedure to adjust the axial position of camera 760 is as follows. Set up an array of alignment targets in the field of view of the borescope, at some convenient range. The number of targets to be used is determined from FIG. 16, as discussed above. Two test focal states are chosen; these can correspond to the ends of travel of translation stage 780, or any other convenient stopping positions. Image sensor 770 is moved to one focal state, and the image positions of each of the targets in the array are determined. Then sensor 770 is moved to the other focal state, and the image positions are again determined. Equations (15–17) are used to determine the relative magnification at one focal position with respect to the other. The axial position of camera 760 is then adjusted as discussed above to bring the relative magnification between these two focal states to unity to the precision required. The shift of the image is also noted, to be used during transverse alignment, below.

If one has an informal estimate of the distance that image sensor 770 is translated between the two test positions, then it is straightforward to get an estimate of the required change in camera axial position, once one has determined the relative magnification. If the travel of sensor 770 between the two test focal states is denoted as Δf, then the change in camera position to correct a given relative magnification $m_r$ is:

$$\delta_d = \frac{m_r - 1}{\Delta f} f^2 \tag{18}$$

where f is the focal length of projection lens 788.

One wants the alignment targets to have a high contrast with the background. Unlike in the optical calibration taught in Application 1, there is no need to know relative positions of these targets. It helps to have targets at different ranges because as the focal state is shifted some targets shift into focus as others shift out. I usually mark target points on a flat plate, then tilt that plate with respect to the optical axis of the borescope, in order to achieve this. As will be discussed below, in the presence of certain optical aberrations the distortion of the image may vary with focal state. In that case it can become important to ensure that the target points are reasonably symmetrically distributed over the field of view of the borescope, so that change of distortion is not interpreted as change of magnification.

4c. Transverse Alignment of the Camera

Figure 17:
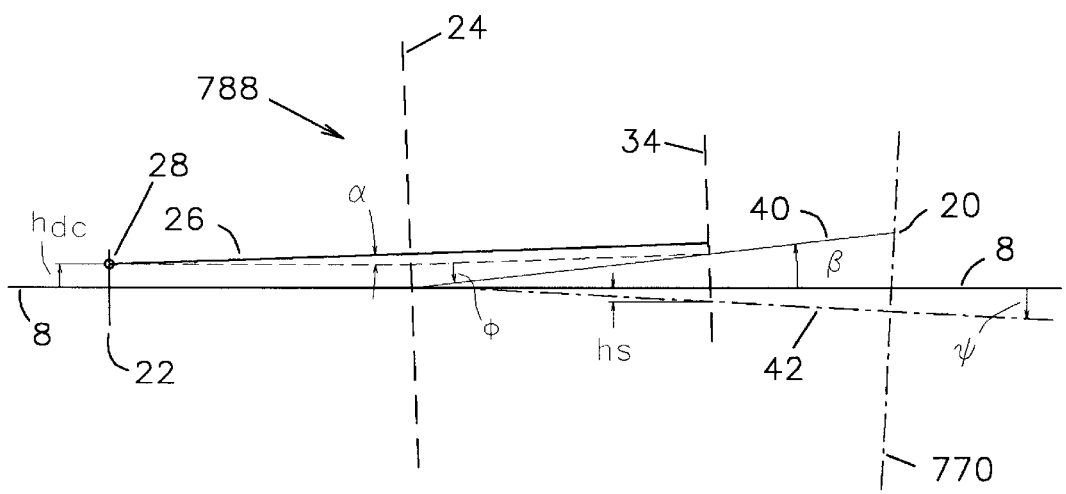
FIG. 17 shows the definitions of parameters for analysis of alignment of the first embodiment, using the system layout of FIG. 15.

FIG. 17 is the same as FIG. 15 except that fewer elements are specifically identified (to avoid unnecessary clutter), and now a set of misalignment parameters are defined. I define the decenter of lens 788 as the distance of its front focal point 28 from reference axis 8, and denote it as $h_{dc}$. The tilt of lens 788, relative to reference axis 8, is denoted as α. The decenter of image sensor 770 is denoted $h_s$ and is measured from reference axis 8 to the point where translation axis 42 (that is taken to be coincident with the center of sensor 770) crosses the nominal position of back focal plane 34 (that is, the plane that lies a distance of 2f to the right of exit pupil 22). The tilt of translation axis 42 is denoted as ψ. The resulting angle of system optical axis 40 with respect to reference axis 8 is denoted as β. All tilts in FIG. 17 are defined with the positive direction being counter-clockwise rotation, and all decenters are defined with the positive direction being toward the top of the Figure.

The known approach to alignment of similar systems is to correct the four (two-dimensional) errors, decenter and tilt of both the lens and the image sensor motion, individually. However, this adds needless complication and expense to the system. I now show that there need be no more than one (two-dimensional) tilt and one (two-dimensional) decenter adjustment, and that these adjustments can be made externally to measurement camera 760.

The most important alignment error to be corrected is that the chief rays must be made parallel to the axis of translation of the image sensor, as was depicted in FIG. 11. If that is accomplished, then image points will not move as the focal state of the system is changed. If the image as a whole is not centered on the image sensor, that is not necessarily a problem, because it can be handled by the optical calibration of the system. Of course there is a limit to the acceptable decenter of the image at focal plane array 770, because the desired portion of the image must be contained within the active area of the sensor.

4d. The Primary Method of Transverse Alignment

Figure 18:
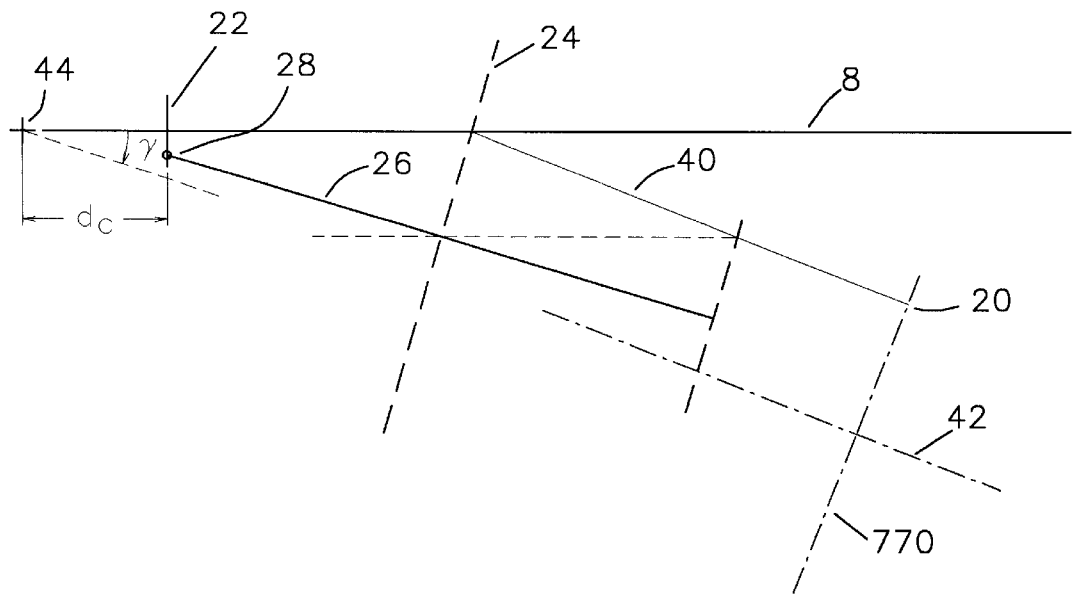
FIG. 18 depicts the layout of the optical system of the first embodiment when the measurement camera optical system is rotated about a center of rotation, showing the correction of tilt error.

The preferred primary method for adjusting the alignment of the system is depicted in FIG. 18. (In FIGS. 15, 17, and 18 the tilt and rotation angles have been greatly exaggerated for clarity.) In FIG. 18 the measurement camera optical system as a whole has been rotated by an angle γ about a center of rotation 44. Center of rotation 44 is shown a distance $d_c$ to the left of exit pupil 22. Rotation about an external point is precisely the adjustment afforded by adjusting screws 742 in kinematic mounting plate assembly 740 (FIGS. 8 and 10), when they are adjusted by different amounts. If the screws are adjusted so as not to shift the axial position of the camera, the center of rotation is at the center of the triangle formed by the tips of adjusting screws 742. Such a rotation of the measurement video camera can bring optical axis 40 into parallelism with translation axis 42 of the focal plane array 770, as depicted in FIG. 18.

From FIG. 17 one can determine that the deviation of system optical axis 40, relative to reference optical axis 8, is β=φ+α, where α is the tilt of the lens and $$\tan\phi = \frac{h_{dc}}{f\cos\alpha} \tag{19}$$

where $h_{dc}$ is the decenter of lens, and f is the focal length of the lens. Now, when the system is rotated about external point 44 by an angle γ, the tilt of the lens becomes $\alpha=\alpha_0+\gamma$, the tilt of the translation axis becomes $\psi=\psi_0+\gamma$, and the decenter of the lens becomes:

$$h_{dc} = \sqrt{d_c^2 + h_0^2}\, \sin\!\left(\gamma + \sin^{-1}\!\left(\frac{h_0}{\sqrt{d_c^2 + h_0^2}}\right)\right) \tag{20}$$

The value of system tilt γ that will bring the chief ray parallel to the translation axis is the solution of:

$$f\tan(\psi_0 - \alpha_0) = \sqrt{d_c^2 + h_0^2}\, \frac{\sin\!\left(\gamma + \sin^{-1}\!\left(\frac{h_0}{\sqrt{d_c^2 + h_0^2}}\right)\right)}{\cos(\alpha_0 + \gamma)} \tag{21}$$

When all the angles are small, expression (21) reduces to:

$$\gamma \approx \frac{f(\psi_0 - \alpha_0) - h_0}{d_c} \tag{22}$$

If $d_c$ is a significant fraction of f, and if the angles are reasonably small, there will always be a tilt of the system that will bring the chief rays into alignment with the translation axis of the image sensor. Thus, the design of mounting plate assembly 740 and reference plate assembly 750 should be compatible with the design of measurement camera 760 so as to guarantee that $d_c$ is suitably far from zero in all conditions.

As shown in FIG. 18, as a result of this process, in general the system optical axis 40 will end up striking focal plane array 770 at some distance from the center. A similar analysis to that above shows that the decenter of image point 20 on sensor 770 is approximately:

$$h_{im} \approx h_0 - h_{s0} + \alpha_0 f - \left(\frac{f}{d_c}\right)(f(\psi_0 - \alpha_0) - h_0) \quad (23)$$

where $h_{s0}$ is the original decenter of sensor 770, that is, the decenter it had before the camera was rotated. This means that the image as a whole is decentered on the sensor by an amount given by Equation (23). Depending on the sizes and relationships of the individual alignment errors in Equation (23), and the size of focal plane array 770 relative to the size of the entire image formed by lens 788 from the borescope apparent field of view, this decenter may or may not be acceptable.

It is quite feasible to fabricate measurement camera 760 with an accurate internal alignment. This means that the difference between $\psi_0$ and $\alpha_0$ can be made small; for instance 5 milliradians is quite feasible when relying on precision machining. It also means that the decenter of the image sensor is related to the decenter and tilt of the lens by $h_{s0}=h_0+2f\alpha_0$. Thus the decenter of the image when the camera is accurately aligned internally, and the camera is externally tilted to produce constant image positions with focus will be:

$$h_{im} \approx f\left(\frac{h_0}{d_c} - \alpha_0\right) \quad (24)$$

Equation (24) shows explicitly how the residual decenter of the image depends on the initial decenter and tilt of the borescope optical axis 8 with respect to the measurement camera. It is these two parameters that are likely to be out of control and to cause a problem with the decenter of the image when only the primary alignment method is available to make the image position constant with focal state. Depending on the borescope, one might expect a decenter of the exit pupil of up to 1 mm. and a tilt of the optical axis of up to a few degrees with respect to the mechanical centerline of eyecup 131. With other borescopes, it may well be that these internal alignment parameters are closely controlled and the primary alignment method is all that is required.

Figure 19:
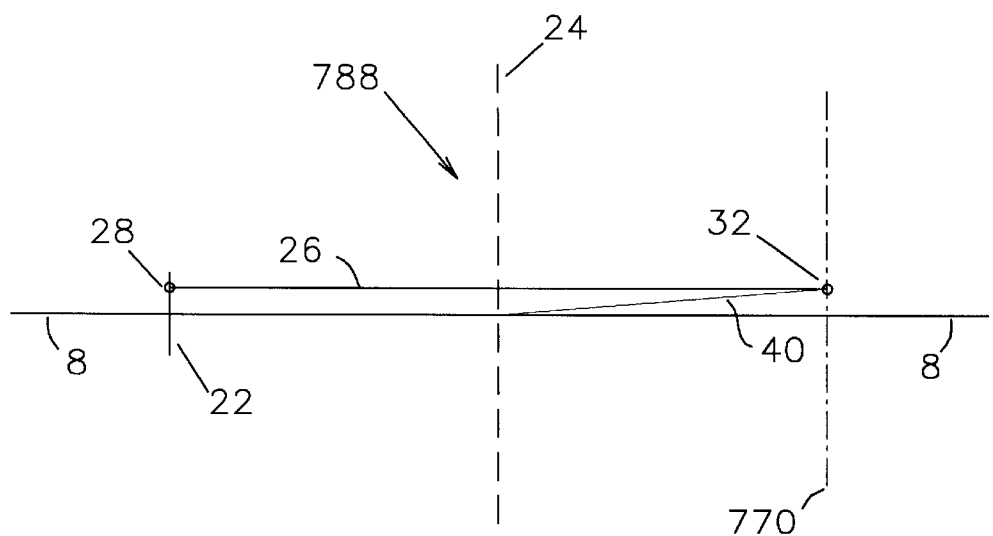
FIG. 19 depicts the first step of a preliminary alignment of the optical system of the first embodiment.

4e. Preliminary Adjustment Procedure for Borescopes with Excess Decenter and/or Tilt The limitations of the primary alignment method when the borescope has too much internal misalignment can be overcome by the following preliminary alignment procedure, the first step of which is depicted in FIG. 19. In FIG. 19, the camera is assumed to have an accurate internal alignment, for ease of visualization of the process. For the same reason, the camera is also assumed to have been adjusted to bring focal plane array 770 to the infinity focus position, that is, image sensor 770 has been brought into coincidence with the rear focal point 32 of lens 788.

In the first step of preliminary alignment, the camera as a whole is rotated about the external point as was shown in FIG. 18 to produce the condition that system optical axis 40 strikes image sensor 770 at the center. When the camera is aligned accurately internally, the result of this step is that the camera optical axis 26 is now parallel to the optical axis of the borescope, 8, as shown in FIG. 19.

The second step of this preliminary alignment procedure is then to adjust the position of the camera with respect to the borescope to bring the axis of the camera into coincidence with the axis of the borescope. It should be clear from FIG. 19 that if one translates the (perfectly internally aligned) camera optical system down with respect to the borescope optical axis, that the image point will remain centered on the image sensor as the axes are brought into coincidence. In the general case, the two axes are judged to be coincident when system optical axis 40 is parallel to the translation axis of the image sensor, that is, when the image positions do not vary with focus. The centering adjustment is actually made within kinematic mounting plate assembly 740 as will be described below.

A detailed analysis shows that this preliminary alignment procedure works even when the camera internal alignment is not accurate, and when image sensor 770 is not coincident with rear focal point 32 of lens 788. The key is to first bring optical axis 40 to the center of the image sensor with a camera tilt adjustment, then to bring optical axis 40 parallel to the translation of the image sensor with a camera centering adjustment.

To summarize the preliminary alignment procedure, one first imposes an external tilt of the measurement camera by adjusting screws 742 of mechanical interface 730 until the chosen center point of the image is coincident with the chosen center point on image sensor 770. Then one adjusts the offset of the camera with respect to the borescope until the image position does not vary as image sensor 770 is moved along its translation axis 42. In practical terms, one need not achieve the second condition perfectly with this second adjustment; one need only get close enough so that a final tilt of the camera according to the primary alignment method will produce the desired image position stability with focus while keeping the image as a whole on the active portion of focal plane array 770.

It is important to note that if one informally estimates the slope of the chief ray (that is, the motion of the image point on the image sensor divided by the distance moved in the focus direction) after the first step of the preliminary alignment procedure is accomplished, one can estimate the necessary centering shift of the camera from:

$$slope = \frac{h_0}{f} \quad (25)$$

Both the primary and preliminary alignment methods have the great advantage that the adjustments are made externally to measurement camera 760, so that the camera is not aligned specifically for use with a single borescope. Thus, these methods support the goal of using a single camera interchangeably on more than one borescope.

4f. Providing a Centration Adjustment Between the Camera and the Borescope

If it is needed, the centration adjustment for preliminary alignment is provided by making a change to the design of kinematic mounting plate assembly 740 from that shown in FIG. 10. One option is to divide plate body 743 into two separate plates of about the same size that are held together face to face with screws passing through large clearance holes. One plate would be attached to the borescope, and the other would carry adjusting screws 742, and be attached to kinematic reference plate assembly 750. The screws holding the plates together could be loosened when required, allowing a sliding adjustment of the transverse position of the borescope with respect to camera 760.

Figure 20:
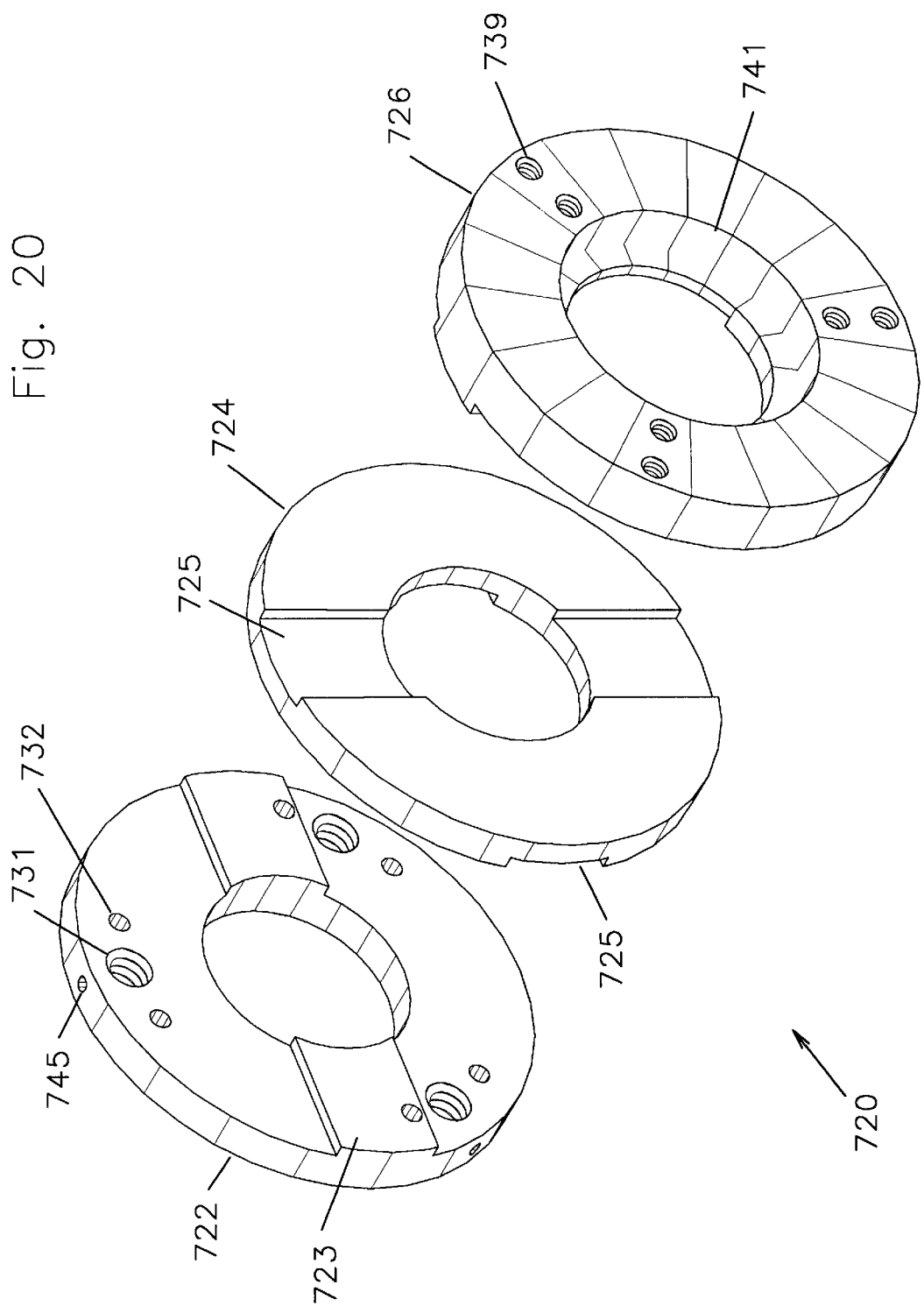
FIG. 20 shows a first apparatus that provides a centration adjustment between a borescope and a measurement camera.

A second, more elaborate, option for providing a centration adjustment between the borescope and the measurement camera is depicted in FIG. 20. In this Figure, a split kinematic mounting plate assembly 720 is comprised of a camera plate, 722, an intermediate plate, 724, and a borescope plate, 726. Camera plate 722 contains threaded holes 731 for kinematic adjusting screws 742, threaded holes 745 for locking set screws 749 and clearance holes 732 for locking screws 744. These screws are not shown in FIG. 20, but are shown in FIG. 10. Camera plate 722 also contains an alignment boss, 723, which works in conjunction with a matching alignment groove, 725, in intermediate plate 724.

Clearance slots (not shown) in intermediate plate 724 for the screws that fit holes 731 and 732 in plate 722, allow plates 722 and 724 to fit together, while alignment boss 723 and alignment groove 725 together constrain any relative motion of these plates to be a translation along the horizontal direction. Plates 722 and 724 are then attached to one another with screws that pass through additional slots (not shown) in intermediate plate 724 and that enter additional threaded holes (not shown) in camera plate 722.

Borescope plate 726 contains a machined recess 741 for the borescope eyecup (not shown) and also contains threaded holes 739 for clamping screws 748 (FIG. 10). Plate 726 also contains an alignment boss, which works in conjunction with a second alignment groove 725 on the front of intermediate plate 724, so that borescope plate 726 can easily be adjusted in vertical translation with respect to the assembly of the intermediate plate and the camera plate. In order to do this, borescope plate 726 must contains slots for screws that attach it to plate 724, and it must also contain clearance holes for the screws that fit into holes 731 and 732 in camera plate 722.

Thus, split kinematic mounting plate assembly 720 provides separate and orthogonal centration adjustments between a borescope and a measurement camera.

Figure 21:
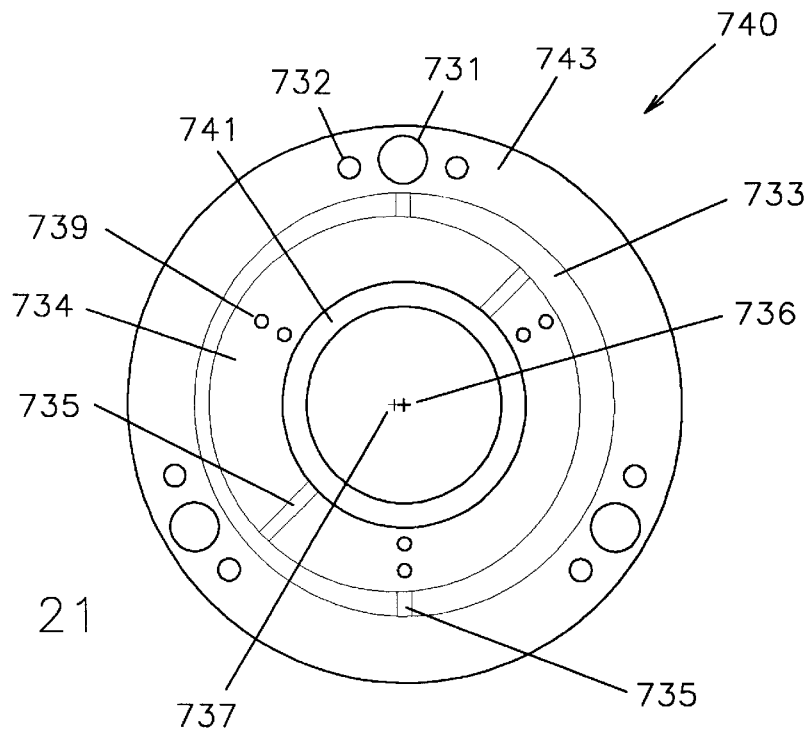
FIG. 21 shows a second apparatus that provides a centration adjustment between a borescope and a measurement camera.

A third option for providing a centration adjustment between the camera and the borescope is depicted in FIG. 21. In FIG. 21 is shown a front view of a kinematic mounting plate assembly 740 that comprises an outer body 743, an intermediate ring 733, an inner ring 734, and a machined recess 741. As before, the eyecup of the borescope (FIGS. 7 and 8) is captured in machined recess 741. Outer body 743 contains holes 731 and 732 for the screws that perform the attachment and adjustment operations performed by mounting plate assembly 740, with respect to reference plate assembly 750, as previously described. Inner ring 734 contains holes 739 for the screws that mount the clamping lugs that attach the borescope to mounting plate assembly 740, as previously described. Intermediate ring 733 and inner ring 734 both contain a multiplicity of spanner wrench slots, 735.

The outer diameter of intermediate ring 733 is concentric with the center of outer body 743. The outer diameter of inner ring 734 is not concentric with the outer diameter of intermediate ring 733. The center of the inner ring, 737, is thus offset from the center of outer body 743 by a certain fixed distance. Recess 741 is machined into inner ring 734 with an offset equal to the offset of the center 737 of inner ring 734. Thus, the center of the machined recess, 736, lies at a position that depends on the angular orientations taken by intermediate ring 733 and inner ring 734.

The net offset of the center of the machined recess, 736, is determined by the relative rotation of inner ring 734 with respect to intermediate ring 733. With the relative orientations shown in FIG. 21, the offset of recess 741 with respect to inner ring 734 just cancels the offset of inner ring 734 with respect to intermediate ring 733. Thus, the center of the machined recess, 736, is coincident with the center of intermediate ring 733, and hence, with the center of outer body 743. As inner ring 734 is rotated with respect to intermediate ring 733, the net offset of the center of the machined recess, 736, with respect to the center of outer body 743 will increase until it reaches a maximum of twice the offset of the machined recess with respect to inner ring 734. This maximum offset occurs when inner ring 734 is rotated 180 degrees with respect to intermediate ring 733 from the orientation depicted in FIG. 21.

Rotation of intermediate ring 733 and inner ring 734 together then serves to change the orientation of the net offset of the center of the machined recess, 736, with respect to the center of outer body 743. Thus, the offset of the borescope with respect to the measurement camera can be adjusted in a polar coordinate system by adjusting the relative orientation of rings 733 and 734 and the orientation of both rings together with respect to outer body 743. One can add a series of index marks at the outer diameters of rings 733 and 734 in order to obtain a quantitative offset adjustment.

The depiction of FIG. 21 shows the basic structure of the centration adjustment system without assembly features that are well known in the art. Additional details can be found in the book *Ingenious mechanisms for designers and inventors*, Vol. 4, John A. Newell and Holbrook L. Horton, eds., Industrial Press, New York, 1967, pp. 223–224.

In Application 1 I taught that there is a specific rotational orientation of the borescope with respect to the measurement camera that must be maintained in order to obtain perspective dimensional measurements with the highest feasible level of precision. One must therefore begin an alignment of a measurement camera to a borescope with this relative orientation. If a centration adjustment according to FIG. 21 is used, clamping screws 748 (FIG. 10) must be loosened after each adjustment, the borescope must be rotated back to its correct orientation with respect to the camera, and screws 748 then retightened. This rotational alignment need not be very accurate in order to get the desired effect on the measurement precision. However, it is important that recess 741 be a close fit on the outer diameter of eyecup 131 in order that the offset not shift significantly when the borescope is loosened.

A fourth way to provide an offset adjustment for the borescope with respect to the measurement camera is to machine a kinematic reference plate body specially for each borescope. This may be attractive in a production situation, where a number of nominally identical borescopes are each to be mated to its own measurement camera. First, the offset of the optical axis of each borescope with respect to the mechanical center of the eyecup 131 is determined by placing the borescope into a test fixture. Since the exit pupil is accessible, the offset of the optical axis is easily determined with standard measurement techniques. Then, recess 741 in plate body 743 (FIG. 10) is machined to fit the outer diameter of eyecup 131 closely. The center of this recess is offset just the amount required to bring the exit pupil of the individual scope to the centerline of the camera. This means that there is now a particular orientation that must be achieved and maintained between the borescope and mounting plate assembly 740. This is easily achieved by marking plate body 743 with a reference mark that must be aligned with the fiber optic connector 128 (FIGS. 7 and 8). Since there is also required a specific rotational alignment of the measurement camera with respect to the borescope, as has just been discussed, a specific alignment of kinematic reference plate assembly 750 with respect to kinematic mounting plate assembly 740 must now be maintained, as well as a specific alignment of reference plate assembly with respect to focal plane array 770. These specific required alignments are not a problem, just as long as provisions are made for them and they are kept in mind while the system is being assembled.

5. Minimizing the Effects of Optical Aberrations and Vignetting

The discussion to this point has been concerned with what is known as the first order, Gaussian, or paraxial, properties of the optical system as they affect the perspective measurement. Because of the high precision to which perspective measurements can be made with this system, it is important to consider the effects of other third order (Seidel) aberrations, in addition to Seidel distortion, on the measurement. It is also important to consider the effects of vignetting.

As I have explained, the perspective measurement is based on locating the centroids of the images of points of interest, whether or not these images are in focus. The position of the centroid of the image of a point is determined primarily by the first order properties of the system and the Seidel distortion, but it is also affected by the image aberrations known as coma and lateral chromatic aberration. The other Seidel image aberrations, astigmatism, field curvature, and spherical aberration, are symmetrical about the chief ray, so that their presence or absence does not affect the position of the centroid of the image spot. The presence of these other aberrations do make the blur spot larger, all other things being equal, so that they do increase the random error in the measurement.

In standard perspective measurements, where the camera internals are fixed, all of the camera characteristics that affect the position of the image centroids are constant, so the net effect of them is taken into account during system optical calibration. Where the camera undergoes internal changes, as in this first embodiment, if the distortion, coma, or lateral chromatic aberration change as the focal state of the system changes, these changes can affect the measurement.

Another way to think about this situation is to consider that the chief rays themselves, at various points in the image, are subject to aberrations. By this, one means that the apparent position of the center of the exit pupil, as viewed from an image point, may not be the same for all image points. In other words, the angle of the chief ray may vary from its unaberrated value, and if the angle of the chief ray is not correct, then the centroid of the image spot will not vary with focal state as one would expect from the analysis already presented, and as was depicted in FIGS. 11 and 12. Aberrations of the chief rays are called pupil aberrations, and in particular, the aberrations of interest are called spherical aberration of the pupil and longitudinal chromatic aberration of the pupil.

For instance, in the presence of spherical aberration of the pupil, there will be no axial position of lens 788 with respect to exit pupil 22 at which chief rays from all object points are directed exactly parallel to optical axis 8 (FIG. 11). This means that the relative magnification will not be constant with focal state for all portions of the field of view, even when it is constant for some portions. The level of this aberration will depend on the optical design and construction of the borescope, and will limit the performance of a perspective measurement system using the measurement camera of this first embodiment. As the focal state of the borescope/camera system is changed, the magnification in some parts of the field will vary while it will remain constant in other parts of the field. This effect can be considered to be a change in Seidel distortion as a function of focal state.

The fact that lens 788 is being used with a pupil located in its front focal plane means that it too is subject to spherical aberration of the pupil. Thus, it is possible to arrange to cancel the pupil spherical aberration of borescope 2 with that of lens 788, thereby obtaining a more accurate measurement than otherwise feasible with a scope that exhibits this aberration. It is the case that achromatic doublets usually have pupil spherical aberration, and that this aberration depends greatly upon which side of the lens faces the pupil. Thus, one will, in general, obtain better performance from this standpoint with a particular orientation of lens 788. Which orientation is better depends upon the aberration characteristics of borescope 2, so it is not possible to be more specific here.

The issues being addressed here as regards to aberrations were considered in a general way by C. G. Wynne, in the paper "Primary Aberrations and Conjugate Change", *Proc. Phys. Soc.*, 65B, 429–437, 1952. What Wynne means by change of conjugates is exactly the same as what I mean by change of focal state (for this first embodiment). In the paper, Wynne showed that in a system for which the field angle and the pupil size remain unchanged, the requirement for there to be a constant Seidel distortion with conjugate change is equivalent to the requirement that the pupil spherical aberration be zero. In addition, he showed that there will be no change in lateral chromatic aberration if the longitudinal chromatic aberration is zero. He also showed that conditions for there to be no change in coma with focal state exist, but that these conditions require that the field curvature not be zero. For the purposes of the perspective dimensional measurement, since only a small portion of the field of view can be used for any given three-dimensional point location, and the portions used are, in essence, symmetrical about the axis, the fact that the field curvature is not zero is not a problem. Thus, it is possible to arrange the optical system of the first embodiment so that all aberrations that affect the location of the centroid of an image spot are stationary with change in focal state. In order to do this, of course, one has to either have the design of the borescope available, or to extensively characterize these pupil aberrations for the borescope, and then must design projection lens 788 accordingly.

The Seidel distortion is by far the largest contributor to the variation in magnification with field angle, so that changes in it with focal state will most likely be the dominant source of error. Thus, matching the borescope and projection lens to minimize the overall spherical aberration of the pupil corrects the most important error.

Vignetting is a reduction in the size of the exit pupil at large field angles, and it is generally not symmetric about the chief ray. Thus, vignetting can be considered to create a lateral change in pupil location as a function of field angle. Since the path of the centroid of the image blur spot as the focal state is changed is determined by the location of the centroid of the pupil, the existence of vignetting can also cause errors in the perspective measurement. The error can be considered as a kind of variation in the generalized distortion with focal state. Depending on the characteristics of the vignetting of the borescope, it may or may not be possible to correct this with the simple projection lens of this first embodiment. If it cannot be corrected, borescopes with little or no vignetting at large field angles will be preferred.

To improve the performance of the measurement camera in the presence of pupil aberration or, more generally, when the generalized distortion of the image varies with focal state, one can use a position transducer to monitor the position of image sensor 770 with respect to lens 788, and characterize the properties of the distortion as a function of image sensor position. In this case, one can also use knowledge of the position of the image sensor to make accurate measurements in the presence of misalignments within camera 760 or an incorrect axial position of camera 760, thus eliminating the necessity of performing a precise alignment of the system. The necessary structure and methods are taught below with respect to the second embodiment of the current invention.

6. Description of a Second Embodiment

The second embodiment is shown in an overall perspective view in FIG. 22. As in the first embodiment, a rigid borescope 2 has attached at its proximal end a measurement mechanical interface 730. In this embodiment measurement interface 730 supports a measurement focus adapter 800 that in turn has attached at its proximal end a standard video camera back 134. Measurement focus adapter 800 together with video camera back 134 form a measurement video camera. Camera back 134 has on its rear surface a video connector 136. Measurement focus adapter 800 includes on its outer surface a measurement focusing ring 762 and also a focus sense connector 766. The improved video borescope system of this embodiment is meant to be used instead of the standard video borescope system in the perspective measurement system that was fully disclosed in the referenced co-pending applications.

Figure 23:
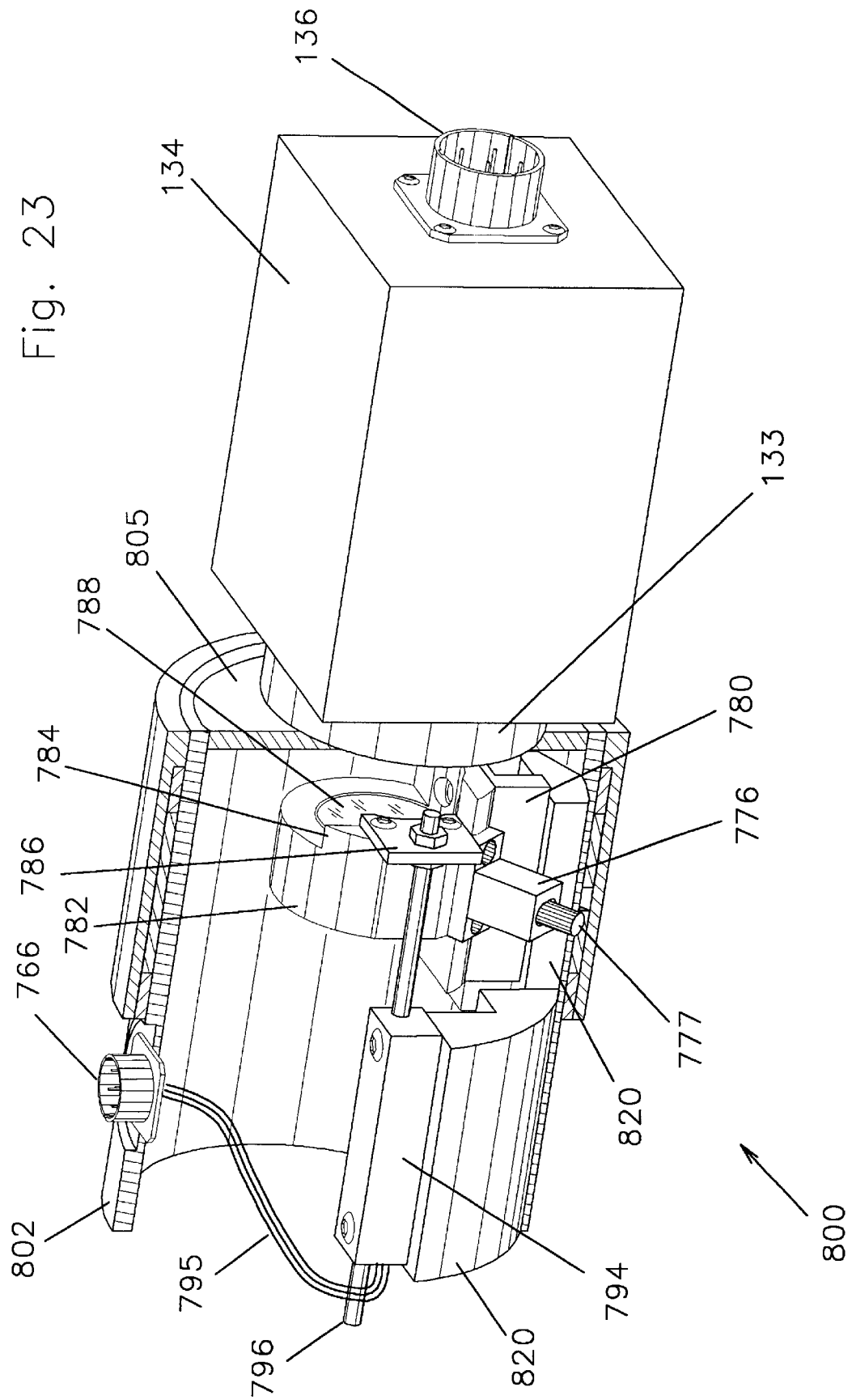
FIG. 23 is a perspective view of the internal structure of the measurement focus adapter of the second embodiment.

The internals of measurement focus adapter 800 are depicted in a perspective view in FIG. 23 in which the outer portions of focus adapter 800 have been sectioned to allow view of the interior. Focus adapter housing 802 supports a camera back adapter 805 that engages a camera lens mount 133 attached to video camera back 134. Camera lens mount 133 is typically either a standard "C" mount or a standard "CS" mount. At the distal end, housing 802 is attached to a measurement mechanical interface (FIGS. 10 and 22) by conventional means that are not shown.

Housing 802 also supports a mounting base 820 that in turn supports a translation slide 780. Translation slide 780 supports a moving lens cell 782, which in turns contains a projection lens 788. Lens cell 782 also supports a drive pin receptacle 776 that holds a drive pin 777. The focus drive system used in this embodiment is identical to that used in the first embodiment, which was fully described above in Section 3d: "Opto-mechanical System", and will not be further described here.

Lens cell 782 also has a transducer boss 784. Boss 784 supports a transducer arm 786, which in turn is attached to a transducer operating shaft 796 of a focus position transducer 794. (Shaft 796 extends from both ends of transducer 794.) Focus position transducer 794 is a small linear potentiometer, preferably of the type sold by Bourns, Inc. of Riverside, Calif. as their Model 3048. A very similar unit is available from ETI Systems, Inc. of Carlsbad, Calif. as their model LCP-8. Transducer 794 is supported by mounting base 820.

Transducer electrical leads 795 from position transducer 794 are attached to focus connector 766. Leads 795 are run well out of the way of the aperture of projection lens 788.

A suggested optical layout of the second embodiment is shown in FIG. 24, which depicts the system as set up for focusing on objects at three different ranges. In FIG. 24A the object is at infinity. In FIG. 24B, the object is at some mid-range distance. In FIG. 24C, the object is at the closest range for which the system can be focused.

As in the first embodiment, the borescope is assumed to be set up as an afocal system. (It will be explained below how to handle the case when the borescope is not focused at infinity.) In FIG. 24 is shown the most distal surface of the eyepiece lens 125, borescope exit pupil 22, projection lens 788, and image sensing plane 832 of the video camera back. Projection lens 788 is modeled as a thick lens in FIG. 24. Projection lens 788 has a focal length $f_p$ that is selected to match the apparent field of view of the borescope to the size of sensing plane 832 as was previously explained.

Because lens 788 is mounted on slide 780 (FIG. 23), it can move to various positions along optical axis 8. With respect to exit pupil 22, lens 788 has a suggested minimum distance of $f_p$ (FIG. 24C) and a suggested maximum distance of $(1+|M_B|)f_p$ (FIG. 24A), where the quantity $M_B$ is the paraxial angular magnification of the borescope. The range of motion of lens 788 is thus $M_B f_p$. The image sensing plane is mounted a suggested distance of $(2+|M_B|)f_p$ from the exit pupil, where this expression refers to the optical distance and where the actual physical distance is somewhat larger to account for the distance between the principal planes of projection lens 788. The reasons for this suggested layout, and the limits of its applicability, are discussed below. The definition of and a method for determining the paraxial angular magnification for an unknown borescope will also be given below.

Figure 25:
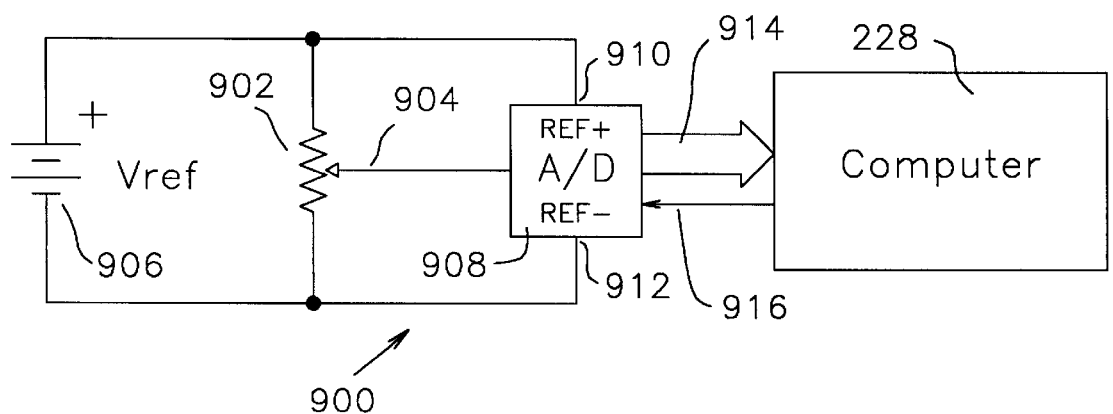
FIG. 25 is a block diagram of a focus position sensing subsystem.

A preferred form of the focus position sensing electronic sub-system, 900, is depicted in the block diagram of FIG. 25. In FIG. 25, a sensing potentiometer 902, (that is the electrical representation of focus position transducer 794) is connected across the output terminals of a reference voltage source 906. A wiper 904, of potentiometer 902 is mechanically connected to focus transducer operating shaft 796 (FIG. 23) such that the physical position of wiper 904 along the length of potentiometer 902 represents the position of the projection lens (FIG. 23). Also connected across the output terminals of reference voltage source 906 is a ratiometric analog to digital (A/D) converter 908. A/D converter 908 has two terminals REF+910 and REF−912 for this purpose. The output word of the A/D converter is supplied to output bus 914, which is connected to a data bus of system computer 228. A control line 916 is connected between computer 228 and A/D converter 908 to enable the computer to command a data conversion under software control.

Of course, there are many other position transducers that could be used instead of the preferred inexpensive potentiometer. Many of these alternatives were discussed in Application 1 for determining the position of a moving camera.

7. Operation of the Second Embodiment

7a. Electronics

The A/D converter 908 of FIG. 25 should have sufficient resolution to match the performance of position transducing potentiometer 794. When potentiometer 794 is chosen to be the Bourns Model 3048, the A/D converter needs at least 10 bits resolution to obtain the full performance of the transducer. Ratiometric A/D converter 908 produces an output that is proportional to the ratio between the voltage at its input terminal (904) and the difference between its reference terminals 910 and 912. Thus the output is insensitive to the value of the voltage produced by reference source 906, and depends only on the position of the slider. There are many suitable ratiometric A/D converters available, for instance the model LTC 1286 produced by Linear Technology Corporation of Milpitas, Calif.

The output of the preferred potentiometer is linear with position of the slider only to an accuracy of about 2%. Thus a lookup table is used to relate the voltage ratio determined by A/D 908 to the position of slider 904, and hence, projection lens 788. The data for this look up table are generated by calibrating the potentiometer with a micrometer in a separate test setup. The software run by computer 228, when it obtains a data word from the A/D, interpolates in the look up table to determine the corresponding position of the projection lens. Such interpolation routines can be found in the book *Numerical Recipes*, by William H. Press, et. al., published by Cambridge University Press, 1st Ed. 1986.

7b. Optical System

The structure described above functions to move the lens along the optical axis to focus on objects at different distances. The distance between the borescope and the image sensing plane is fixed in this embodiment. With the lens at the suggested minimum distance from the exit pupil (FIG. 24C), the imaging is telecentric, as in the first embodiment. This telecentric condition does not give the advantage that it did in the first embodiment, because here the lens, rather than the image sensing plane, moves to accomplish focusing. At the suggested maximum distance from the exit pupil (FIG. 24A), the lens is one focal length away from the image sensing plane. In this condition, objects at infinity are in focus, if the borescope is afocal.

The position of lens 778 is monitored with position transducer 794. Thus, any change in the optical system that is due to the change in position of lens 778 can, in principle, be determined and corrected.

Figure 26:
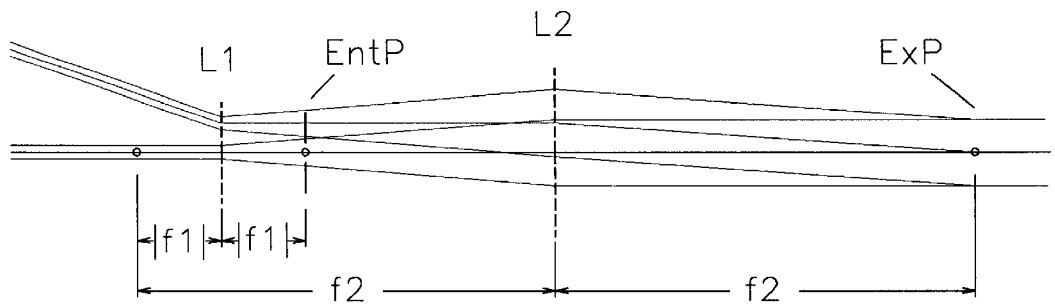
FIG. 26 depicts a thin lens model of a borescope optical system as prior art.

FIG. 26 depicts the optical system of a borescope modeled as a two thin lens afocal system. Since virtually all borescopes provide an erect image to the eye of an observer, the model in FIG. 26 has a negative focal length lens L1 on the object side of the system. The eyelens, L2, has a positive focal length. Since virtually all borescopes have a larger field of view in object space than the apparent field of view seen by the user, the magnitude of the focal length of L1 is smaller than the focal length of L2. The entrance pupil of the borescope, EntP, is chosen for illustration purposes to coincide with the image side focal point of L1. The exit pupil of the borescope, ExP, then lies at the rear focal plane of L2, as shown.

The entrance pupil position shown in FIG. 26 is not the position of a physical aperture stop in the system. If L1 were really a single negative focal length lens, then there would be no physical position where an aperture stop could be placed in the system to produce the specified borescope exit pupil. However, the model of FIG. 26 is meant to represent the combined effect of the objective lens and relay train of the borescope, and that optical system can have an entrance pupil at the position shown in FIG. 26. The model applies to any sort of endoscope, not just a rigid borescope. Actual endoscope optical systems can use erecting lenses or prisms, or even coherent imaging fiber bundles, to transfer the image inside of the scope. Such scopes are internally quite different than the model shown in FIG. 26, but the model is still useful for discussing the operation of the instant invention.

At this point, it is useful to discuss the concept of a "lens group". This is a term that has no precise technical meaning, but is often used when discussing optical systems because it helps one to keep in mind some important aspect of the system. Most generally, a lens group is a set of one or more lens elements that are considered to act together as a unit for a particular optical purpose. In photographic lenses, lens groups are typically defined as those lens elements that are cemented together. In zoom lenses, lens groups are often defined as those lens elements that move as a unit to adjust the focal length or the focal state of the system. In other cases, an optical system that forms internal images or pupils (images of the stop) is divided into lens groups with the internal images or pupils being the demarcation lines. As suggested by this latter definition, the borescope optical system model of FIG. 26 can be considered to consist of two lens groups.

Figure 27:
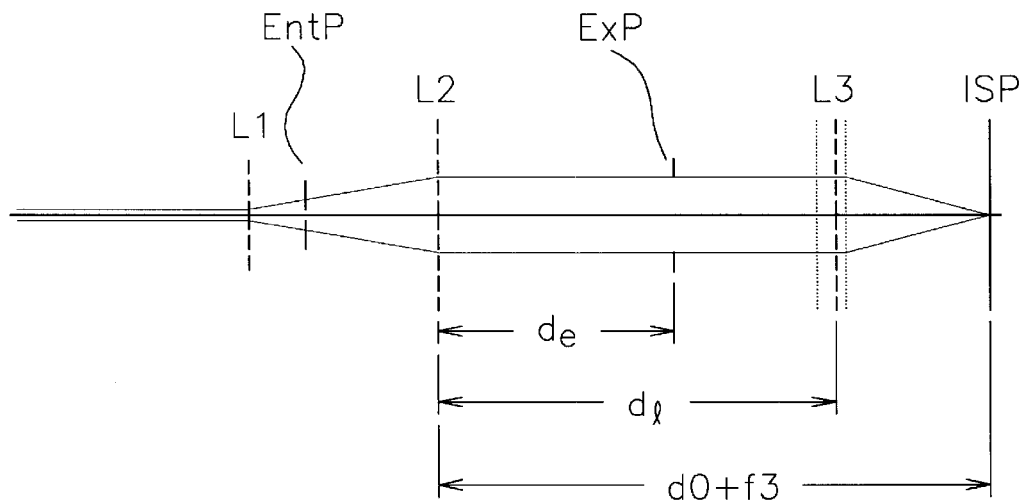
FIG. 27 depicts a thin lens model of the measurement optical system of the second embodiment.

In FIG. 27 a model of the complete optical system of the second embodiment is depicted, combining the borescope model of FIG. 26 with the layout of the focusing adapter specified in FIG. 24. Here, the exit pupil of the borescope is specified to be at a distance $d_e$ from the principal plane of the eye lens, L2. The exit pupil of the borescope is, of course, accessible to the user, and its position can be determined accurately with little effort. As before, the borescope is modeled by the two thin lenses, L1 and L2. In FIG. 27 the position of the borescope entrance pupil, EntP, is not necessarily as specified in FIG. 26, but is instead at a position that corresponds to the actual position of the exit pupil.

As described above with reference to FIG. 24, the projection lens, denoted here as L3, with a positive focal length $f_3$, is movable between two extreme positions. These extreme positions of the projection lens are indicated with dotted lines in FIG. 27. The image of an object of interest is formed on an image sensing plane, ISP. The distances in FIG. 27 are not intended to be drawn to scale. The system of FIG. 27 consists of three lens groups.

According to the layout of FIG. 24, when the in-focus object plane is closest to the borescope the projection lens is a distance $f_3$ from the borescope's exit pupil. When the in-focus object plane is farthest from the borescope the projection lens is a distance $f_3$ in front of the fixed image sensing plane. In general, the distance of the projection lens from the principal plane of the eye lens is denoted $d_l$. The largest value that $d_l$ can take is denoted as $d_0$. Therefore, the image sensing plane, ISP, is located at $d_0+f_3$ from the principal plane of the eye lens as shown in FIG. 27. Clearly, the system will be focused at infinity when $d_l=d_0$ (when the borescope is afocal). As $d_l$ is decreased from its maximum value, the object plane that is in focus moves closer to the borescope.

The paraxial angular magnification of the borescope can be expressed as:

$$M_B = -\frac{f_1}{f_2} \quad (26)$$

In FIGS. 26 and 27, $M_B$ is positive and has a magnitude smaller than 1. The expressions given below apply to either sign of $M_B$ and whether the magnitude is less than or greater than one.

The overall focal length of the three lens group system of FIG. 27 is $M_B f_3$, and is independent of the position of the projection lens.

7c. Properties of the Suggested Layout of the Second Embodiment

Initially, the distance of the projection lens and image sensing plane from the borescope, as represented by the layout parameter $d_0$, could be chosen arbitrarily. In conventional borescope video adapters, the projection lens is chosen to be a cemented doublet. It turns out that such a lens can be placed a distance away from the borescope's exit pupil such that the astigmatism of the lens is minimized. Presumably, the axial position of the projection lens is chosen, in conventional video adapters, to minimize the aberrations in the imaging. In this new system, I use a criterion for $d_0$ that minimizes the change in magnification as the lens is moved to focus on objects at different distances.

The chief ray magnification for the system shown in FIG. 27 for an object located a distance $z$ to the left of the principal plane of L1, can be expressed as:

$$M_{cr} = -M_B d_l^2 - d_l(d_0 + d_e + f_3) + d_0(d_e + f_3) + \frac{f_3^2}{f_3(z - z_{EntP})} \quad (27)$$

where the entrance pupil position $z_{EntP}$ is:

$$z_{EntP} = f_1(1-M_B) - M_B^2 d_e \quad (28)$$

and where, to repeat, the entrance pupil is the image of the aperture stop as seen through the borescope when viewed from the object side. As discussed previously, the physical aperture stop in the borescope is located at an image of the exit pupil that is formed somewhere within or on the object side of the borescope objective and relay system. As expressed by Equation (28), the location of the entrance pupil is independent of the position of the projection lens, $d_l$.

The denominator of Equation (27) is of the same form as the denominator of Equation (13), which means that the coordinate system for object ranges is subject to a constant offset. Thus, the condition expressed by Equation (1) is then satisfied, and the focal state dependent part of the magnification can be considered to be a relative magnification. However, unlike in equation (13), the relative magnification here is not linear in the focusing parameter, $d_l$, and unlike the first embodiment, there is no arrangement of the system for which $M_{cr}$ is independent of $d_l$.

It is possible to conceive of systems in which the entrance pupil moves as the plane of focus is shifted, but that does not happen in this system. Clearly, in such a more general system:

$$M_{cr}(d_l, z) = \frac{F_1(d_l)}{z - F_2(d_l)} \quad (29)$$

where $F_1$ and $F_2$ are functions. Thus, an optical system exhibits a relative magnification when the position of the entrance pupil is independent of the focal state. An example of a system that does not exhibit a relative magnification, and that would require the use of Equation (29), is the system of FIG. 12 where the lens is moved with respect to the object and with respect to the image sensing plane in order to adjust the focus.

Considering an object point at any particular fixed distance z in Equation (27), one finds that there is a extremum of $M_{cr}$ located at $d_l = (d_0 + d_e + f_3)/2$. This point is midway between the extreme positions $d_l = d_0$ and $d_l = d_e + f_3$ that were suggested in the layout of FIG. 24. At these extreme positions $M_{cr}$ becomes:

$$M_{cr} = -\frac{M_B f_3}{z - z_{EntP}} \quad \text{(at ends of suggested focus range)} \quad (30)$$

At the extremum of $M_{cr}$, the derivative of $M_{cr}$ with respect to the lens position is zero, and this derivative is linear in d. Thus, setting up the system as suggested above results in the minimum change in magnification with respect to lens position, over the specified range of lens positions, so that the suggested setup is optimum in that sense.

When the projection lens is at its closest to the exit pupil, $d_l = d_e + f_3$, the in-focus object distance is:

$$z_{min} = f_1(1-M_B) + |M_B|f_3 - M_B^2 d_e \quad (31)$$

This quantity depends on the internal design of the borescope, as well as its magnification, because of the dependence on $f_1$. However, the dependence makes little practical difference for most applications. For instance, in a particular construction of this embodiment the borescope had a magnification of $M_B$=0.2, $d_e$ was 15 mm., and $f_3$ was 40 mm. The focal lengths of the borescope internal optical system were not determined, but typically the equivalent focal length of the combination of the objective lens and relay train is about −1 or −2 mm. Using Equation (31), the corresponding minimum focusing distance is between 5.8 and 6.6 mm.

7d. Determining the Optimum Layout for the Second Embodiment

The system setup specified above is suggested because it is easily accomplished and because it will serve well in many applications. However, it may be that the minimum focusing distance provided (Equation (31)) is not adequate for a given application. It may also be that a focusing range all the way to infinity is not required and that the highest measurement performance is needed. In such cases, a different setup will be considered "optimum", as will now be explained.

The goal of the system is to make accurate perspective dimensional measurements. As explained in Section 1 above, if the magnification is uncertain, then the range component of the dimensional measurement is uncertain. The magnification of the system will be uncertain if the position of the projection lens is not precisely determined. Tests on samples of the Model 3048 linear potentiometer have shown that its position measurement repeatability is only about ±0.2%. For a perspective measurement to be accurate to 1 part in 10,000, one must have an uncertainty in the magnification no greater than one part in 10,000. This means that the requirement on positioning uncertainty for the lens is:

$$\frac{\partial M_{cr}}{\partial d_l} \Delta d_l \leq 10^{-4} M_{cr} \quad (32)$$

$$\frac{\partial M_{cr}}{\partial d_l} \frac{1}{M_{cr}} \leq \frac{10^{-4}}{\Delta d_l}$$

$$\frac{\partial M_{cr}}{\partial d_l} \frac{1}{M_{cr}} \leq \frac{10^{-4}}{\eta(d_{lmax} - d_{lmin})}$$

where $\eta$ is the relative uncertainty in position (0.004 for the Model 3048) and $d_{lmax} - d_{lmin}$ is the total range of travel for the lens. I call the quantity on the left hand side of the bottom expression in Equations (32) the lens position sensitivity.

In the particular construction mentioned above, the borescope magnification was 0.2 and the focal length of the projection lens was 40 mm, thus $d_{lmax} - d_{lmin}$ was 8 mm. In this case the lens position sensitivity needed to be below 0.003 to achieve a measurement with a precision of 1 part in 10,000.

The in-focus object distance for a particular value of lens position $d_l$ can be expressed as:

$$o = \frac{M_B^2(d_l^2 + (d_0 + f_3)(f_3 - d_l)) + (1 - M_B)f_1(d_0 - d_l)}{d_0 - d_l} \quad (33)$$

which applies for any value of $d_0$. Equation 33 can easily be solved for $d_l$ in terms of o, but the result is a large expression that is not very illuminating, so is not shown here.

Using Equation 27, one can calculate the lens position sensitivity as:

$$\frac{\partial M_{cr}}{\partial d_l} \frac{1}{M_{cr}} = \frac{2d_l - (d_0 + d_e + f_3)}{d_l^2 - d_l(d_0 + d_e + f_3) + d_0(d_e + f_3) + f_3^2} \quad (34)$$

Using Equation (33) one can then determine the in-focus object range corresponding to a given lens position.

Figure 28:
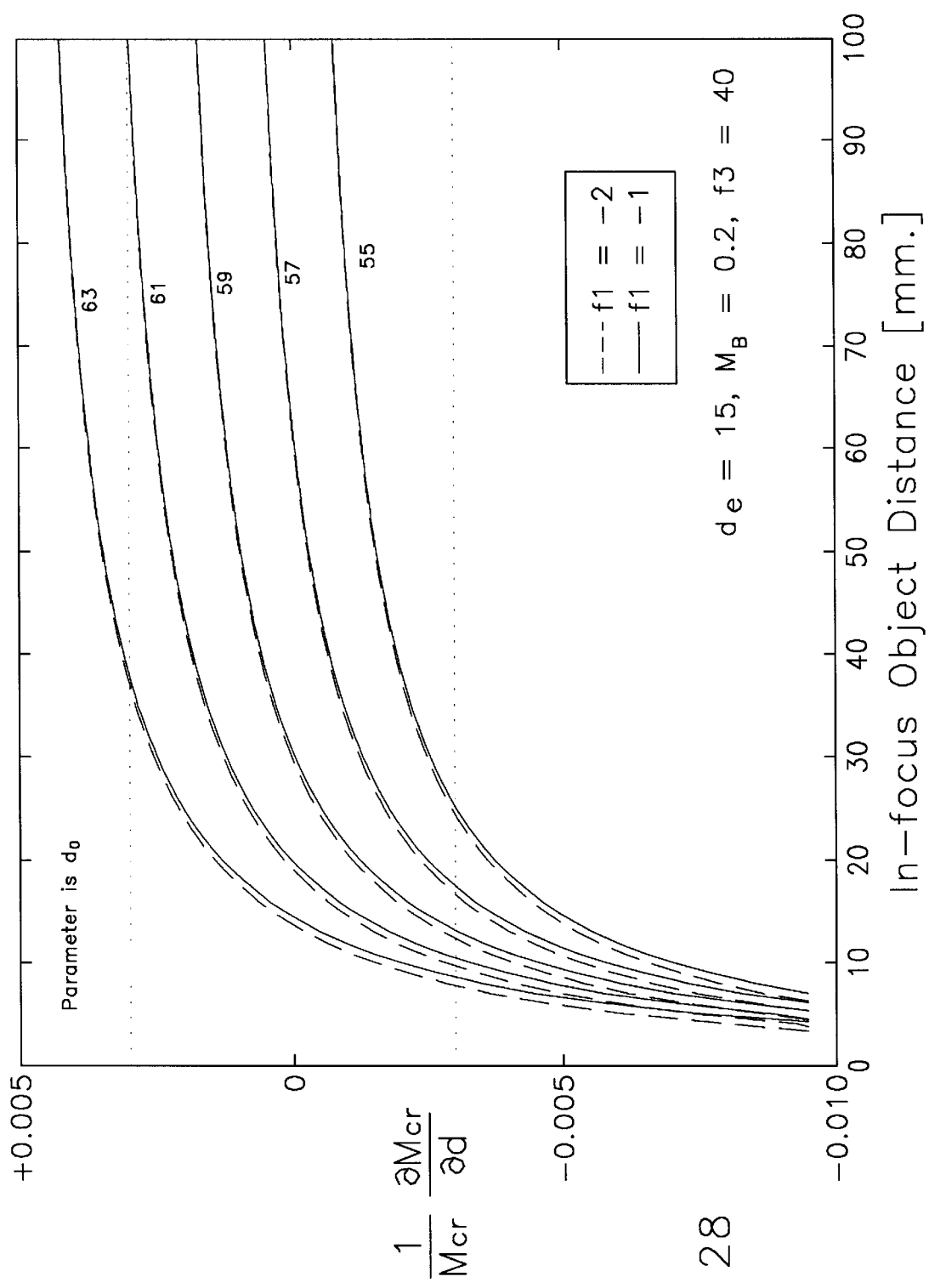
FIG. 28 is a chart showing the lens position sensitivity, which is proportional to the error in a perspective measurement due to uncertainty in the magnification of the optical system.

FIG. 28 shows curves of the lens position sensitivity as a function of the in-focus object distance with the layout distance, $d_0$, as a parameter, for the particular construction previously mentioned. Two sets of curves are shown, one for $f_1 = -1$ mm. and the other for $f_2 = -2$ mm. One can immediately see that it is only at short object ranges that the internal design of the borescope matters to this analysis. (Of course, the magnification and the exit pupil distance of the borescope must be determined.) A pair of dotted horizontal lines illustrate limiting values of ±0.003 for the lens position sensitivity that are being used for the current example.

The suggested layout parameters given above correspond to $d_0$=63 mm. For that layout, the maximum value of the lens position sensitivity reaches ±0.005 at infinite object distance. The value reaches −0.005 at object distance $z_{min}$, which is 6.6 mm. for $f_1$=−1 mm., as explained earlier. If it is necessary to operate over this range of object distances, and if a lens position sensitivity of 0.005 or less is acceptable, then this is a good way to set the system up. However, if one requires that the magnitude of the lens position sensitivity be no greater than 0.003, then this can be achieved, for the suggested layout, only over a range of object distances from about 8 mm. (for $f_1$=−1 mm.) to about 37 mm.

If, instead, the criterion is to achieve the maximum range of object distances while maintaining a lens position sensitivity no greater than 0.003, then it is clear that the curve that reaches an asymptote of ±0.003 at infinity is the one to use. This corresponds to $d_0$=59.8, which is not depicted as a curve in FIG. 28, but will lie proportionally between the curves depicted for 59 and 61 mm. If on the other hand, the maximum range of interest were 100 mm., then the curve that reaches +0.003 at 100 mm. would be the one to use, which means that $d_0$ should b e chosen to be (close to) 61 mm. In this latter case, the minimum object distance for which the lens position sensitivity meets the requirement is approximately 10 mm.

In any case in which the suggested layout parameters given above are not used, one must calculate the resulting minimum and maximum lens distances, $d_l$, which give the desired minimum and maximum in-focus object distances, using the solution of Equation (33). In particular, the curve for $d_0$=55 is of interest, as in that case, $d_0=d_e+f_3$. In this case, the lens must be brought closer to the exit pupil than $f_3$ for any finite object distance that is to be brought into focus.

7e. Additional Considerations

If the borescope is not afocal, then there is some finite object distance at which the ray bundles passing through the exit pupil of the scope are collimated. These bundles will be focused at the image sensing plane when the projection lens is at position $d_l=d_0$. To focus on objects further from the scope than this nominal focal distance, it is necessary to move the projection lens closer to the image sensing plane. It turns out, to a very good approximation, that the change in projection lens position required to focus on an object with respect to the position necessary when the borescope is afocal, is independent of the distance to the object. (It does depend on what object distance the borescope is focused on, of course.) Thus, one merely need provide some extra motion capability for the projection lens in the positive direction, to be able to handle this. If very short object distances, say within 5 times the focal length of $f_1$, must be focused on, then an additional amount of extra lens motion capability will be required, and this extra amount must be determined by experiment or by use of the actual design parameters of the borescope.

The suggested layout of FIG. 24 is specified with reference to the exit pupil of the scope, which is accessible and easily located. The more detailed layout and discussion based on FIG. 27 references the principal plane of the eye lens of the scope, which is not accessible. A key question is therefore, how accurately does this principal plane location have to be determined? By substitution, one can verify that neither the chief ray magnification of Equation (27) nor the lens position sensitivity of Equation (34) changes when the quantities $d_e, d_l$, or $d_0$ are all changed by the addition of the same constant value. The object distance corresponding to a given lens position of Equation (33) does change, but the change is $M_B^2$ times the constant offset, which is negligible in nearly all cases when an endoscope is being used. Thus, the principal plane location does not need to be accurately determined.

To determine the paraxial angular magnification, $M_B$, of a borescope, one simply measures the ratio:

$$M_B = \frac{\text{Apparent Field Angle}}{\text{True Field Angle}}$$

for an object that subtends a small angle centered on the optical axis. It is important to use a small true field angle for this determination because of the large Seidel distortion of a borescope.

A good way to do this is to use a small, low-power telescope with an internal reticle that has marks that subtend a small angle, say 1 degree or less. If the angle subtended by the marks is unknown, one simply measures the distance subtended by these marks on some distant object, and then determines twice the tangent of half the angle by dividing the distance subtended by the marks by the range of the object. It is a good idea to place a small aperture, of about the same diameter as the exit pupil of the borescope, in front of the telescope while doing this calibration. (This gets the level of illumination close to what it will be in the following step, and ensures that aberrations in the telescope will be about the same in both steps.) Once one has a telescope with a known angular subtense between internal reference marks, one simply aligns this telescope with the exit pupil and optical axis of the borescope and examines the view through the borescope with the telescope. The angular distance between the reference marks is then taken as the apparent field angle. One repeats the process of determining the distance subtended by the reference marks, at some known range, through the borescope. This gives the true field angle. If one is uncertain about where the origin of the range measurement is to be located on the borescope, one simply determines the distance subtended by the marks at two different ranges along the line of sight and divides their difference by the difference in ranges to get twice the tangent of the true field angle.

7f. Review of Data Processing in Perspective Measurement

In Application 1 I fully disclosed how the data are acquired and processed in order to make a perspective dimensional measurement. A brief review is given here for the convenience of the reader, so that it will then be clear how the relative magnification information is incorporated into the perspective measurement.

The fundamental process is to determine the positions of image points corresponding to points of interest on the object. When one does this for the same object points from at least two different observation positions, it is possible to locate the object points in three-dimensional space, thus determining the desired three-dimensional distances between object points. The two observation positions are denoted as P1 and P2, and were considered to be the location of the nodal point(s) of the optical system(s) of the camera(s) in three-dimensional space.

The fundamental equation for making the measurement is expressed in terms of the tangents of the angles at which a point of interest is viewed with respect to the x and y visual coordinate axes at each viewing position. These are determined using the measured positions of the video images of the point and the data from an optical calibration. Then, two vectors, called visual location vectors, are formed from these tangents, and are expressed as column matrices. These vectors are defined as:

$$\vec{a_{v1}} = \begin{bmatrix} \tan(\alpha_{x1}) \\ \tan(\alpha_{y1}) \\ 1 \end{bmatrix} \text{ and } \vec{a_{v2}} = \begin{bmatrix} \tan(\alpha_{x2}) \\ \tan(\alpha_{y2}) \\ 1 \end{bmatrix} \tag{35}$$

where, for instance, $(\alpha_{x1}, \alpha_{y1})$ are the angular positions for the point of interest that were determined at P1.

The vector connecting the nodal point of the borescope at viewing position P1 to the nodal point of the borescope at viewing position P2 is defined as the perspective displacement, $\vec{d}$. When $\vec{d}$ is expressed in the visual coordinate system, and is also written as a column matrix, then the three dimensional spatial position of the point of interest can be calculated using the following matrix equation:

$$\vec{r_m} = \begin{bmatrix} x \\ y \\ z \end{bmatrix} = \frac{1}{2}[\vec{a_{v1}}\ \vec{a_{v2}}]\ [\vec{a_{v1}}\ -\vec{a_{v2}}]^{LI}\vec{d_v} \tag{36}$$

where the subscript "v" on $\vec{d}$ indicates that here the perspective displacement is expressed in the same coordinate system as are the visual location vectors. In Equation (36) the position of the point is expressed in that coordinate system parallel to the visual coordinate system that has its origin midway between P1 and P2. Equation (36) uses the concept of the left pseudo-inverse of a matrix, which was previously defined at Equation (15).

Now determination of the orientation of $\vec{d}$ is a matter of alignment calibration, and perhaps motion calibration, which were fully disclosed in the referenced co-pending applications and will not be treated further here. Accurate determination of the visual location vectors from the measured image positions is the subject of optical calibration, and this will now be discussed in more detail.

The measured quantities are the positions of image point centroids on the image sensing plane of the camera. These measured positions must then be corrected for a generalized distortion, where I use that term here to refer to any deviation of the image position from the position that it would have if the camera were perfect according to the imaging model discussed earlier in Section 1.

The correction of measured image point position data to form ideal image point position data can be expressed as:

$$rho_{im} = rho' - rho_D = \begin{bmatrix} x'_{im} \\ y'_{im} \end{bmatrix} - \begin{bmatrix} f_{Dx}(rho') \\ f_{Dy}(rho') \end{bmatrix} \tag{37}$$

where $x'_{im}$ and $Y'_{im}$ are the measured image point coordinates and $f_{Dx}$ and $f_{Dy}$ are functions that represent the generalized distortion of the camera being used. After the image point positions are corrected, then the visual location vector can be expressed as:

$$a_v = -\frac{1}{i}\begin{bmatrix} rho_{im} \\ -i \end{bmatrix} \tag{38}$$

where i is the projection distance.

As was fully described in Application 1, in optical calibration the image positions of a number of object points are determined, where the relative positions of each of the object points have accurately been determined in a calibration coordinate system. Then, using non-linear least squares optimization, the location and orientation of the camera in the calibration coordinate system, the projection distance, i, and the parameters necessary to model the distortion in $f_{Dx}$ and $f_{Dy}$, are determined.

The error functions $f_{Dx}$ and $f_{Dy}$ define the image location errors that are to be considered in the camera calibration. A number of different error functions are used in the art. The following fairly general expression, which was given in the article "Multicamera vision-based approach to flexible feature measurement for inspection and reverse engineering", Optical Engineering, 32, 9, 2201–2215, 1993, was suggested in Application 1:

$f_{Dx}(\vec{rho_k}) = x_0 + (\alpha_1 + \alpha$ $_2|\vec{rho_k}|^2 +$ $\alpha_3|\vec{rho_k}|^4)x'_{imk} + \alpha$ $4(|\vec{rho_k}|^2 + 2x'_{imk}{}^2) +$ $2\alpha_5 x'_{imk} y'_{imk}$ $f_{Dy}(\vec{rho_k}) = y_0 + (\alpha_6 + \alpha_2|rho'$ $_k|^2 + \alpha_3|\vec{rho_k}|^4)Y'$ $imk + \alpha_5(|\vec{rho_k}|^2 + 2y'$ $imk^2) + 2\alpha_4 x'_{imk} y'_{imk}$ (39)

where, of course, $|\vec{rho_k}|^2$ = $x'_{imk}{}^2 + y'_{imk}{}^2$ and the subscript k refers to the data for the kth calibration point.

where, of course, $|\vec{rho_k}|^2 = x'_{imk}{}^2 + y'_{imk}{}^2$ and the subscript k refers to the data for the kth calibration point.

The parameters $x_0$ and $y_0$ represent the difference between the center of the image measurement coordinate system and the position of the optical axis of the camera. Parameters $\alpha_1$ and $\alpha_6$ represent different scale factors in the x and y directions. Parameters $\alpha_2$ and $\alpha_3$ represent the standard axially symmetric optical Seidel aberration called distortion. Parameters $\alpha_4$ and $\alpha_5$ represent possible non-symmetrical distortion due to tilt of the camera image sensing plane and decentration of the elements in lenses.

7g. An Improved System, Suitable for Incorporating the Relative Magnification While this system works, I have found in the time since I filed Application 1 that some improvements can be made. I now describe the best mode of distortion correction for borescopes that I am currently aware of. The generalized distortion is now represented by the third and fifth order axially symmetric Seidel aberrations together with an offset of the optical axis and different scale factors along the two measurement directions. The new distortion correction, analogous to Equation (37) is:

$$\vec{r_{im}} = F[\vec{rho'} - \vec{rho_{ic}}] - \vec{r_D}(F[\vec{rho'} - \vec{rh_{ic}}]) \tag{40}$$

where, as before, $\vec{rho'}$ is either a 2×1 column vector of the measured image point position, or is a 2×N matrix of measured image point positions. The column vector $\vec{rho_{ic}}$ is the offset of the optical axis with respect to the image measurement coordinate system. This offset is the same for all image points; if there is more than one point, then a 2×1 vector $\vec{rho_{ic}}$ is multiplied by a 1×N vector of ones.

The scaling factor matrix, F, is defined as:

$$F = \begin{bmatrix} \frac{1}{i_x} & 0 \\ 0 & \frac{1}{i_y} \end{bmatrix} \quad (41)$$

where $i_x$ and $i_y$ are effectively, the projection distances for the x and y directions. There are two scaling factors because video measurements usually produce data that correspond to different physical distances on the camera image sensing plane for each increment of output. The value of $i_y$ is just $i_x$/Ratio, where Ratio is a constant and where Ratio is determined during optical calibration.

The quantity $\vec{t_{im}}$ calculated by Equation (40) contains the negative of the true tangents of the viewing angles rather than image coordinates, so that the visual location vector is now:

$$\vec{a_v} = \begin{bmatrix} -\vec{t_{im}} \\ 1 \end{bmatrix} \quad (42)$$

In Equation (40), the quantity $\vec{t_D}$ is the distortion aberration function, which is defined as:

$$\vec{t_D}(\vec{s}) = [a(2|\vec{s}|^2-1)+b(6(|\vec{s}|^4-|\vec{s}|^2)+1)]\vec{s} \quad (43)$$

and which represents axially symmetric distortion of third and fifth orders, and in which $|\vec{s}|^2 = s_x^2 + s_y^2$. In Equation (43) the Seidel distortion is expressed in terms of the radial Zernike functions, rather than as simple powers of the variable. The Zernike functions are orthogonal over the unit circle, and since the tangents of the viewing angles extend over a region of about that size, the Zernike functions are much closer to orthogonal than are simple powers of the variable. I have found that using them this way helps convergence and stability of the non-linear least squares parameter fit used in calibration.

In order to use the relative magnification concept in the measurement system, it is necessary to make the projection distance, $i_x$, and the image offsets, $\vec{rho_{ic}}$, accurately determined functions of the lens position, $d_l$.

For the second embodiment, as the projection lens moves, the position of the system optical axis on the image sensing plane will vary (unless the alignment of the system is precisely correct). However, as explained earlier, the position of the center of the entrance pupil does not vary with focal state. Thus, not only do the projection distance and image offsets vary with focal state, but so does the orientation in space of the optical axis of the camera.

In calibration, which is detailed in the next Section, a relative magnification, proportional to the chief ray magnification of Equation (27), is determined as a function of position of the lens. I denote this relative magnification as $M_{rel}(d_l)$. Also determined is a relative offset or deviation of the optical axis, $\vec{o}(d_l)$. When the optical calibration of the system is performed, the projection lens is at some specific position that is now denoted as the reference lens position, $d_r$. It is assumed here that the alignment calibration of the complete measurement system is also performed at this same reference lens position. One can incorporate a detent or some other mechanical reference position in the focus drive mechanism of the system being calibrated, and define this focus position as the reference lens position, so that the same reference lens position can be obtained repeatedly, if desired.

In the process of measurement data to take the relative magnification into account, first, the image of sets are corrected for the deviation due to the moving lens:

$$\vec{rho_{ic}}(d_l) = \vec{rho_{ic}}(d_r) - (\vec{o}(d_l) - \vec{o}(d_r)) \quad (44)$$

Next, the scaling matrix of Equation (41) is calculated as:

$$F(d_l) = \frac{M_{rel}(d_r)}{M_{rel}(d_l)} \begin{bmatrix} \frac{1}{i_x} & 0 \\ 0 & \frac{1}{i_y} \end{bmatrix} \quad (45)$$

Equivalent camera rotations are then calculated as:

$$\begin{bmatrix} \theta_x(d_l) \\ \theta_y(d_l) \end{bmatrix} = \begin{bmatrix} \frac{1}{i_x} & 0 \\ 0 & \frac{1}{i_y} \end{bmatrix} (\vec{o}(d_l) - \vec{o}(d_r)) \quad (46)$$

and, finally, the orientation of the perspective displacement in the rotated camera coordinate system is calculated as:

$$\vec{d_v}(d_l) = R_y(\theta_y(d_l))R_x(\theta_x(d_l))\vec{d_v}(d_r) \quad (47)$$

where $\vec{d_v}(d_r)$ is the perspective displacement as determined according to the alignment calibration and where $R_y$ and $R_x$ are three dimensional rotation matrices as were fully disclosed in Application 1.

If translation stage 780 (FIG. 23) has a roll motion error, the lens will be rotated about a center of rotation as it translates. This center of rotation will most likely be displaced far from the center of the lens. However, the only effect of this error in the second embodiment is to add an additional term to the offset of the image which will be automatically taken into account by the procedure just described.

8. Calibration of the Second Embodiment

In this embodiment the position of the projection lens is measured and the parameters necessary to making an accurate measurement are calibrated as a function of lens position. Thus, there is no need to achieve an accurate alignment between the measurement focus adapter 800 (FIG. 22) and the borescope. It is still required that the image remain on the image sensing plane of the video camera as the focal state of the system is changed, so there may be a need for a coarse alignment, which can be performed as discussed for the first embodiment, Sections 4*e* and 4*f*.

8a. Determination of Relative Magnification and Optical Axis Deviation.

In the alignment of the first embodiment, Section 4*b* above, a method of determining the relative magnification between two images was taught. For this second embodiment what is required is that the relative magnification be determined as a function of the position of the projection lens. In order to do this, images of an object must be measured at a series of lens positions, and then these data must be combined in such a way as to determine the desired function. Also, it is clear that unless there happens to be perfect alignment of the system of this second embodiment, there will be a shift of the position of the optical axis as the projection lens is moved. This shift must also be determined as a function of lens position.

According to Equation (27), the relative magnification is a quadratic function of the position of the lens. Thus, the calibration procedure seeks to determine the best fit quadratic function that matches the experimental data. An analysis similar to that performed for the first embodiment that resulted in Equation (23) shows that the offset of the image in this second embodiment is also expected to be a quadratic function of the lens position (in distinction to the first embodiment, where it is linear). As discussed below, I have found that there are small deviations from a quadratic offset which are caused by lateral errors in the translation stage motion. Thus, I use a cubic function to fit the offset.

The calibration is based on the following model of the relative magnification process:

$$\vec{r}^T(d_l) = M(d_l; d_r)[\vec{r}^T(d_r) - \vec{r}_0 \vec{1}_n^T] + \vec{r}_0 \vec{1}_n^T + \vec{o}(d_l; d_r) \vec{1}_n^T \quad (48)$$

where $M(d_l; d_r)$ is the relative magnification at lens position $d_l$ with respect to the magnification at reference lens position $d_r$, where $\vec{r}(d_r)$ is an N×2 matrix containing the coordinates of the N points in the image at the reference position, where $\vec{r}_0$ is a 2×1 matrix containing the coordinates of the center of magnification, where $\vec{1}_n^T$ is a 1×N matrix containing ones, and $\vec{o}(d_l; d_r)$ is a 2×1 matrix containing the offset or deviation of the optical axis in the image plane at lens position $d_l$ with respect to its position at the reference lens position. For self consistency, this model requires that $M(d_r; d_r) = 1$ and $\vec{o}(d_r; d_r) = \vec{0}$.

The center of magnification will be at the position of the optical axis that is determined during the standard optical calibration, so those data can be used if they are available. As I will show, one can also estimate the center of magnification using only the data obtained during relative magnification calibration, so it is not necessary that an optical calibration be performed prior to a relative magnification calibration.

One can easily solve Equation(48) to determine $\vec{r}(d_r)$ in terms of $\vec{r}(d_l)$, so that once the magnification and offsets are determined, one could use that expression to determine the image that would have been observed had the lens been at the reference position, given an experimental image that was observed at some experimental lens position. This estimated reference image could then be used in the original measurement calculation as given by Equations (40–43) to take into account the changes in relative magnification and offset in the perspective dimensional measurement. I prefer to use this procedure in an instrumented version of the first embodiment, where the image sensing plane is moved to change the focal state. However, for the second embodiment, where the projection lens is moved, I prefer to use the processing procedure given above in Equations (44–47). In my trials to date, the difference in results between these two options was insignificant.

8b. Detailed Calibration Procedure for a Single Set of Calibration Images

For the first embodiment a lot of effort was put into alignment of the system so that the offset of the image was constant as function of focal state. The same thing could be done for this second embodiment, but it is not necessary, since the offset can be calibrated along with the relative magnification.

The calibration begins by setting up a suitable array of calibration target points. These points should be distinctive, in the sense that it is easy to align a video cursor with the image of a calibration point, but unlike the optical calibration as taught in Application 1, there is no need to know the relative positions of the calibration points. There is also no need to ensure that target points exist at more than a single range from the borescope optical system, that is, the points can conveniently be arranged on a plane oriented perpendicular to the optical axis of the borescope.

One then generates a set of calibration images by measuring the positions of the images of the target points for each lens position over a set of lens positions. Ideally, the set of lens positions includes positions on both sides of the position at which the array of targets is in best focus.

The next step is to calculate a reference image as the mean of all the images in the calibration set. That is, if there are K images, each of which contains N calibration points, and if the jth image is denoted as $[\vec{x}_j \ \vec{y}_j]$ where $\vec{x}_j$ is an N×1 vector of the x positions measured in the jth image, then the reference image is the N×2 matrix $[\vec{x}_{1y} \ \vec{y}_{1y}]$ that is the mean of the K individual N×2 matrices.

$$[\vec{x}_{rref} \vec{y}_{rref}] = [(\vec{x}_{ly} - \langle\vec{x}_{ly}\rangle)(\vec{y}_{ly} - \langle\vec{y}_{ly}\rangle)] \quad (49)$$

Likewise, for each experimental image, calculate its centroid, and define the jth reduced experimental image, $[\vec{x}_{rexj} \vec{y}_{rexj}]$, as the jth image minus its centroid.

Then, calculate the x and y relative magnifications, and a weighted mean relative magnification, $M_j$, for each experimental image with respect to the reference image, using Equations (15–17). This gives a set of K weighted mean relative magnifications corresponding to the K experimental images. Given the $M_j$, it is straightforward to determine the parameters of a quadratic curve that best fits these relative magnification estimates as a function of lens position. Methods for performing such a curve fit can be found in the book Numerical Recipes, which was referenced above in Section 7a.

If the results of a previous optical calibration are not available, then for each experimental image estimate a center of magnification, $[r_{0xj} r_{0yj}]^T$ as:

$$r_{0xj} = \frac{[\langle x_l \rangle - M_j \langle x_{ly} \rangle]}{1 - M_j} \quad (50)$$

$$r_{0yj} = \frac{[\langle y_l \rangle - M_j \langle y_{ly} \rangle]}{1 - M_j}$$

and form an overall estimate of the center of magnification center, $[x_c y_c]^T$, by averaging the estimates for those images where $|1 - M_j| > t$, where the threshold t depends on the amount of noise in the measurements. One determines t by examining the individual center estimates $[r_{0xj} r_{0yj}]^T$ and determining what threshold is necessary to eliminate those estimates that are wildly wrong. For instance, due to measurement noise, it is quite possible to obtain center estimates that lie far outside the boundaries of the image when the magnification is very close to 1. In the calibration of a particular construction of the second embodiment, I found that a threshold of t=0.001 was satisfactory.

If the results of an optical calibration are available, then one simply uses the calibrated location of the optical axis as the center of magnification.

A residual of the jth image, $[\vec{x}_{rj}\vec{y}_{rj}]$, is then estimated as:

$$\vec{x}_{rj} = \vec{x}_j - M_j(\vec{x}_{ly} - x_c)$$

$$\vec{y}_{rj} = \vec{y}_j - M_j(\vec{y}_{ly} - y_c) \tag{51}$$

and the deviation (additional offset) of the optical axis at lens position j with respect to the reference position is estimated as:

$$\vec{o}_j = \begin{bmatrix} \langle \vec{x}_{rj} \rangle - x_c \\ \langle \vec{y}_{rj} \rangle - y_c \end{bmatrix} \tag{52}$$

Experimentally, I have found that the standard deviation of the offset estimate is equal to the standard deviation of the image point position estimate divided by the square root of the number of points in the image. That is, for instance, if there are 100 points in each calibration image, then the repeatability of the offset is expected to be 0.1 of the basic per-point position repeatability. This is consistent with what one would expect from standard statistical arguments.

In FIG. 16 it was shown that the standard deviation of the relative magnification estimate is proportional to the inverse of the number of points in the image. Therefore, depending on the requirements of a given calibration, one will find that the required number of calibration points in each calibration image is determined by either the repeatability in the estimate of the relative magnification or the repeatability in the estimate of the offset.

8c. Detailed Procedure to Combine Multiple Sets of Calibration Images

The procedure detailed in the previous Section generates a linear least squares estimate of the relative magnification and a linear estimate of the offset for each image in the calibration set. However, as the lens position changes, the calibration images go into and out of focus. Since it is more difficult to determine the position of out-of-focus images, the noise in the measurement increases as the images go out of focus. Thus, the determination of relative magnification tends to have larger errors at the ends of the lens position range. There are also more complicated optical effects going on that will be discussed further below. To reduce the effects of these errors, I recommend that one determine the relative magnification using several sets of images, where the sets differ in that the calibration target array is located at different ranges from the borescope.

Since the relative magnifications and offsets determined for each calibration set is relative to the reference image of that set, these estimates cannot be directly compared between sets. That is, the absolute magnification of each set of images depends on the range of the target points for that set. In addition, the reference image of each set corresponds to some undetermined reference lens position for each set, and these reference positions are not the same from set to set. These multiple sets of relative magnification and offset estimates must be combined in some reasonable way. I use the following procedure to accomplish this.

As an example, assume that three sets of relative magnification calibration images have been measured, and the procedure detailed in the previous Section has been applied to each set in turn. Thus, one has three sets of relative magnification estimates, three sets of offset estimates, and three sets of known lens positions. Represent the sets of relative magnification estimates as:

$[m_{11}m_{12} \ldots m_{1j}]$ at positions $[P_{11}P_{12} \ldots P_{1j}]$ $[m_{21}m_{22} \ldots m_{2k}]$ at positions $[P_{21}P_{22} \ldots P_{2k}]$ $[m_{31}m_{32} \ldots m_{3l}]$ at positions $[P_{31}P_{32} \ldots P_{3l}]$ where there are j lens positions in the first set, k positions in the second, and l in the third.

To match these to a single reference lens position, first choose one set to be the master set. Assume that the first set is chosen as the master. Then, the other two sets are matched to the master by a non-linear least squares optimization process, which attempts to reduce the following quantity to zero:

$$Q = |[[m_{11}m_{12} \ldots m_{1j}]s_2[m_{21}m_{22} \ldots m_{2k}]s_3[m_{31}m_{32} \ldots m_{3l}]] - m(P)|^2 \tag{53}$$

where $s_2$ and $s_3$ are scalars, P is simply a vector of the corresponding experimental lens positions:

$$P = [p_{11}p_{12} \ldots p_{1j}p_{21}p_{22} \ldots p_{2k}p_{31}p_{32} \ldots p_{3l}] \tag{54}$$

and where $m(P) = aP^2 + bP + c$, where a, b, and c are scalars and where $P^2$ denotes the vector in which every element of P is multiplied by itself. In other words, the five parameters $s_1$, $s_2$, a, b, c are adjusted in order to minimize the distance between the previously determined relative magnifications for each lens position and a quadratic model of the relative magnification, where two of the parameters serve to scale the relative magnifications determined in the non-master sets to match those of the master set.

Figure 29:
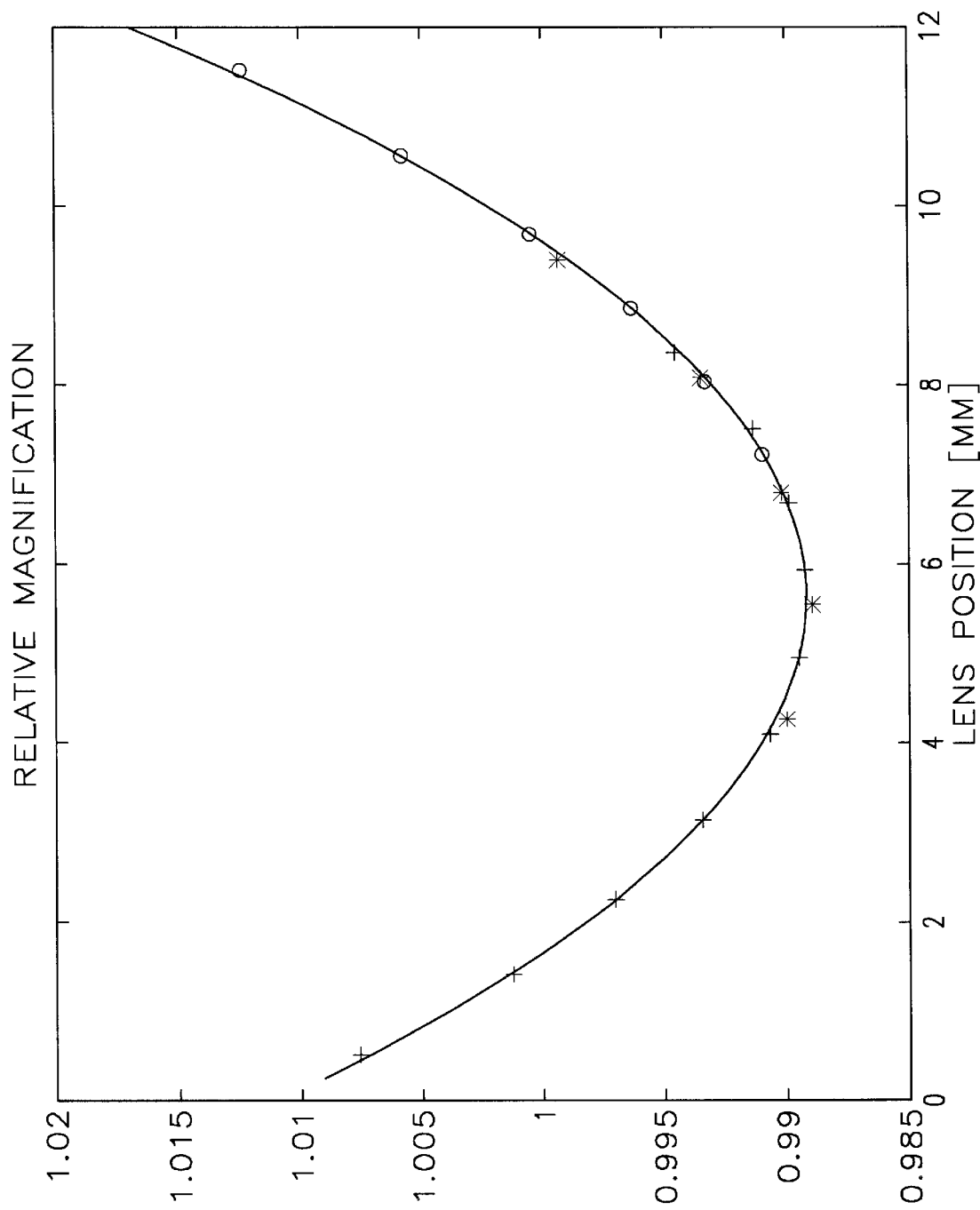
FIG. 29 is a chart showing the experimentally determined relative magnification for a specific construction of the second embodiment.

FIG. 29 shows an example of the results of this process for a particular construction that was built, in which three sets of calibration images were used. In FIG. 29 the different symbols represent the relative magnifications determined for each set of images. They were all brought to the same quadratic curve using the process just described, where the best fit curve is indicated by the solid line.

In a similar manner, the offsets can all brought to a consistent scale by first calculating the mean of the centers of magnification calculated for each set of images to form a global center of magnification, $[x_{gc}y_{gc}]^T$ (unless the location of the optical axis is determined from a previous optical calibration; then it may be used instead). Then, the offset for each lens position for each image set is estimated using Equations (51) and (52), replacing $M_j$ with the scaled versions for the second and third sets, and replacing $x_c$ and $y_c$ with $x_{gc}$ and $y_{gc}$. Next, these offset estimates are matched up to a single cubic by a non-linear least squares optimization in which this quantity Q is made as small as feasible:

$$Q = |[[\vec{o}_{11}\vec{o}_{12} \ldots \vec{o}_{1j}][[\vec{o}_{21}\vec{o}_{22} \ldots \vec{o}_{2k}] + t_2][[\vec{o}_{31}\vec{o}_{32} \ldots \vec{o}_{3l}] + t_3]] - \vec{o}(P)|^2 \tag{55}$$

where $t_2$ and $t_3$ are scalar shifts and where $\vec{o}(P)$ is:

Unlike the relative magnification, this estimate of the offset is not well founded, since the offset depends very much on the reference image, which is different for each of the data sets. Thus a final non-linear estimate of the offset is made by fitting all of the individual data points in all of the images to reference images for each set, as well as fitting the parameters in Equation (56) for the offset function. In other words, in this final fit, the reference images for each data set are added to the parameters to be fit. I also add a constraint to ensure that the offset is zero when the relative magnification is 1. To this final fit could also be added the relative magnification parameters, but I have found that using the previous linear least squares results for the relative magnification, fit together as specified above, leads to a fit with residuals at the level of the noise in the individual point location measurements.

$$\vec{o}(P) = \begin{bmatrix} o_x(P) \\ o_y(P) \end{bmatrix} \quad (56)$$

$$= \begin{bmatrix} a_x P^3 + b_x P^2 + c_x P + d_x \\ a_y P^3 + b_y P^2 + c_y P + d_y \end{bmatrix}$$

To summarize, a final nonlinear least squares constrained optimization is performed where the constraint is $$m(p_{ref})=1 \text{ (pick one solution)}$$

$$\vec{o}(p_{ref}) = \begin{bmatrix} 0 \\ 0 \end{bmatrix}$$

where $P_{ref}$ refers to a lens position derived from the relative magnification fit and where the quantity to be minimized is:

$$Q = |[\vec{r_{11}}\vec{r_{12}} \ldots \vec{r_{1j}}\vec{r_{21}}\vec{r_{22}} \ldots \vec{r_{2k}}\vec{r_{31}}\vec{r_{32}} \ldots \vec{r_{3l}}]$$

$$-\vec{r}(\vec{r_{ref1}}, \vec{r_{ref2}}, \vec{r_{ref3}}, \vec{o}(P); m(P))|^2 \quad (57)$$

where the $\vec{r_{11}} \ldots \vec{r_{3l}}$ are the measured calibration images, where $\vec{r_{ref1}}$, $\vec{r_{ref2}}$, and $\vec{r_{ref3}}$ are reference images for each of the three sets of calibration images, and which are adjustable parameters in the fit, and where o(P) is the same cubic fit as detailed in Equation (56). In Equation (57), m(P) is not a fit parameter; the values determined as a result of the optimization of Equation (53) are used. The model for the relative magnification of the image $\vec{r}$ ($\vec{r_{ref1}}$, $\vec{r_{ref2}}$, $\vec{r_{ref3}}$, $\vec{o}$ (P); m(P)), is that given in Equation (48).

Figure 30:
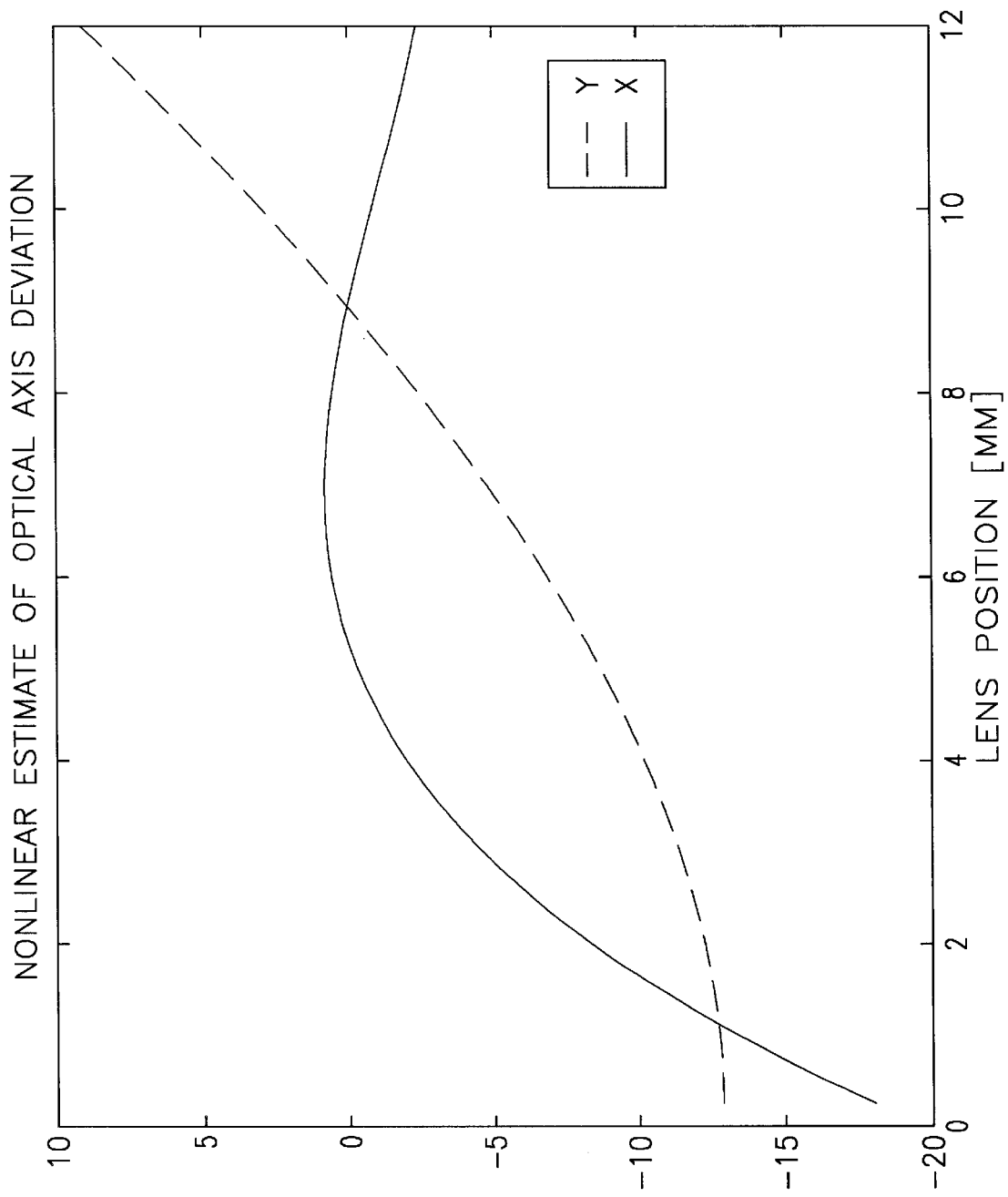
FIG. 30 is chart showing the experimentally determined deviation of the optical axis for a specific construction of the second embodiment.

FIG. 30 shows the result of such a non-linear estimate of the offset (deviation of the optical axis) for data similar to that which resulted in FIG. 29. The units of the offset are image measurement units; these directly compare with the raw measurement data, except that for this figure, the estimate of the offset in the y direction has been scaled by Ratio to give values that can be directly compared with those for the x direction. Each unit of offset on FIG. 30 corresponds to a distance of approximately 0.0018 mm. at the image sensing plane for the particular construction being calibrated.

8d. Additional Considerations

Upon close examination of FIG. 29, it becomes clear that the largest deviations from the curve occur at the ends of the individual ranges of lens position. These maximum deviations are in magnitude about $5 \times 10^{-4}$, which is much larger than would be expected from FIG. 16, given the number of points used in these images. The deviations are also systematic, in that they are reproduced in other data sets taken with the same setup. Clearly, it is the case that the optical system does not act exactly as depicted in FIG. 24 and as expressed by Equation (27). By definition, the height of the chief ray (or, more precisely, the centroid of the ray bundle) on the image bundle does not change with lens position for a fixed object as exactly as given by Equation (27) for all object ranges. The relationship holds when the object is in focus, with gradually increasing deviations as the image gets increasingly out of focus.

When perspective dimensional measurements were made with this system, it was found that the measurements were systematically too large on one side of best focus, and systematically too small on the other side of best focus. The level of the error approached 1% of the distance being measured when the images were grossly out of focus. This is not necessarily a problem, since the whole point of this system is to enable measurements to always be made with the images in good focus. However, this does mean that the measurement result now has some sensitivity to the accuracy to which the image is focused.

For extremely critical measurements, this situation can be handled by further calibration effort. Since the error has a systematic cause, it can be eliminated, unlike the case of the measurement by focus systems, where the lack of focus repeatability directly causes a lack of repeatability in the measurement.

These deviations are due to aberrations and vignetting. A more detailed analysis of the optical system of this second embodiment shows that both pupil spherical aberration and pupil vignetting in the borescope produce changes in image height that are linear in the position of the projection lens, as it moves away from the in-focus position. The slope of this linear change is a function of the object distance. Because both pupil aberration and vignetting are functions of field angle, these changes in image height tend to act as changes in the distortion of the image, rather than in its magnification. However, since the distortion is not characterized in the procedures taught above, a change in distortion can be interpreted as a change in magnification. Thus one would expect deviations from the fitted curve of relative magnification exactly as shown in FIG. 29.

Therefore, one can improve this situation by characterizing the distortion of the image, as well as its size, as a function of the position of the projection lens. One does this by adding a distortion term, such as either the first term or both terms of Equation (43), to the relative magnification model of Equation (48) to produce an augmented relative magnification model. After performing an initial calibration procedure as detailed above, one then repeats the final nonlinear least squares constrained optimization represented by Equation (57) using the augmented relative magnification model, to estimate the distortion as a function of lens position as well as the relative magnification and offset. In this case, the relative magnification estimates are included as parameters to be fit. One then uses the relative magnification and offset in Equations (44–47) and incorporates the variable distortion into Equation (44) to take the variable distortion into account in the perspective dimensional measurement.

One can also reduce the change in distortion in out of focus images for extremely critical applications by modifying the optical design of the projection lens. The distortion due to the projection lens will be a function of the position of the lens, given that the distance between the exit pupil of the borescope and the image sensing plane is fixed. The projection lens can be designed so that this change in distortion is approximately linear in the position of the lens, so that it is possible to correct for the pupil spherical aberration of the borescope with a compensating aberration of the projection lens. Of course, one has to have knowledge of the internals of the borescope, or has to characterize it exceedingly well, in order to pursue this solution.

For the particular construction for which the data have been presented, the distortion due to the projection lens itself was found to be very small, and quadratic in its position, so it was not the cause of, and could not be used to correct, the deviations being discussed here.

9. Description of a Third Embodiment

Figure 31:
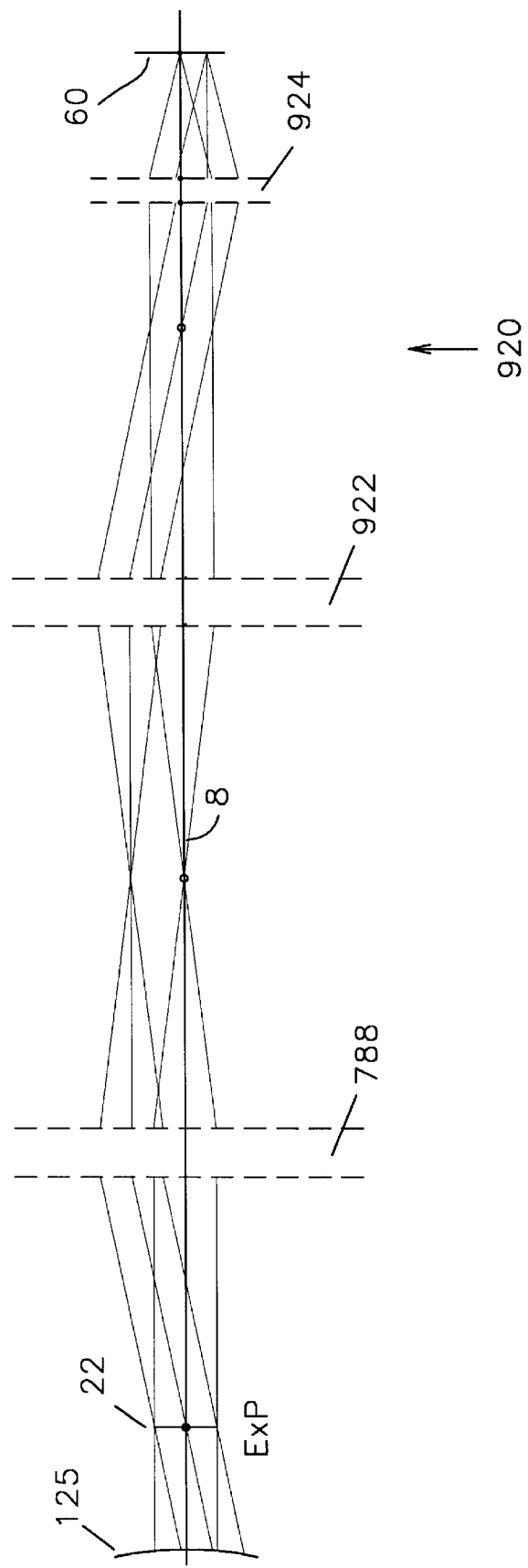
FIG. 31 shows a thick lens optical layout for a third embodiment of a measurement camera to be used with an endoscope.

The optical system of a third embodiment of a measurement camera for use with a borescope is depicted in FIG. 31. The left hand side of this Figure is the same as FIG. 11, because the optical system is a modification of that of the first embodiment. As in the first embodiment, a most proximal lens vertex 125 of a borescope is shown, as is also a borescope exit pupil 22. A projection lens 788 is located centered on optical axis 8 at a distance of one focal length away from exit pupil 22, just as in the first embodiment.

At the right hand side of FIG. 31 is a generic image sensing plane 60. The sensing plane is denoted by a different number than it was in either of the first two embodiments to indicate the fact that with this third system, no particular sort of image sensing plane is preferred.

Located between projection lens 788 and image sensing plane 60 is an afocal focusing lens group 920 that consists of a first focusing lens 922 and a second focusing lens 924. Lenses 922 and 924 are arranged to form an afocal system, that is, they are separated so that the rear focal point of lens 922 coincides with the front focal point of lens 924. Because lens group 920 is afocal, the exit pupil of the system, which was at infinity due to the telecentric arrangement of projection lens 788 and borescope exit pupil 22, remains at infinity as viewed from image sensing plane 60.

For illustration purposes, sensing plane 60 is located at a distance of 2 ($f_{922}+f_{924}$) from the back focal plane of lens 788, where this is the thin lens spacing and the physical distance is increased by the distances between the principal planes of the lenses. As depicted, the front focal point of lens 922 coincides with the rear focal point of projection lens 788. The optical rays shown in FIG. 31 are drawn assuming that the object is at infinity and that the borescope itself is afocal.

As is known in the art, provided that the focal lengths of first focusing lens 922 and second focusing lens 924 are not the same, it is possible to focus the image of objects at various distances onto image sensing plane 60, where sensing plane 60 is fixed in position, by an axial motion of focusing lens group 920. Thus, the optical system shown in FIG. 31 provides for telecentric imaging, so that changes in focal state do not affect the magnification, while also providing for a fixed image sensing plane location. The fact that the image sensing plane location is fixed means that a video camera back, such as video camera back 134 shown in FIG. 22, can be incorporated into a perspective measurement camera adapter without requiring a lens position transducer as does the second embodiment, or without requiring a mechanical motion of camera back 134 with respect to the borescope, as suggested by the first embodiment.

The focal state of the optical system of the third embodiment is adjusted by shifting focusing lens group 920 along the optical axis as required. Since the two lenses that make up group 920 remain at fixed relative positions, focusing group 920 comprises a single moving component. As explained in connection with the first embodiment, as an object comes in from infinity, the plane at which its image is in focus moves away from the rear focal plane of projection lens 788 toward image sensing plane 60. As this image moves back by a distance Si, focusing group 920 is moved forward (that is, away from the image sensing plane) by a distance $$xt = \left(\frac{f_{924}^2}{f_{922}^2 - f_{924}^2}\right)\delta i \qquad (58)$$

in order to maintain focus at sensing plane 60. Focal shift $\delta i$ is related to the distance of the object through Equation (10).

The axial location of sensing plane 60 is not critical. While it is convenient to use the layout shown in FIG. 31, the system performs similarly, and the focal motion requirement of Equation (58) remains unchanged, over a wide range of sensing plane positions. If a different axial location for image sensing plane 60 is used, then the position of focusing group 920 will be different than that depicted when an object at infinity is being viewed. What is required is that a real image be formed at a position to the right (in FIG. 31) of lens 924 and that lens 922 lie to the right of lens 788, for all focal states of interest.

It is possible to use a negative focal length lens for one or the other of lenses 922 and 924. If a negative focal length lens is used, the absolute value of its focal length must be smaller than the focal length of the other lens. Focusing group 920 can be mounted to a translation stage and driven by a cam and pin arrangement similar to that used for the second embodiment as shown in FIGS. 9 and 23, or any other known lens positioning system may be used as well. Similarly to the first embodiment, if the lens is not moved along an accurate straight line path, or at least along a repeatable path, this will contribute to measurement error.

Because the magnification of afocal group 920 need not be set to any particular value, there is an additional degree of freedom in the design of the system. That is, there is now additional flexibility in the matching of the size of image sensing plane 60 to the apparent field of view of the borescope. In addition, with more lens surfaces available, it may be easier to correct the pupil aberrations of the borescope, and thus obtain more accurate measurements.

The disadvantages of this embodiment are the expense of the additional lenses and the increase in length of the system. Use of a negative focal length lens in group 920 will shorten the length of the system somewhat.

In order to perform the alignment of the system of the third embodiment, one uses similar considerations and methods as those already discussed in conjunction with the first embodiment. One can, of course, avoid the necessity of precise alignment of the system by instrumenting the position of lens group 920 as was taught in the discussion of the second embodiment (shown in FIGS. 23 and 25) and using the methods taught there to determine any or all of the magnification, the position of the optical axis, and the generalized distortion as a function of focal state.

10. Description of Additional Embodiments

The emphasis of the first three embodiments was on optical systems that could be combined with a borescope to perform metrology without having to recalibrate the instrument after a focus adjustment. The following embodiments are applicable to general metrological applications as well as to endoscopic applications.

In all of these embodiments, the focal state of the system is adjusted by moving a single component; this component may be made up of several individual elements which move in unison. Just as in the first three embodiments, in order to obtain accurate measurements, one must ensure that the focusing component moves in a repeatable manner. In those embodiments which do not inherently require instrumentation, one can either arrange to align the system precisely, or one can instrument the focal state and determine how the magnification, the alignment, and the distortion vary with focal state. In those embodiments which require instrumentation of the focal state, one still has the choice of aligning the system precisely or of using the instrumented data to correct for misalignments or pupil aberrations.

10a. Single Lens Group Optical Systems

As mentioned above, in Application 11 introduced two new inspection instruments for endoscopic metrology. The electronic measurement borescope (EMB) and the electronic measurement endoscope (EME) use one or more tiny video cameras disposed at the distal end of either a rigid or flexible endoscopic probe, respectively. According to the perspective measurement technique, the camera(s) is (are) moved from one position to another inside the instrument in order to acquire the images necessary to make the measurement.

The optical systems of these internal cameras can be usefully considered to consist of a single lens group. The magnification of a single lens group has already been discussed, in conjunction with FIG. 12, in Section 3c. The chief ray magnification of a single lens optical system with an aperture stop on the object side was given in Equation (11), which is repeated here for the convenience of the reader:

$$M_{cr} = \frac{i\left(\frac{P_s}{f} - 1\right) - P_s}{z - P_s} \quad (11)$$

where f is the focal length of the lens, $P_s$ is the distance from (the principal plane of) the lens to the aperture stop, i is the distance from the lens to the image sensing plane, and z is the distance from the lens to the object point.

One can, of course, arrange for the internal camera(s) of the EMB and EME to be telecentric on the image side, that is, $P_s$=f. Then, when the projection distance i is varied by moving the image sensing plane with respect to the fixed lens and stop, the magnification is a relative magnification, and the relative magnification is independent of focal state, as has already been explained.

A fourth embodiment of the current invention is depicted in FIG. 32, in which a lens, represented as a thin lens principal plane 24, with a front focal point 28, is located a distance of one focal length from an aperture stop 50. An image sensing plane 60 is positioned along an optical axis 8 by a moving means 46. A position sensing means 48 is connected between lens 24 and image sensing plane 60 to monitor the focal state of the system.

The optical system of FIG. 32 is telecentric, with a moving image sensing plane, as taught by Watanabe and Nayar. However, here the focal state is instrumented in order to correct for axial and transverse misalignments, and pupil aberrations, according to the teachings of the first and second embodiments. Use of this system eliminates the need for a precision alignment of the camera in order to produce accurate measurements. Due to the small size required of the camera in the EMB and EME, when one carefully considers the effects of misalignments and aberrations, it is often easier to characterize these errors as a function of the measured focal state than it is to build the camera so that these errors are negligible.

In Application 1, (incorporated herein by reference), the EMB and its camera were shown in FIGS. 23–25. Lens principal plane 24 in FIG. 32 of the present application corresponds to the "objective lens", denoted 121 in the reference. Image sensing plane 60 here corresponds to the "solid state imager", denoted 220 in the reference. Aperture stop 50 was not referred to in Application 1, although it exists in any imaging optical system. The teaching of this fourth embodiment puts a constraint on the location of this stop. Moving means 46 and position sensing means 48 are new additions to the structure of the EMB. In this fourth embodiment, the solid state imager (220) is moved with respect to the fixed lens (121) and fixed aperture stop 50 in order to adjust the focus of the camera of the EMB.

Similarly, the EME and its camera was shown in FIGS. 31 and 32 of Application 1. The same lens and solid state imager were used in the EME as in the EMB, and these were not specifically identified in the figures showing the EME. The fourth embodiment of the instant invention can be incorporated into the EME in exactly the same manner as it is into the EMB.

Telecentric, constant relative magnification operation is not the only option for adding a focusing capability to the EMB and EME. For the purposes of remote inspection, in general it cannot be considered feasible to focus the camera by moving the camera as a whole with respect to the object, but that still leaves two other practical alternatives according to FIG. 12. One alternative is to move both the stop and the lens together with respect to the image sensing plane to focus the system. This is the fifth embodiment of the present invention. The second alternative is to move only the lens, where the stop and the image sensing plane remain at fixed relative positions, and this represents a sixth embodiment. Both alternatives require that only one quantity be instrumented in order to determine the magnification.

The fifth embodiment is depicted in FIG. 33. In this Figure, a lens, represented by a thin lens principal plane 24, with a front focal point 28, is located a distance of one focal length from an aperture stop 50. The combination of lens 24 and stop 50 at fixed relative positions, is positioned along an optical axis 8 with respect to an imaging sensing plane 60 by a moving means 46. A position sensing means 48 is connected between lens 24 and image sensing plane 60 to monitor the focal state of the system.

While the optical system of this fifth embodiment is telecentric, this optical system does not provide a constant relative magnification. In fact, this system does not even provide a relative magnification. This is a significant point missed by Watanabe and Nayar in their previously referenced paper.

Assume that the stop and lens are moved together, as a single component, a distance $d_i$ toward the image sensing plane from a nominal position. That is, assume that $z \rightarrow z_0 + d_i$ and $i \rightarrow i_0 - d_i$, while $P_s$ remains unchanged in Equation (11). (See FIG. 12). Then the chief ray magnification becomes:

$$M_{cr} = \frac{(i_0 - d_i)\left(\frac{P_s}{f} - 1\right) - P_s}{z_0 + d_i - P_s} \quad (59)$$

and at Ps=f:

$$M_{cr} = \frac{-f}{z_0 - (f - d_i)} \quad (60)$$

As explained previously, in the discussions at Equations (13) and (29), the chief ray magnification will be a relative magnification if the position of the entrance pupil of the optical system does not shift with the change in focal state. Since the entrance pupil of the fifth embodiment is the aperture stop, this condition is not met. As shown explicitly by Equation (60), the chief ray magnification for this fifth embodiment is not a relative magnification. This means that the change in magnification when the focal state changes depends on the range of the object point.

Watanabe and Nayar state that their imaging model, which is essentially $$M_{cr} = -\frac{f}{(z-f)},$$

is valid when the lens is moved to focus the system as long as the range is much greater than the focal length, f. While it is true that if the object is at a near infinite distance, the focal shift $d_i$ will be small with respect to the infinite focus condition, this has little practical relevance. For any realistic metrology situation, the object will not be at or near infinity, for the simple reason that one cannot make accurate measurements on an object that is far away. As a specific example, consider that a range of object distances from infinity down to some minimum distance, $Z_{min}=\alpha f$, is to be used. It is easily calculated that the focal shift, relative to the infinity focus condition, to focus at $z_{min}$ is $$d_i = \frac{f}{\alpha - 1},$$

Now the chief ray magnification at $z_{min}$ according to Watanabe and Nayar is $$M_{cr} = -\frac{1}{(\alpha - 1)},$$

whereas according to Equation (60) it is $$M_{cr} = -\frac{1}{(\alpha - 1 + 1/(\alpha - 1))},$$

If one wants to make measurements accurate to 1 part in 1000, say, then the ratio magnifications must be unity to within that fraction. This will be the case only if α is at least 32.6. That is, the minimum distance upon which one can focus without taking into account the correct magnification of the system is 32.6 times the focal length of the system. This criterion is not met even by the experimental examples discussed by Watanabe and Nayar, and it is certainly an unrealistic restriction for the endoscopic application, where the object distances of interest are often of the same order as the focal length of the measurement camera.

It is possible to determine the chief ray magnification from Equation (60), provided only that the focal state ($d_i$) be instrumented, and that the optical calibration of the system be such as to determine the quantity f in Equation (60). This is accomplished by performing a series of normal optical calibrations as taught in Application 1, with the focal state varying between the calibrations, and constraining the resulting determination of the calibration parameters to conform to Equation (60). That is, the quantities f and $z_0$ are determined over a set of known $d_i$, as opposed to the normal determination of the single quantity i as expressed by Equation (7).

Note that if the optical system of this fifth embodiment is not telecentric, then by Equation (59) it is necessary to determine four quantities ($i_0$, $z_0$, $P_s$, and f) in this calibration instead of two.

Figure 34:
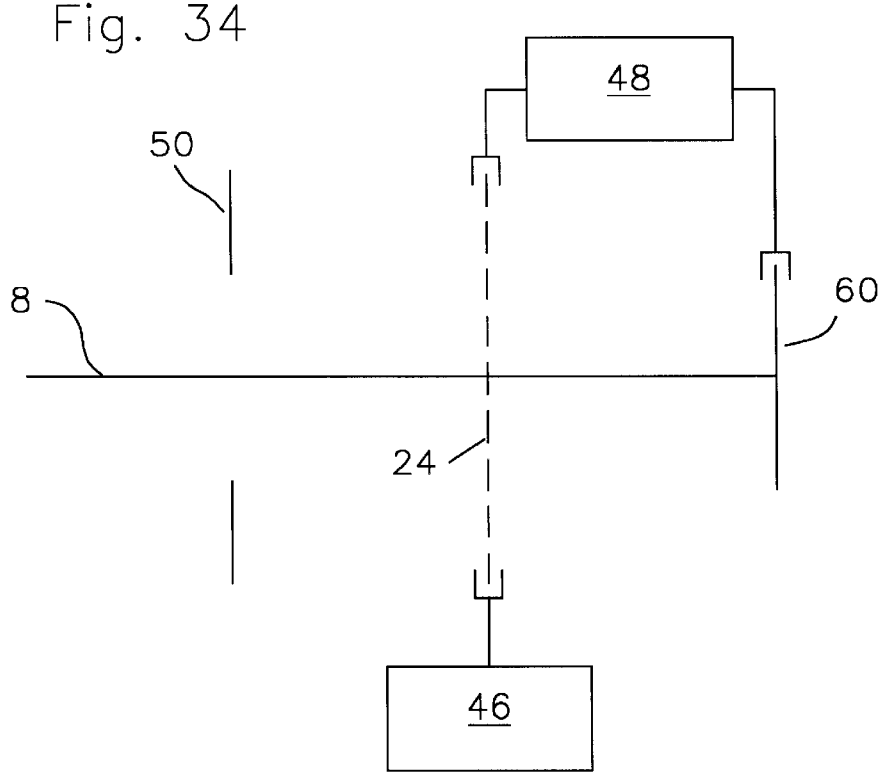
FIG. 34 depicts a sixth embodiment of the invention.

The fifth embodiment can be incorporated into the EMB and EME as discussed above with regards the fourth embodiment. In this fifth embodiment the aperture stop 50 and the "objective lens" (121 in the reference) are moved in unison as a single component with respect to the "solid state imager" (220) when the focus of the camera is adjusted. The sixth embodiment is shown in FIG. 34. Here motion means 46 moves lens 24 along optical axis 8 with respect to a fixed aperture stop 50 and a fixed image sensing plane 60. The position of lens 24 with respect to image sensing plane 60 is monitored by position sensing means 48.

A similar analysis to that used for the fifth embodiment results in:

$$M_{cr} = \frac{-d_i^2 + (i_0 - f)d_i - f^2}{f(z_0 - f)} \tag{61}$$

when the nominal lens position (that is, where $d_i=0$) is chosen so that the system is telecentric there. Equation (61) does represent a relative magnification, so that a relative magnification calibration as I taught above with regard to the second embodiment can be used. This sixth embodiment is an example of a non-telecentric optical system that does exhibit a relative magnification, whereas the fifth embodiment is an example of a telecentric optical system which does not exhibit a relative magnification.

The sixth embodiment can be incorporated into the EMB and EME as discussed above with regards the fourth embodiment. In this sixth embodiment the aperture stop 50 and the "solid state imager" (220 in the reference) are fixed and the "objective lens" (121) is moved to adjust the focus of the camera.

These fourth through sixth embodiments are, of course, applicable to general optical metrology as well as to the EME and EMB.

10b. How to Obtain Constant Relative Magnification with a General Optical System I have demonstrated that, for optical metrology, there is a great advantage to using an optical system which exhibits a constant relative magnification, because one can then adjust the focus of the system as desired without having to deal with changes in magnification. As has just been discussed, use of a telecentric optical system is not sufficient to guarantee that an optical system will exhibit a constant relative magnification, or even a relative magnification.

Figure 35:
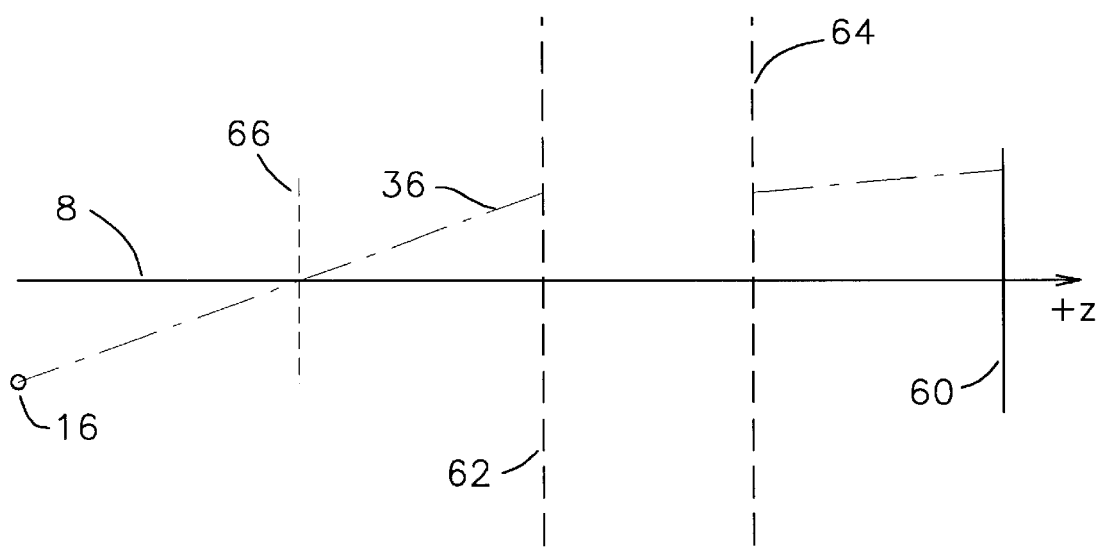
FIG. 35 depicts the path of a chief ray through a general optical system that is modeled as a thick lens.

To determine the requirements on an optical system for obtaining a constant relative magnification, consider FIG. 35. In FIG. 35 is shown a thick lens model of a general optical system. A chief ray 36 from an object point 16 passes through the center of an entrance pupil 66. As explained previously, the entrance pupil is the image of the aperture stop formed by all the imaging elements of the optical system that lie on the object side of the stop. Of course, entrance pupil 66 is the aperture stop of the system when there are no imaging elements between the object and the stop. In FIG. 35, after chief ray 36 passes through entrance pupil 66, it then encounters a first principal plane of the optical system 62. The ray then jumps to a second principal plane of the optical system 64 where it is acted upon by the focal length of the lens, and then propagates to an image viewing plane 60. FIG. 35 shows a z axis coincident with the optical axis, with the positive direction taken to the right. This z coordinate system should be thought of as being attached to the object, while all elements of the optical system are considered as being potentially free to move along it.

The focal length of the optical system is taken to be f. That is, there is a first focal point (not shown) which lies a distance f to the left of first principal plane 62, and there is a second focal point (also not shown) which lies a distance f to the right of second principal plane 64.

It is very important to keep in mind that the relative physical locations of the entrance pupil and the principal planes need not be as shown in FIG. 35. One traces a ray through the system by encountering these planes in the order depicted in the Figure, but the physical order along the optical axis may be different, just as the physical ordering of the focal points with respect to the principal planes is reversed if the sign of f is reversed. For instance, the second principal plane may lie to the left of the first principal plane, and/or one or both of these planes could lie to the left of the object point. Therefore, the physical location of each element of the thick lens model of the system is specified by a symbol: $Z_0$, $z_{Entp}$, $z_{pp1}$, $z_{pp2}$, and $z_{ivp}$ represent the z axis locations of the object point, the entrance pupil, the first and second principal planes, and the image viewing plane, respectively.

Note that only the object and the image viewing plane correspond to physical elements of the system. The entrance pupil and the principal planes are mathematical constructs that allow one to predict how the system will perform. Note also that the object could lie to the right of the optical system; that is, the object could be virtual. Likewise, the image could lie to the left of the optical system, and could therefore be virtual. Finally, note that in many cases a real optical system forms its best image on a non-planar surface; the term "image viewing plane" is meant here to include such cases.

When one traces the chief ray through the thick lens model of the system in the specified order, one finds that the chief magnification is:

$$M_{cr} = \frac{-1}{z_{Entp} - z_0}\left[z_{pp1} - z_{Entp} + \left(1 - \left(\frac{z_{pp1} - z_{Entp}}{f}\right)\right)(z_{ivp} - z_{pp2})\right] \quad (62)$$

As physical elements of the optical system are shifted in order to change the focal state, any of the z axis positions associated with the model of the optical system, as well as its focal length, may change.

As has previously been explained with reference to Equation (1), the system will exhibit a relative magnification when the object range portion of the magnification is independent of focal state. Clearly, Equation (62) shows that the chief ray magnification will be a relative magnification if and only if the location of the entrance pupil remains fixed with respect to the object. This is the same criterion that I have already stated in the discussion at Equation (29).

For an optical system to be telecentric on the image side, by definition $Z_{pp1} - Z_{Entp} = f$. In other words, the exit pupil of the system will remain at infinity if the distance between the entrance pupil and the first principal plane remains equal to the focal length as any or all of these quantities change. Substituting this condition into Equation (62) gives:

$$M_{cr} = \frac{-f}{z_{Entp} - z_0} \quad (63)$$

where the sign is reversed compared to Equation (12) because the positive z direction was reversed in FIG. 35 compared to FIG. 11. According to Equation (63), an optical system that is telecentric on the image side will exhibit a constant relative magnification as the focal state is changed if and only if two conditions hold: (1) the entrance pupil remains at a fixed position with respect to the object, and (2) the focal length remains constant.

A general optical system will exhibit a constant relative magnification if the numerator of Equation (62) remains constant, while $Z_{Entp} - z_0$ also remains constant. Without loss of generality, one can set the position of the entrance pupil to be zero when it is constant, so that the additional criterion for an optical system to exhibit a constant relative ad magnification can be written as:

$$z_{pp1} + \left(1 - \left(\frac{z_{pp1}}{f}\right)\right)(z_{ivp} - z_{pp2}) = K_{crm} \quad (64)$$

where $K_{crm}$ is a constant. That is, the value of expression (64) does not vary as the focal state of the system is changed.

To further explain the use of Equation (64), consider the optical system shown in FIG. 36. FIG. 36 depicts a two lens group optical system being used to form an image of an object point where the object is at a finite distance. The upper portion of the Figure shows the overall layout of the system from the object to the image, while the lower portion shows details of the optical system and the image. The two lens groups are depicted as simple lens elements and are denoted as L1 and L2. The optical effects of L1 and L2 are represented by thin lens principal planes drawn at the center of each; this could be easily generalized to make them thick lens elements.

The first lens group L1 has been chosen to have a negative focal length, but this is not required. Such a two lens system can be arranged to form a real image of a real object as shown when either one (or both) of the two lenses has a positive focal length.

The lower portion of FIG. 36 shows that the aperture stop of the system has been placed at L1. The rays from the nearby object point come to a focus on the plane denoted "IVP for nearby object", where IVP stands for image viewing plane. When this system is conventionally focused by moving the image viewing plane, for instance to the plane denoted "IVP for object at infinity", one can readily see that the height of the image blur spot changes as was previously explained in Section 1 in conjunction with FIG. 4. This is the problem that the constant relative magnification condition has been developed to solve.

Figure 37:
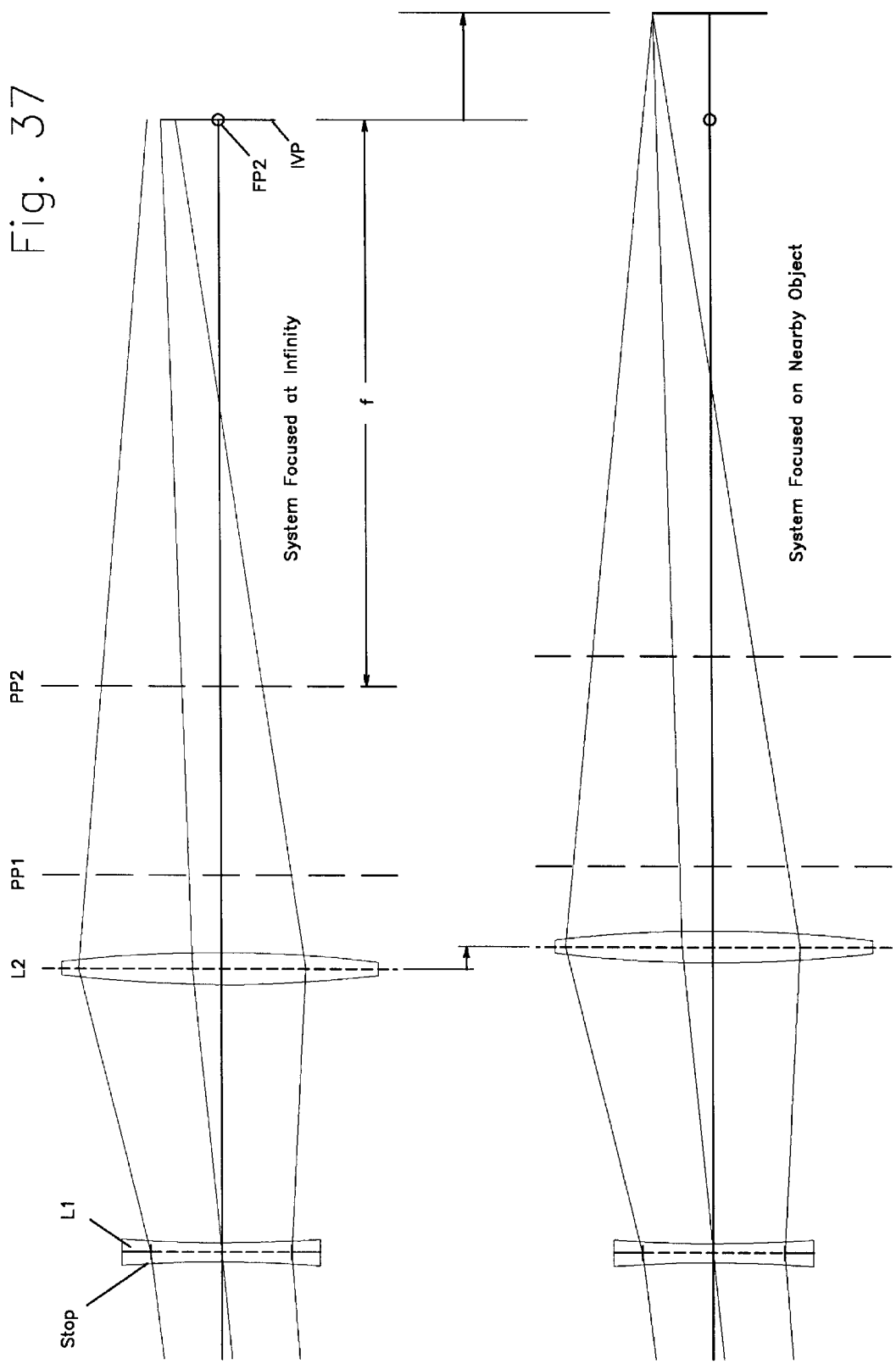
FIG. 37 shows a first example of achieving constant relative magnification with the two lens group system of FIG. 36.

In FIG. 37 is shown a first modification of the system in which the image height of the object point remains the same, no matter what focal state is chosen for the system. In the upper portion of FIG. 37 the lower portion of FIG. 36 has been redrawn and the principal planes of the thick lens model of the optical system as a whole, PP1 and PP2, have been added. By definition, the second focal point of the system, FP2, is located a distance f from second principal plane PP2, where f is the focal length of the system. Since the system is focused at infinity, the image viewing plane, IVP, is located at the same axial position as FP2. The ray bundle from the nearby object point forms a blur spot on the image viewing plane, and the chief ray strikes the image viewing plane at a particular height corresponding to the height and distance of the object point.

For example, the following numerical parameters can be used. Let the focal length of L1 be −4, the focal length of L2 be +3, and the distance between L1 and L2 be 2. By tracing a single ray, the focal length of the system, f, can easily be calculated to be 4, and the image of an infinitely distant object is found to be located at a distance of 6 units behind L2. If we take the origin of the z axis to be at L1, then L2 is at z=+2, PP2 is at z=+4, and IVP is at z=+8. Tracing a ray in the other direction through the system, we find that PP1 is at z=+2.6667. The rays in FIG. 37 are drawn for an object point at z=−20, with a height of −2. The chief ray strikes the image viewing plane at a height of +0.4.

The lower portion of FIG. 37 shows the adjustment of the system to focus on the object plane, where the adjustment is made according to the condition specified by Equation (64). Since the stop of the system is located at L1, and since L1 does not move, the entrance pupil of the system is fixed with respect to the object, which is the condition for the system to exhibit a relative magnification. The focus adjustment is made by moving both L2 and IVP along the optical axis. The distances that each of these elements are moved between focus at infinity and focus on the nearby object are indicated by the small horizontal arrows near the center of the Figure. When L2 is moved with respect to L1, the focal length of the system changes, as do the locations of the principal planes PP1 and PP2. If one, for example, takes the infinity focus condition of the upper portion of FIG. 37 as the reference condition, one can calculate the constant $K_{crm}$ in Equation (64), and then change the locations of L2 and IVP cooperatively in order to maintain that value as the system is refocused to closer distances.

The condition specified by Equation (64) sets a relationship between z axis position of L2 and the z axis position of IVP. Since there is also a relationship between the z axis position of IVP and the object plane which is in focus, one can solve these two relationships simultaneously for the positions of L2 and IVP as a function of the in focus object plane.

In the numerical example, $K_{crm}=4$ at the infinity focus condition. Solving the resulting equations for the positions of L2 and IVP gives:

$$Z_{L2} = \frac{2(Z_0 - 6)}{Z_0 - 4} \tag{65}$$

$$Z_{ivp} = \frac{8(Z_0^2 - 6Z_0 + 6)}{Z_0(Z_0 - 4)}$$

where $Z_0$ is the z axis position of the object.

As depicted in the lower portion of FIG. 37, for the object point at z=−20, L2 is at z=+2.1667, thus f=3.7895, PP1 is at z=+2.7368 and PP2 is at z=+4.2193. IVP is at z=+8.7667, and the image of the object point is in focus there at an image height of 0.4. As it so happens, the position of FP2 has hardly changed during the change of focus, but this is not a requirement for the constant relative magnification condition.

Figure 38:
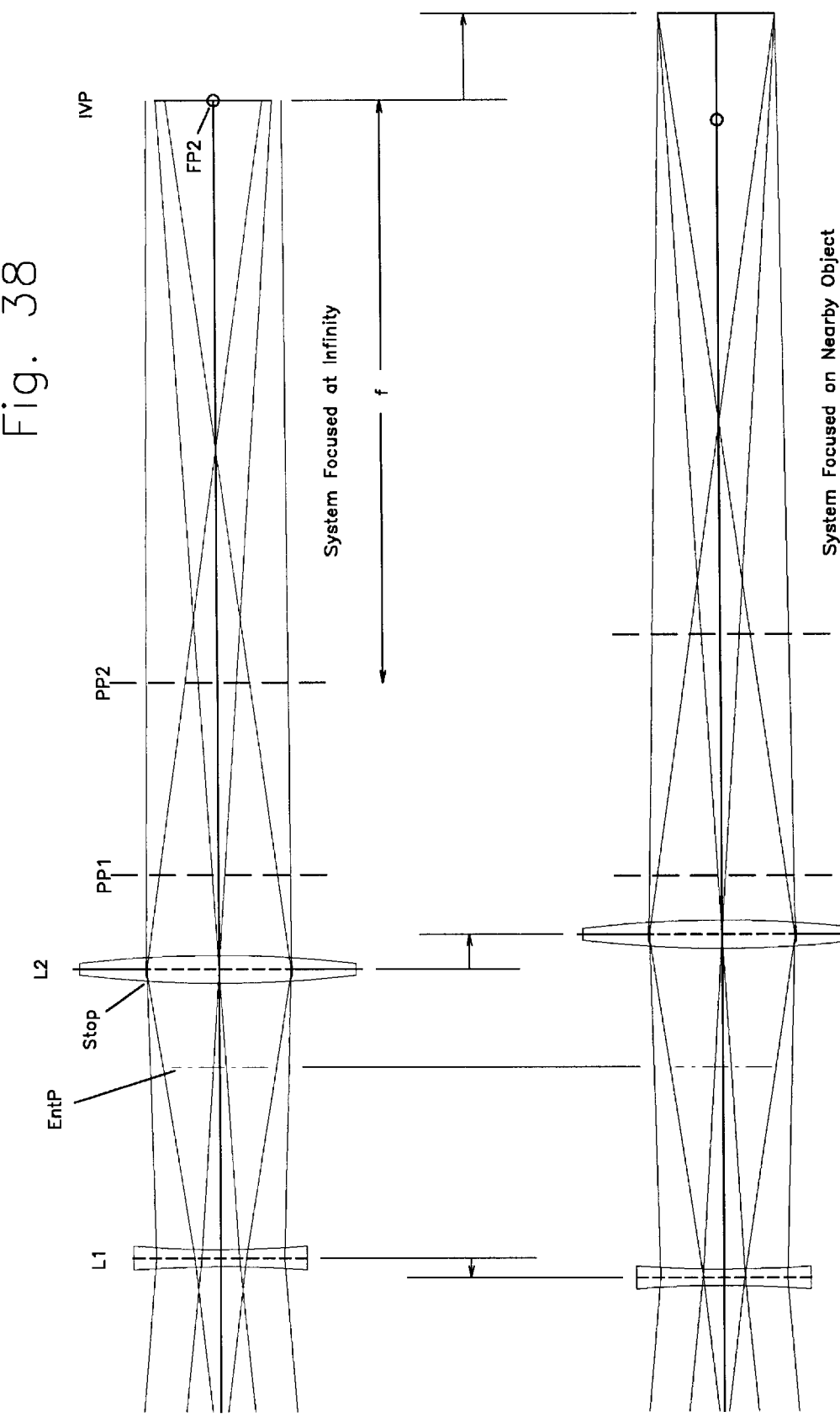
FIG. 38 shows a second example of achieving constant relative magnification with the system of FIG. 36.

In FIG. 38 is shown a second modification of the system of FIG. 36 which provides a constant relative magnification. In this example the aperture stop of the system is not the entrance pupil of the system, and the aperture stop moves, so that the condition for there to be a relative magnification means that provision has to be made for keeping the entrance pupil fixed with respect to the object.

As shown in FIG. 38, the stop is now attached to L2 instead of L1. In the upper portion of FIG. 38 the system is focused at infinity, and the layout of L1, L2 and IVP is exactly the same as in the upper portion of FIG. 37. Thus the positions of the system principal planes relative to the physical elements are also unchanged. However, since we must keep the entrance pupil fixed with respect to the object, for convenience we take the position of the entrance pupil to be at z=0. The layout for the infinity focus condition is then: L1 is at z=1.3333, L2 is at z=+0.6667, PP1 is at z=+1.3333, PP2 is at z=+2.6667, and IVP is at z=+6.6667. $K_{crm}$ is still equal to 4.

Because the stop is now at L2, if either L1 or L2 are moved, the position of the entrance pupil will move unless both lenses are moved cooperatively to maintain the position of the entrance pupil fixed at z=0. This additional condition can be cast into the form of a third equation to be satisfied as the focus of the system is adjusted. There are now also three quantities to be determined; these are the positions of L1, L2, and IVP as a function of the in-focus object distance.

This solution is depicted for an object at z=−20 in the lower portion of FIG. 38. Here, L1 has moved toward the object, while L2 and IVP have moved away from the object. The layout for this condition is: L1 is at z=−1.4907, L2 is at z=+0.8856, thus PP1 is at z=+1.3246, and PP2 is at z=+2.9971, and the focal length is f=3.5541. The image viewing plane is at z=+7.2620. $K_{crm}$ is unchanged, and so is the height of the chief ray on the image viewing plane.

I have discussed two simple examples of the use of Equation (64) and the condition for relative magnification in arranging an optical system to produce a constant relative magnification. Clearly, any more complicated optical system could also be so arranged; in particular, the stop in the above examples could be placed anywhere in the system and it could be either moved or held fixed with respect to the object.

In general, to adjust the focal state of an optical system, one must adjust the axial position of at least one optical element or of the image viewing plane. Potentially, one could adjust the positions of every separate optical element, as well as the stop and the image viewing plane in order to adjust the focal state. One goal when designing an optical system using Equation (64) is to minimize the number of separate adjustments that have to be made; that is, one wants to minimize the number of components which move on separate paths to adjust the focal state. The examples given above are poor in this regard. Ideally, one would want to adjust the focal state by moving only a single component (which may be made up of several elements which move in unison) while maintaining constant relative magnification.

It is possible to find non-telecentric arrangements of a single lens (plus stop) optical system which exhibit constant relative magnification. One of the implications of this is that it is not necessary for the focal length of a non-telecentric system to vary during a focusing operation in order for the system to exhibit a constant relative magnification. It turns out that single lens non-telecentric arrangements are feasible only over a finite range of object distances; that is, if the focus range is to include infinity, the only arrangement that will exhibit constant relative magnification is the telecentric arrangement.

It should also be mentioned that one can use focusing mirrors as well as lenses to implement focusing optical systems that exhibit constant relative magnification, and such use is intended to be included in the scope of the present invention.

Using the new understanding taught here and the conditions specified above, one can gain the advantages of imaging at constant relative magnification without requiring that the aperture stop of an optical system be placed at a focal plane of the system, that is, the system need not be telecentric. One can use this freedom to select the aperture stop position to best suit some other purpose, such as aberration correction, while still maintaining the advantages of constant relative magnification. The advantages of constant relative magnification in metrological applications have been discussed above, and the advantages in movie or TV photography are those that were sought by Quinn in U.S. Pat. No. 4,083,057 (1978), although Quinn did not realize that it is the concept of constant relative magnification that is the key to achieving these advantages.

10c. Description of a Seventh Embodiment

Figure 39:
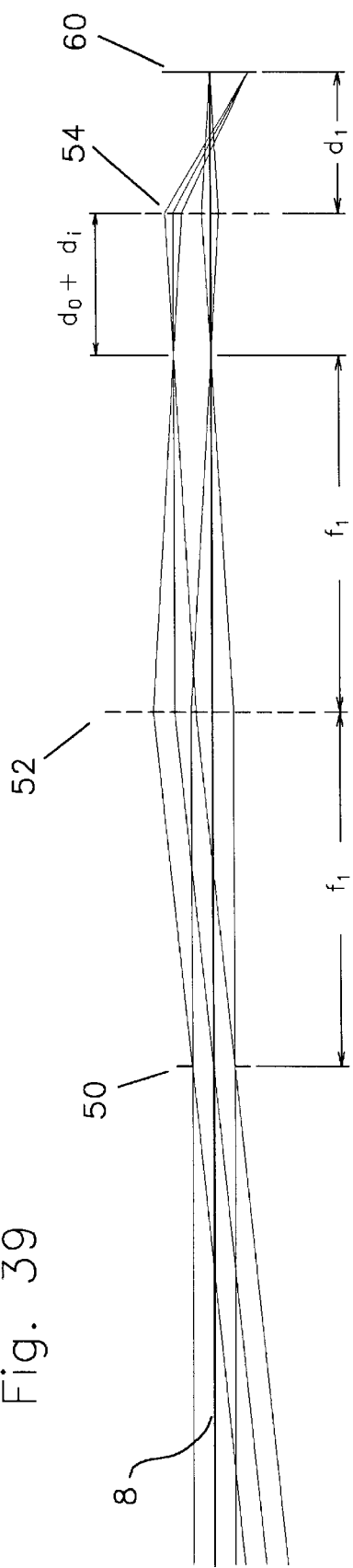
FIG. 39 shows the thin lens layout of a non-telecentric two lens group optical system that exhibits constant relative magnification.
Figure 40:
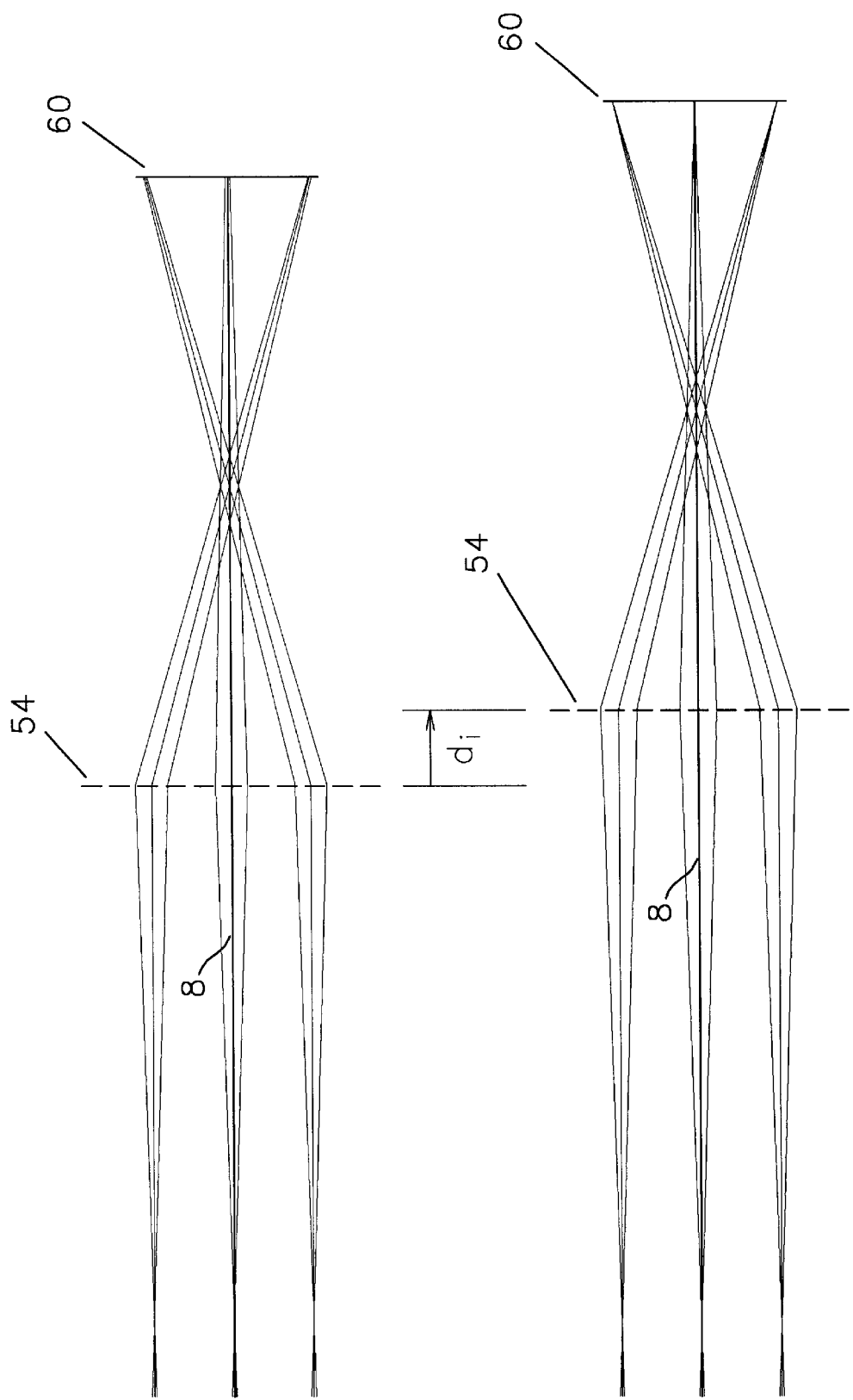
FIG. 40 depicts the performance of the system of FIG. 39 in detail.

The thin lens layout of the optical system of a focusing camera for optical metrology, representing the seventh embodiment of the present invention, is shown in FIG. 39 and a detailed view of its performance is shown in FIG. 40.

In FIG. 39 an aperture stop 50 is located at the front focal plane of a first lens group 52, represented in the Figure by its thin lens principal plane. The focal length of first lens group 52 is denoted $f_1$. A second lens group 54 is located a distance of $f_1+d_0+d_i$ from the first lens group along an optical axis 8. The image of an object is formed on a image sensing plane 60 located at a distance $d_i$ from the second lens group. Image sensing plane 60 is the location of the image sensor, whether this be a solid state sensor, photographic film, a photocathode of a vidicon tube, or any other suitable image sensing surface.

The focal state of the system of FIG. 39 is varied by moving second lens group 54 in unison with image sensor 60, along optical axis 8. The system is defined as being focused at infinity when $d_i=0$. The ray bundles depicted in FIG. 39 are those from an object at infinity when the system is focused at infinity.

Given the layout parameter, distance $d_1$, the infinity focus of the system occurs when second lens group 54 is at the position:

$$d_0 = \frac{d_1 f_2}{d_1 - f_2} \tag{66}$$

where $f_2$ is the focal length of the second lens group. For the depiction of FIG. 39, a layout distance of $d_1=2f_2$ was chosen.

The in-focus object distance corresponding to the focal state parameter $d_i$ is:

$$z_0 = \frac{f_1(f_1 + d_i)}{d_i} \tag{67}$$

where the object distance is measured from the principal plane of the first lens group. One uses this relationship to determine how much range of motion it is necessary to provide in the moving assembly, according to the minimum focusing distance desired.

In FIG. 40 an enlarged view of the rear portion of the system of FIG. 39 is shown, for two different focal states with a fixed object, where the object is not at infinity. In the upper half of FIG. 40, the ray bundles are shown for the case where the system is focused at infinity, that is where $d_i=0$. Since the object is not at infinity, the ray bundles do not come to a focus at sensing plane 60. In the lower portion of FIG. 40, the system has been refocused on the object by moving both second lens 54 and sensing plane 60 together a distance $d_i$ along axis 8. Note that the heights of the chief rays at the image sensing plane is the same in either condition.

Like some previously discussed examples of general optical systems with constant relative magnification, the focal length of this seventh embodiment is not constant; it depends on the focal state. However, rather than requiring that two quantities be instrumented in order to determine the magnification as do all prior art variable focal length systems, this new system does not require that any quantities be instrumented in order to determine the magnification. The chief ray magnification for this system is:

$$M_{cr} = \frac{f_1(d_1 - f_2)}{f_2(z - f_1)} \tag{68}$$

where z is the distance from the object to the principal plane of first lens group 52. Not only does this system exhibit a relative magnification, but $M_{cr}$ is independent of focal state parameter $d_i$, thus the system exhibits a constant relative magnification. This seventh embodiment is a non-telecentric system that exhibits a constant relative magnification, and it has only a single moving component.

Since both second lens group 54 and sensing plane 60 must be moved together in unison in order to focus this embodiment, systems built around a focal plane array sensor, as suggested by the first embodiment, will be preferred to those using an existing video camera back.

Because this system forms a real image of the object, it is applicable to an imaging camera, but not to an instrument meant for visual use. For instance, a video borescope could be built using this optical system, eliminating the need to use one of the systems of the first three embodiments, which are intended primarily for use with existing visual borescopes.

It is often the case that the combination of the objective and the relay system in an endoscope is designed to be telecentric on the image side; thus the conditions necessary to implement this seventh embodiment with an existing endoscope are often met in practice. In this case, the eyepiece of the endoscope need only be replaced with the combination of second lens group 54 and sensing plane 60 to form a focusing imaging camera that exhibits a constant relative magnification.

If the seventh embodiment is implemented with relatively thin lens groups, then the first lens group must have a positive focal length. The second lens group can have a negative focal length. The only general requirements are that the system form a real image of the object, and that layout parameter $d_1$ be positive and large enough so that image sensing plane 60 can physically be placed at the image. Clearly, from Equation (66), $d_i$ cannot be chosen equal to the focal length of the second lens group.

Unlike what is commonly believed, it is possible for a thick negative focal length lens to produce a real image of a distant object. (What is required for this condition is that the second focal point of the lens lie in front of the second principal plane.) This is sometimes encountered in borescope relay systems. The borescope optical system model of FIG. 26 is an example. In such a case, the system of this seventh embodiment can be implemented with the first lens group having a negative focal length. In this case, the combination of entrance pupil EntP and thin lens L1 in FIG. 26 corresponds to the combination of aperture stop 50 and first lens group 52 in FIG. 39.

If stop 50 is not located at the front focal plane of first lens group 52, that is, if the combination of the borescope objective and relay system is not telecentric on the image side, then $M_{cr}$ will not be independent of $d_i$, but it will still be a relative magnification. In this case, the focal state can be instrumented, and the magnification determined, by monitoring the single parameter $d_i$, in the manner that I have already taught in conjunction with the second embodiment, as was shown in FIGS. 23 and 25. Such instrumentation can also be used to correct for the effects of misalignments and/or pupil aberrations, as was previously discussed.

The optical system of this seventh embodiment could also be used behind a standard borescope, with the exit pupil of the borescope being located at the plane of aperture stop 50 in FIG. 39, in a manner similar to the first three embodiments.

10d. Description of an Eighth Embodiment

Figure 41:
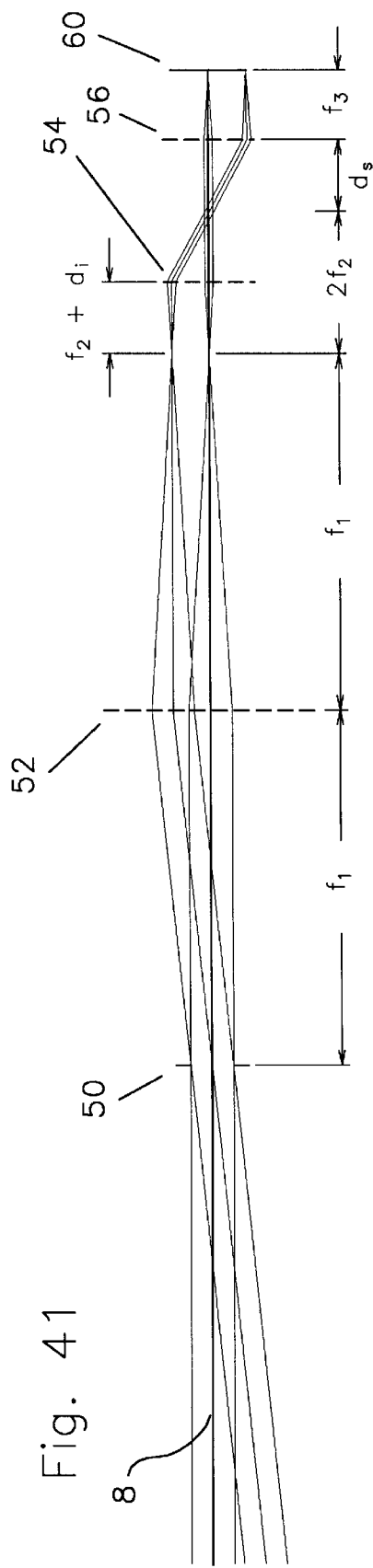
FIG. 41 shows the thin lens layout of a non-telecentric three lens group optical system that exhibits constant relative magnification.
Figure 42:
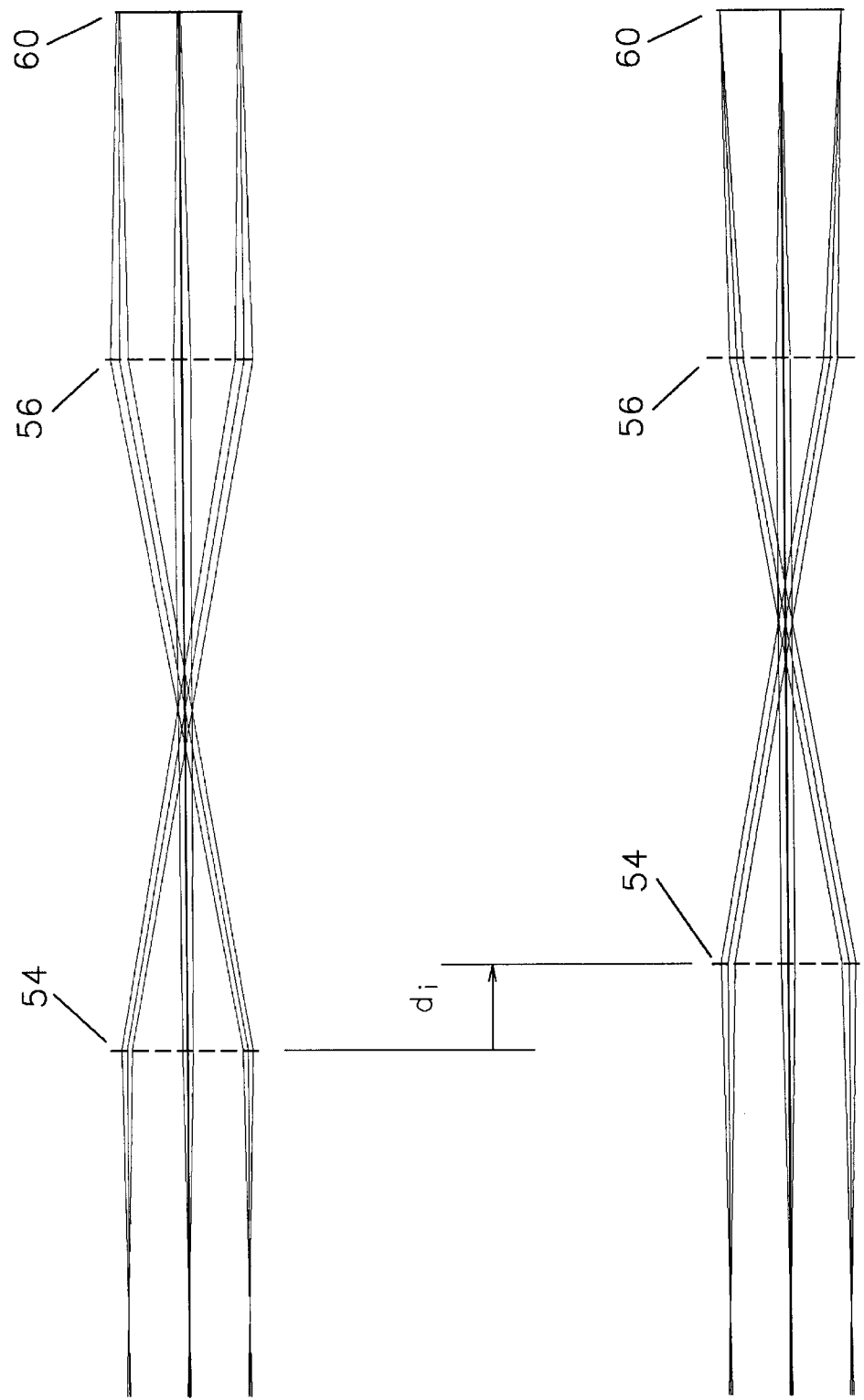
FIG. 42 depicts the performance of the system of FIG. 41 in detail.

The thin lens layout of a three lens group optical system that provides a constant relative magnification and that is also nearly telecentric, is shown in FIG. 41. This constitutes the eighth embodiment of the present invention. A detailed view of its operation is depicted in FIG. 42. In FIG. 41 an aperture stop 50 is located in the front focal plane of a first lens group 52 that has a focal length $f_1$. A second lens group 54, of focal length $f_2$, is located at a distance of $f_1+f_2+d_i$ from first lens group 52 along an optical axis 8. A third lens group 56, of focal length $f_3$, is located at a distance of $f_1+2f_2+d_s$ from first lens group 52. An image sensing plane 60 is located at a distance $f_3$ from third lens group 56. As before, all lens groups are represented in FIG. 41 by their thin lens principal planes. The system has been drawn with the system layout parameter, $d_s$, set equal to $f_3$.

When $d_i=0$, the first and second lens groups form an afocal system, thus, an object at infinity is in focus on image sensing plane 60. To focus the system on closer objects, second lens group 54 is moved further away from first lens group 52.

In FIG. 42 an enlarged view of the rear portion of the system is shown. In the upper portion of FIG. 42, an object at some finite distance is being imaged with the system focused at infinity, that is with $d_i=0$. In the lower portion of FIG. 42, the system has been refocused on the close object by moving second lens group 54 a distance $d_i$ to the right. The heights of the chief rays at the image sensing plane are the same for both conditions.

The chief ray magnification of this embodiment is:

$$M_{cr} = \frac{f_1 f_3}{f_2(z-f_1)} \quad (69)$$

which is independent of the focal state parameter, $d_i$. The requirements for achieving this condition are that the combination of aperture stop 50 and first lens group 52 be telecentric on the image side, and that image sensing plane 60 lie at a distance of $f_3$ from third lens group 56. The positions of second lens group 54 and of the combination of third lens group 56 and sensing plane 60 are not critical. However, when the system is laid out as suggested, the relationship between in-focus object distance and focal state parameter is the same as for the seventh embodiment, given by Equation (67).

Like the seventh embodiment, the focal length of this eighth embodiment varies with focal state. Unlike the seventh embodiment, this system maintains a near—telecentric condition during change of focal state, when laid out as suggested. This system is therefore suitable for image sensing systems that require this condition, such as dot sequential color video. This system would also be very good for a measurement endoscope, as it allows access to an exit pupil between second lens group 54 and third lens group 56 for visual use. It has the advantage of the second embodiment as compared to the first, in that only a lens group must be moved to adjust the focal state. Since the relative magnification is constant, there is no instrumentation of focal state required (provided that alignment is adequately correct and that aberrations are adequately small). Thus, this is the preferred embodiment if a special measurement borescope is to be built, and it is important to form the image in a near telecentric condition.

Also like the seventh embodiment, this system can be easily implemented with a standard endoscope, if the combination of the objective and relay system in the endoscope is telecentric on the image side. In this case, one simply needs to add the combination of third lens group 56 and image sensing plane 60 to the proximal end of the endoscope, if the endoscope also includes an internal focus adjustment that moves the eyepiece of the scope along the optical axis. In this case the eyepiece acts as second lens group 54. If the scope has no internal focus adjustment, or if the adjustment is not implemented by moving the eyepiece back and forth, then one must replace the eyepiece with a lens group which is adapted to move in that manner. For high precision applications this latter arrangement is preferred, since the focusing motion of a standard endoscope is not likely to be constrained to an accurate straight line path.

If stop 50 is not located at the front focal plane of first lens group 52, or if focal plane 60 is not located at $f_3$ from third lens group 56, then $M_{cr}$ will not be independent of $d_i$, but it will be a relative magnification. In this case, the focal state can be instrumented, and the magnification determined, by monitoring the single parameter $d_i$, in the manner that I have already taught, and which was shown in FIGS. 23 and 25.

Of course, this eighth embodiment could also be used behind a regular borescope, as an alternative to the third embodiment, unless precise telecentricity needs to be maintained.

In practical terms, $f_3$ will most likely be positive, in order to produce a real image which lies to the right of third lens group 56. Negative focal length lenses can be used for either first lens group 52 or second lens group 54, as discussed above. Third lens group 56 must be located further from first lens group 52 than is second lens group 54, thus, the quantity $d_s+f_2-d_i$ must be greater than zero under all conditions; this is particularly of concern if $f_2$ is negative.

CONCLUSION

Accordingly, the reader will see that the improved system of this invention solves the problem of routine optical calibrations that are required to maintain measurement accuracy with conventional three-dimensional optical metrology systems and with perspective measurement systems when such systems are refocused. Unlike the prior art, I have taught the complete and correct set of requirements which an optical system must meet to provide this capability. In this regard, I have introduced the concepts of relative magnification and constant relative magnification, and have shown how to use these concepts to simplify the design of optical metrology systems. Unlike most of the prior art, I have shown how to provide the needed capability using only a single moving component in the optical system.

The system of my invention also provides the capability to transfer a focusing measurement camera accessory from one borescope to another, while also maintaining measurement accuracy without requiring recalibration.

I have disclosed three focusing measurement camera accessories that are meant to be used with a standard endoscope. Additionally, I have disclosed three focusing optical systems that can be used in either an electronic measurement borescope or an electronic measurement endoscope, as well as in cameras for general optical metrology. One of these systems is telecentric, another exhibits a relative magnification, and the third does not exhibit a relative magnification. I have shown that with appropriate instrumentation of a single moving component and a complete calibration, the change in magnification with focal state can be taken into account even for the case where the optical system does not exhibit a relative magnification.

I have disclosed the specific requirements for an optical system to exhibit a constant relative magnification. Using these requirements it is possible to design any number of new non-telecentric systems with constant relative magnification, thus the position of the aperture stop in an optical system is now an additional free design parameter when constant relative magnification is required.

I have also disclosed two specific non-telecentric optical systems that do exhibit constant relative magnification, and are therefore particularly useful for optical metrology where the focal state of the system must be changed.

I have taught methods of aligning focusing metrology cameras to the precision required for a given level of accuracy in the perspective dimensional measurement. I have taught how to determine the change in relative magnification with focal state, and how to take that relative magnification into account in perspective dimensional measurements. I have also taught how to optimize the layout of optical systems that do not exhibit a constant relative magnification so that an inexpensive focus position transducer can be used for high accuracy metrology. In addition, I have taught which particular optical aberrations must be corrected in order to improve the accuracy of measurements made with focusing metrological cameras.

Although the invention has been described with reference to particular embodiments, it will be understood by those skilled in the art that the invention is capable of a variety of alternative embodiments within the spirit and scope of the appended claims.

For instance, nothing restricts the use of my focusing measurement accessories to the endoscope application. These accessories can also be used with telescopes or microscopes. Of course, any of the focusing accessory optical systems that I disclose could also be integrated into a single combination endoscope—camera unit.

The principle of using telecentric optics or near-telecentric optics with an instrumented focal state to correct for transverse misalignments, lack of telecentricity, or pupil aberrations can be used with any camera for doing any sort of optical metrology. Such cameras can now be designed incorporating the principles I have taught.

Of course, nothing restricts the use of my optical systems or methods to the use of video image sensors.

The preferred embodiments show a translation stage being used to control the motion of the moving component that changes the focal state of the measurement optical system. As was discussed in Application 1, other means of motion control are known and can be used, just as long as the accuracy requirements for the motion are met. The preferred embodiments show the moving component being moved with a cam. One could also move the moving component with an electric motor, an air cylinder, or any other known motion actuator.

The second and third embodiments are described in relation to an accessory that adapts an existing video camera back to a borescope. One can, of course, use the same optical systems with an internal fixed image sensor, rather than with a separate video camera back.

One can combine features of the various embodiments. For instance, one can apply the focus position transducer of the second embodiment to measure the position of the moving image sensor in the first embodiment, and one can then use the methods of calibration taught for the second embodiment to correct for transverse misalignments, lack of telecentricity, and/or pupil aberrations in the first embodiment.

One could also add external instrumentation to the internal focus of an existing borescope. That is, one could, for instance, attach a rotary potentiometer by means of a belt drive to a borescope's internal focus ring 130 (shown in FIG. 7). When combined with a video camera, this construction would serve for perspective dimensional measurements just as long as the borescope's internal optical system provided a relative magnification, or more generally, a repeatable focus motion that was calibratable. Of course, since the internal focus motion was not designed with metrology in mind, it is unlikely that the measurement precision achievable by such a construction would be very good.

I claim:

1. A non-telecentric optical system comprising at least one optical element, an aperture stop, and an image viewing plane, said optical system having an optical axis, a focal length, a focal state, an entrance pupil, a first principal plane, and a second principal plane, wherein each of said at least one optical element, said aperture stop, and said image viewing plane has a position along said optical axis, and wherein each of said entrance pupil, said first principal plane, and said second principal plane also has a position along said optical axis, wherein said focal length and said positions of said entrance pupil, said first principal plane, said second principal plane are determined by said positions of said at least one optical element and said aperture stop, wherein adjustments are provided for changing said focal state, said adjustments controlling the positions of said at least one optical element, said aperture stop, and said image viewing plane, wherein said adjustments are adapted to fulfill the following conditions:

(a) the position of said entrance pupil is constrained to a substantially fixed position along said optical axis; and (b) said focal length and said positions of said first and second principal planes and said image viewing plane are constrained to substantially satisfy the equation:

$$z_{pp1} + \left(1 - \left(\frac{z_{pp1}}{f}\right)\right)(z_{ivp} - z_{pp2}) = K_{crm}$$

where f represents said focal length, $z_{pp1}$ represents the position of said first principal plane, $z_{pp2}$ represents the position of said second principal plane, and $z_{ivp}$ represents the position of said image viewing plane, where $K_{crm}$ represents a constant value that does not vary as the focal state of the system is changed, and where the zero reference for position is at said entrance pupil.

2. The optical system of claim 1 wherein said adjustments comprise a single adjustment, said single adjustment controlling the positions of at least one of said at least one optical element and said image viewing plane.

3. The optical system of claim 2 further comprising means for measuring a position datum of said single adjustment, thereby allowing correction for a deviation of said optical axis as said focal state is changed.

4. The optical system of claim 2 for forming an image of an object, comprising in order from the object to the image, an optical sub-system having a telecentricity on the image side, a lens group, and an image sensor, wherein said lens group is spaced at a fixed distance in front of said image sensor, and wherein said positions of said lens group and said sensor are together controlled with said single adjustment.

5. The optical system of claim 4 incorporated into an endoscope.

6. The optical system of claim 2 for forming an image of an object, comprising in order from the object to the image, an optical sub-system including a first lens group, a second lens group, a third lens group having a focal length, and an image sensor, wherein said optical sub-system is adapted to form a first image of said object that is telecentric on the image side, and wherein said second lens group is controlled with said single adjustment, said second lens group forming a second image of the object, and wherein said third lens group is spaced a fixed distance along said optical axis from said optical sub-system, said third lens group forming a third image of the object, and wherein said image sensor is spaced substantially one focal length of said third lens group from said third lens group.

7. The optical system of claim 6 incorporated into an endoscope.

8. The optical system of claim 4 wherein said optical sub-system comprises an aperture stop and a lens group having a front focal plane and wherein said aperture stop is disposed at the front focal plane of said lens group having a front focal plane.

9. The optical system of claim 4 wherein said optical sub-system comprises the objective lens and image relay system portions of an endoscope.

10. The optical system of claim 6 wherein said optical sub-system further comprises an aperture stop, wherein said first lens group has a front focal plane and wherein said aperture stop is disposed at the front focal plane of said first lens group.

11. The optical system of claim 6 wherein said optical sub-system comprises the objective lens and image relay system portions of an endoscope and wherein said second lens group comprises the eyepiece of the endoscope.

* * * * *

UNITED STATES PATENT AND TRADEMARK OFFICE
CERTIFICATE OF CORRECTION

PATENT NO. : 6,476,979 B1
DATED : November 5, 2002
INVENTOR(S) : David F. Schaack It is certified that error appears in the above-identified patent and that said Letters Patent is hereby corrected as shown below:

Title page,
Item [75], Inventor, replace "Menanl" with -- Menaul --.

Item [56], References Cited, U.S. PATENT DOCUMENTS, replace "4,318,515" with -- 4,318,585 -- and replace "4,803,057" with -- 4,083,057 --.

Column 27,
Line 66, replace "$[\vec{x_2}]$" with --$[\vec{x_2}\ \vec{y_2}]$--.

Column 28,
Equation (15), there are two separate equations. Separate the equations before "$m_y$".
Line 20, replace the superscript "31 1" with -- −1 --.
Equation (17), replace the subscript "$z$" with -- $x$ --.

Column 40,
Equation (27), the line indicating division has been incorrectly drawn. The equation should read:
$$M_{cr} = -M_B \frac{d_l^2 - d_l(d_0 + d_c + f_3) + d_0(d_c + f_3) + f_3^2}{f_3(z - z_{EntP})}$$

Column 45,
Equation (37), place arrows over the quantities "rho$_{im}$, rho$_D$, and rho'" (3 places).
Equation (37), replace the subscript "$z$" with -- $x$ --.
Line 63, replace "$Y'_{im}$" with --$y'_{im}$--.

Column 46,
Equation (38), place arrows over the quantities "$a_v$ and rho$_{im}$".
Equations (39), the names of some of the variables have been split onto separate lines, and subscripts have become factors. The equations should read:

$$f_{Dx}(\vec{\mathbf{rho}'_k}) = x_0 + (a_1 + a_2|\vec{\mathbf{rho}'_k}|^2 + a_3|\vec{\mathbf{rho}'_k}|^4)x'_{imk} + a_4(|\vec{\mathbf{rho}'_k}|^2 + 2x'^2_{imk}) + 2a_5 x'_{imk}y'_{imk}$$
$$f_{Dy}(\vec{\mathbf{rho}'_k}) = y_0 + (a_6 + a_2|\vec{\mathbf{rho}'_k}|^2 + a_3|\vec{\mathbf{rho}'_k}|^4)y'_{imk} + a_5(|\vec{\mathbf{rho}'_k}|^2 + 2y'^2_{imk}) + 2a_4 x'_{imk}y'_{imk}$$

UNITED STATES PATENT AND TRADEMARK OFFICE
CERTIFICATE OF CORRECTION

PATENT NO.    : 6,476,979 B1
DATED         : November 5, 2002
INVENTOR(S)   : David F. Schaack It is certified that error appears in the above-identified patent and that said Letters Patent is hereby corrected as shown below:

Column 47,
Insert the following between lines 48 and 49, -- 7h. Incorporation of relative magnification into the perspective measurement --.

Column 48,
Line 11, replace "process" with -- processing --.
Line 12, replace "of sets" with -- offsets --.

Column 49,
Equation (48), replace "+ ]" with -- ] + --.

Column 50,
The paragraph containing Equation (49) has been left out entirely and angle brackets are missing in Equation (49). This paragraph and Equation should read:

Next calculate the reduced reference image as the reference image minus its centroid, that is:

$$[\vec{x}_{rref}, \vec{y}_{rref}] = [(\vec{x}_{ly} - \langle \vec{x}_{ly} \rangle) \; (\vec{y}_{ly} - \langle \vec{y}_{ly} \rangle)] \qquad (49)$$

where the angle brackets denote the mean of the enclosed quantity, where the mean of a vector is a scalar, and where the subtraction of a scalar from a vector means that the scalar is subtracted from every element of the vector.

Column 50,
Equation (50), replace the subscript "$l$" with -- $j$ -- (2 places).

Column 52,
Equation (56) should appear immediately following line 51. It appears instead at the top of column 53.

Column 55,
Line 55, replace "Si" with -- $\delta i$ --.

Column 56,
Line 66, replace "Application 11 introduced" with -- Application 1 I introduced --.

UNITED STATES PATENT AND TRADEMARK OFFICE
CERTIFICATE OF CORRECTION

PATENT NO. : 6,476,979 B1
DATED : November 5, 2002
INVENTOR(S) : David F. Schaack It is certified that error appears in the above-identified patent and that said Letters Patent is hereby corrected as shown below:

Column 61,
Line 27, insert -- ray -- before "magnification".

Column 62,
Line 1, delete "ad".

Column 66,
Line 28, replace "$d_i$" with -- $d_1$ --.

Signed and Sealed this

First Day of April, 2003

JAMES E. ROGAN
*Director of the United States Patent and Trademark Office*